US011960615B2

(12) United States Patent
Ma et al.

(10) Patent No.: US 11,960,615 B2
(45) Date of Patent: Apr. 16, 2024

(54) METHODS AND USER INTERFACES FOR VOICE-BASED USER PROFILE MANAGEMENT

(71) Applicant: Apple Inc., Cupertino, CA (US)

(72) Inventors: Jeffrey Ma, Emerald Hills, CA (US); Corey J. Peterson, Saratoga, CA (US); Rob Bowles Sinclair, Los Gatos, CA (US); Hiu Yi Chan, Seattle, WA (US); Neil P. Cormican, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 317 days.

(21) Appl. No.: 17/468,286

(22) Filed: Sep. 7, 2021

(65) Prior Publication Data

US 2022/0391520 A1 Dec. 8, 2022

Related U.S. Application Data

(60) Provisional application No. 63/197,475, filed on Jun. 6, 2021.

(51) Int. Cl.
*G06F 21/00* (2013.01)
*G06F 3/16* (2006.01)
(Continued)

(52) U.S. Cl.
CPC .......... *G06F 21/6209* (2013.01); *G06F 3/167* (2013.01); *G06F 21/32* (2013.01); *G06F 21/629* (2013.01); *G06F 2221/2141* (2013.01)

(58) Field of Classification Search
CPC ...... G06F 21/6209; G06F 3/167; G06F 21/32; G06F 21/629; G06F 2221/2141
See application file for complete search history.

(56) References Cited

U.S. PATENT DOCUMENTS 5,202,961 A   4/1993  Mills et al.
5,550,968 A   8/1996  Miller et al.
(Continued)

FOREIGN PATENT DOCUMENTS

AU   2006330724 A1   7/2007
AU   2007100826 A4   9/2007
(Continued)

OTHER PUBLICATIONS

Invitation to Pay Search Fees received for European Patent Application No. 20760624.5, dated Jan. 2, 2023, 3 pages.
(Continued)

*Primary Examiner* — John B King
(74) *Attorney, Agent, or Firm* — DLA Piper LLP (US)

(57) ABSTRACT

The present disclosure generally relates to managing user profiles. An example method includes, at a computer system in communication with a display generation component and an input device: receiving, via the input device, a user input including a request to access a first restricted media item; and in response to the user input: in accordance with a determination the user input is a voice input and the voice input corresponds to a user profile authorized to access the first restricted media item using voice inputs, initiating playback of the first restricted media item; and in accordance with a determination the user input is a voice input and the voice input does not correspond to a user profile authorized to access the first restricted media item using voice inputs: forgoing initiating playback of the first restricted media item; and causing display, at the display generation component, of a validation user interface.

21 Claims, 26 Drawing Sheets

(51) Int. Cl.
*G06F 21/32* (2013.01)
*G06F 21/62* (2013.01)

(56) References Cited

U.S. PATENT DOCUMENTS

| | | |
|---|---|---|
| 7,593,000 B1 | 9/2009 | Chin |
| 7,810,105 B2 | 10/2010 | Prabandham et al. |
| 7,865,837 B1 | 1/2011 | Huff et al. |
| 8,060,571 B2 | 11/2011 | Rao |
| 8,115,609 B2 | 2/2012 | Ketari |
| 8,130,206 B2 | 3/2012 | Lindroos |
| 8,355,698 B2 | 1/2013 | Teng et al. |
| 8,442,600 B1 | 5/2013 | Tseng |
| 8,528,072 B2 | 9/2013 | Shi et al. |
| 8,581,877 B2 | 11/2013 | Yoo |
| 8,676,273 B1 | 3/2014 | Fujisaki |
| 8,749,516 B2 | 6/2014 | Kim et al. |
| 8,811,948 B2 | 8/2014 | Bandyopadhyay et al. |
| 8,812,994 B2 | 8/2014 | Seymour et al. |
| 8,850,560 B2 | 9/2014 | Kim et al. |
| 9,083,814 B2 | 7/2015 | Lee et al. |
| 9,094,534 B2 | 7/2015 | Seymour et al. |
| 9,104,307 B2 | 8/2015 | Jarrett et al. |
| 9,213,822 B2 | 12/2015 | Dellinger et al. |
| 9,247,363 B2 | 1/2016 | Triplett et al. |
| 9,292,195 B2 | 3/2016 | Lopes et al. |
| 9,372,978 B2 | 6/2016 | Forstall et al. |
| 9,407,624 B1 | 8/2016 | Myers et al. |
| 9,451,144 B2 | 9/2016 | Dye |
| 9,710,639 B1 | 7/2017 | Saini |
| 9,727,749 B2 | 8/2017 | Tzeng et al. |
| 9,812,128 B2 | 11/2017 | Mixter et al. |
| 9,820,323 B1 | 11/2017 | Young et al. |
| 9,826,083 B2 | 11/2017 | Kanevsky et al. |
| 9,847,999 B2 | 12/2017 | Van Os et al. |
| 9,954,989 B2 | 4/2018 | Zhou |
| 10,007,802 B2 | 6/2018 | Dellinger et al. |
| 10,089,983 B1 | 10/2018 | Gella et al. |
| 10,104,089 B2 | 10/2018 | Kim et al. |
| 10,129,044 B2 | 11/2018 | Kangshang et al. |
| 10,198,563 B2 | 2/2019 | Wang et al. |
| 10,304,463 B2 | 5/2019 | Mixter et al. |
| 10,374,804 B2 | 8/2019 | Lee et al. |
| 10,412,206 B1 | 9/2019 | Liang et al. |
| 10,490,195 B1 | 11/2019 | Krishnamoorthy et al. |
| 10,558,546 B2 | 2/2020 | Cranfill et al. |
| 10,567,515 B1 | 2/2020 | Bao |
| 10,616,726 B1 * | 4/2020 | Freeman, II ............ H04W 8/02 |
| 10,732,819 B2 | 8/2020 | Wang et al. |
| 10,742,645 B2 | 8/2020 | Hevizi et al. |
| 10,742,648 B2 | 8/2020 | Magyar et al. |
| 10,802,843 B1 | 10/2020 | Carrigan et al. |
| 10,824,299 B2 | 11/2020 | Bai |
| 10,833,887 B2 | 11/2020 | Wu |
| 11,343,370 B1 | 5/2022 | Gordon et al. |
| 11,431,834 B1 | 8/2022 | Gordon et al. |
| 11,463,576 B1 | 10/2022 | Gordon et al. |
| 2002/0162005 A1 | 10/2002 | Ueda et al. |
| 2003/0098776 A1 * | 5/2003 | Friedli .................... B66B 1/468 187/391 |
| 2003/0220835 A1 * | 11/2003 | Barnes, Jr. ............. G06Q 10/02 379/93.12 |
| 2004/0101297 A1 | 5/2004 | Nonaka |
| 2004/0261010 A1 | 12/2004 | Matsuishi |
| 2005/0172319 A1 * | 8/2005 | Reichardt .............. H04N 21/47 725/86 |
| 2005/0268237 A1 | 12/2005 | Crane et al. |
| 2006/0136829 A1 | 6/2006 | Abbar et al. |
| 2006/0143716 A1 | 6/2006 | Ikemoto |
| 2006/0155546 A1 | 7/2006 | Gupta et al. |
| 2007/0024646 A1 | 2/2007 | Saarinen et al. |
| 2007/0150842 A1 | 6/2007 | Chaudhri et al. |
| 2007/0300140 A1 | 12/2007 | Makela et al. |
| 2008/0020803 A1 | 1/2008 | Rios et al. |
| 2008/0045186 A1 | 2/2008 | Black et al. |
| 2008/0081558 A1 | 4/2008 | Dunko et al. |
| 2008/0101553 A1 | 5/2008 | Goldman et al. |
| 2008/0126986 A1 | 5/2008 | Tsukiji |
| 2008/0254767 A1 | 10/2008 | Jin |
| 2009/0064055 A1 | 3/2009 | Chaudhri et al. |
| 2009/0125571 A1 | 5/2009 | Kiilerich et al. |
| 2009/0133051 A1 | 5/2009 | Hildreth |
| 2009/0144367 A1 | 6/2009 | Tadokoro et al. |
| 2009/0172576 A1 | 7/2009 | Cheaz |
| 2009/0215497 A1 | 8/2009 | Louch |
| 2009/0284482 A1 | 11/2009 | Chin |
| 2010/0001967 A1 | 1/2010 | Yoo |
| 2010/0060586 A1 | 3/2010 | Pisula et al. |
| 2010/0082374 A1 | 4/2010 | Charania et al. |
| 2010/0146384 A1 | 6/2010 | Peev et al. |
| 2010/0151903 A1 | 6/2010 | Yamamoto et al. |
| 2010/0159995 A1 | 6/2010 | Stallings et al. |
| 2010/0162180 A1 | 6/2010 | Dunnam et al. |
| 2010/0178873 A1 | 7/2010 | Lee et al. |
| 2010/0231355 A1 | 9/2010 | Okuma et al. |
| 2010/0235732 A1 | 9/2010 | Bergman |
| 2010/0235881 A1 | 9/2010 | Liu et al. |
| 2010/0241973 A1 | 9/2010 | Whiddett |
| 2010/0257490 A1 | 10/2010 | Lyon et al. |
| 2010/0268828 A1 | 10/2010 | Pahlavan et al. |
| 2010/0269040 A1 | 10/2010 | Lee |
| 2010/0293508 A1 | 11/2010 | Hwang et al. |
| 2010/0297988 A1 | 11/2010 | Kuhl et al. |
| 2010/0306705 A1 | 12/2010 | Nilsson |
| 2010/0306718 A1 | 12/2010 | Shim et al. |
| 2010/0315371 A1 | 12/2010 | Katsu et al. |
| 2011/0010672 A1 | 1/2011 | Hope |
| 2011/0028186 A1 | 2/2011 | Lee et al. |
| 2011/0041102 A1 | 2/2011 | Kim |
| 2011/0047368 A1 | 2/2011 | Sundaramurthy et al. |
| 2011/0054647 A1 | 3/2011 | Chipchase |
| 2011/0102345 A1 | 5/2011 | Kim et al. |
| 2011/0102357 A1 | 5/2011 | Kajitani |
| 2011/0105193 A1 | 5/2011 | Lee et al. |
| 2011/0126094 A1 | 5/2011 | Horodezky et al. |
| 2011/0163972 A1 | 7/2011 | Anzures et al. |
| 2011/0185048 A1 | 7/2011 | Yew et al. |
| 2011/0247065 A1 | 10/2011 | Melnyk |
| 2011/0252357 A1 | 10/2011 | Chaudhri |
| 2011/0256848 A1 | 10/2011 | Bok et al. |
| 2011/0260829 A1 | 10/2011 | Lee |
| 2011/0265179 A1 | 10/2011 | Newman et al. |
| 2011/0283241 A1 | 11/2011 | Miller et al. |
| 2011/0294467 A1 | 12/2011 | Kim et al. |
| 2012/0009896 A1 | 1/2012 | Bandyopadhyay et al. |
| 2012/0021724 A1 | 1/2012 | Olsen et al. |
| 2012/0023458 A1 | 1/2012 | Chaudhri et al. |
| 2012/0046077 A1 | 2/2012 | Kim et al. |
| 2012/0084691 A1 | 4/2012 | Yun |
| 2012/0142379 A1 | 6/2012 | Park |
| 2012/0144338 A1 | 6/2012 | Hymel |
| 2012/0174042 A1 | 7/2012 | Chang et al. |
| 2012/0182226 A1 | 7/2012 | Tuli |
| 2012/0184247 A1 | 7/2012 | Choe et al. |
| 2012/0188206 A1 | 7/2012 | Sparf et al. |
| 2012/0240056 A1 | 9/2012 | Webber |
| 2012/0269040 A1 | 10/2012 | Wei et al. |
| 2012/0272230 A1 | 10/2012 | Lee |
| 2012/0284297 A1 | 11/2012 | Aguera-Arcas et al. |
| 2012/0291103 A1 | 11/2012 | Cohen |
| 2013/0040604 A1 | 2/2013 | Sprigg et al. |
| 2013/0076591 A1 | 3/2013 | Sirpal et al. |
| 2013/0077774 A1 | 3/2013 | Lynch, III |
| 2013/0082945 A1 | 4/2013 | Jo |
| 2013/0088442 A1 | 4/2013 | Lee |
| 2013/0094666 A1 | 4/2013 | Haaff et al. |
| 2013/0094770 A1 | 4/2013 | Lee et al. |
| 2013/0124207 A1 | 5/2013 | Sarin et al. |
| 2013/0169573 A1 | 7/2013 | Nishio |
| 2013/0174094 A1 | 7/2013 | Heo et al. |
| 2013/0272511 A1 | 10/2013 | Mateer et al. |
| 2013/0305354 A1 | 11/2013 | King et al. |
| 2013/0329924 A1 | 12/2013 | Fleizach et al. |
| 2013/0347102 A1 | 12/2013 | Shi |

(56) References Cited

U.S. PATENT DOCUMENTS

| | | |
|---|---|---|
| 2014/0047020 A1 | 2/2014 | Matus et al. |
| 2014/0164941 A1 | 6/2014 | Kim et al. |
| 2014/0176298 A1 | 6/2014 | Kumar et al. |
| 2014/0181104 A1 | 6/2014 | Chin et al. |
| 2014/0181654 A1 | 6/2014 | Kumar et al. |
| 2014/0237378 A1 | 8/2014 | Gonen et al. |
| 2014/0267002 A1 | 9/2014 | Luna |
| 2014/0315163 A1 | 10/2014 | Ingrassia et al. |
| 2014/0333414 A1 | 11/2014 | Kursun |
| 2014/0351339 A1 | 11/2014 | Kaneoka et al. |
| 2014/0351346 A1 | 11/2014 | Barton |
| 2014/0365904 A1 | 12/2014 | Kim et al. |
| 2015/0029089 A1 | 1/2015 | Kim |
| 2015/0033361 A1 | 1/2015 | Choi et al. |
| 2015/0089359 A1 | 3/2015 | Brisebois |
| 2015/0113407 A1 | 4/2015 | Hoffert et al. |
| 2015/0153911 A1 | 6/2015 | Seymour et al. |
| 2015/0176998 A1 | 6/2015 | Huang et al. |
| 2015/0189426 A1 | 7/2015 | Pang |
| 2015/0242837 A1 | 8/2015 | Yarbrough et al. |
| 2015/0286360 A1 | 10/2015 | Wachter |
| 2015/0317977 A1 | 11/2015 | Manjunath et al. |
| 2015/0347738 A1 | 12/2015 | Ulrich et al. |
| 2015/0350031 A1 | 12/2015 | Burks et al. |
| 2015/0382047 A1 | 12/2015 | Van Os et al. |
| 2016/0004417 A1 | 1/2016 | Bates |
| 2016/0026429 A1 | 1/2016 | Triplett |
| 2016/0026779 A1 | 1/2016 | Grigg et al. |
| 2016/0048705 A1 | 2/2016 | Yang |
| 2016/0062487 A1 | 3/2016 | Foss et al. |
| 2016/0062606 A1 | 3/2016 | Vega et al. |
| 2016/0085565 A1 | 3/2016 | Arcese et al. |
| 2016/0094678 A1 | 3/2016 | Kumar et al. |
| 2016/0156992 A1 | 6/2016 | Kuper |
| 2016/0179334 A1 | 6/2016 | Fleizach et al. |
| 2016/0226674 A1 | 8/2016 | Kangshang et al. |
| 2016/0241983 A1 | 8/2016 | Lambourne et al. |
| 2016/0299669 A1 | 10/2016 | Bates |
| 2016/0299736 A1 | 10/2016 | Bates et al. |
| 2016/0300072 A1 | 10/2016 | Dellinger et al. |
| 2016/0360344 A1 | 12/2016 | Shim et al. |
| 2016/0364600 A1 | 12/2016 | Shah et al. |
| 2017/0010794 A1 | 1/2017 | Cho et al. |
| 2017/0013562 A1 | 1/2017 | Lim et al. |
| 2017/0025124 A1 | 1/2017 | Mixter et al. |
| 2017/0060402 A1 | 3/2017 | Bates |
| 2017/0061965 A1 | 3/2017 | Penilla et al. |
| 2017/0068507 A1 | 3/2017 | Kim et al. |
| 2017/0094049 A1 | 3/2017 | Kanevsky et al. |
| 2017/0115940 A1 | 4/2017 | Byeon |
| 2017/0134567 A1 | 5/2017 | Jeon et al. |
| 2017/0195772 A1 | 7/2017 | Han et al. |
| 2017/0242653 A1 | 8/2017 | Lang et al. |
| 2017/0242657 A1 | 8/2017 | Jarvis et al. |
| 2017/0263249 A1 | 9/2017 | Akbacak et al. |
| 2017/0280223 A1* | 9/2017 | Cavarra ............... G06F 3/167 |
| 2017/0293610 A1 | 10/2017 | Tran |
| 2017/0331869 A1* | 11/2017 | Bendahan ............ H04L 65/612 |
| 2017/0339151 A1 | 11/2017 | Van Os et al. |
| 2017/0357420 A1 | 12/2017 | Dye et al. |
| 2017/0357434 A1 | 12/2017 | Coffman et al. |
| 2017/0357439 A1 | 12/2017 | Lemay et al. |
| 2017/0357478 A1 | 12/2017 | Piersol et al. |
| 2017/0359555 A1 | 12/2017 | Irani et al. |
| 2017/0374004 A1 | 12/2017 | Holmes et al. |
| 2018/0019973 A1 | 1/2018 | Mikhailov et al. |
| 2018/0032997 A1 | 2/2018 | Gordon et al. |
| 2018/0039916 A1 | 2/2018 | Ravindra |
| 2018/0040322 A1 | 2/2018 | Mixter et al. |
| 2018/0061421 A1 | 3/2018 | Sarikaya |
| 2018/0067528 A1 | 3/2018 | Wang et al. |
| 2018/0067712 A1 | 3/2018 | Behzadi et al. |
| 2018/0082682 A1 | 3/2018 | Erickson et al. |
| 2018/0096690 A1 | 4/2018 | Mixter et al. |
| 2018/0096696 A1 | 4/2018 | Mixter |
| 2018/0144590 A1 | 5/2018 | Mixter et al. |
| 2018/0182389 A1 | 6/2018 | Devaraj et al. |
| 2018/0190264 A1 | 7/2018 | Mixter et al. |
| 2018/0218201 A1 | 8/2018 | Siminoff |
| 2018/0253281 A1 | 9/2018 | Jarvis et al. |
| 2018/0285587 A1 | 10/2018 | Dellinger et al. |
| 2018/0288115 A1 | 10/2018 | Asnis et al. |
| 2018/0330589 A1 | 11/2018 | Horling |
| 2018/0335903 A1 | 11/2018 | Coffman et al. |
| 2018/0336904 A1 | 11/2018 | Piercy et al. |
| 2018/0336905 A1 | 11/2018 | Kim et al. |
| 2018/0341448 A1 | 11/2018 | Behzadi et al. |
| 2018/0351762 A1 | 12/2018 | Iyengar et al. |
| 2019/0012069 A1 | 1/2019 | Bates |
| 2019/0012966 A1 | 1/2019 | Shi |
| 2019/0043508 A1 | 2/2019 | Sak et al. |
| 2019/0080698 A1 | 3/2019 | Miller |
| 2019/0102145 A1 | 4/2019 | Wilberding et al. |
| 2019/0124049 A1 | 4/2019 | Bradley et al. |
| 2019/0172467 A1 | 6/2019 | Kim et al. |
| 2019/0221227 A1 | 7/2019 | Mixter |
| 2019/0288867 A1 | 9/2019 | Mese et al. |
| 2019/0310820 A1 | 10/2019 | Bates |
| 2019/0311721 A1 | 10/2019 | Edwards |
| 2019/0370781 A1 | 12/2019 | Van Os et al. |
| 2019/0370805 A1 | 12/2019 | Van Os et al. |
| 2019/0371313 A1 | 12/2019 | Naughton et al. |
| 2019/0378500 A1 | 12/2019 | Miller et al. |
| 2020/0075026 A1 | 3/2020 | Peeler et al. |
| 2020/0076939 A1 | 3/2020 | Lambourne et al. |
| 2020/0126560 A1 | 4/2020 | Ho et al. |
| 2020/0151601 A1 | 5/2020 | Niewczas |
| 2020/0184964 A1 | 6/2020 | Myers et al. |
| 2020/0186378 A1 | 6/2020 | Six et al. |
| 2020/0218486 A1 | 7/2020 | Behzadi et al. |
| 2020/0275144 A1 | 8/2020 | Major |
| 2020/0294499 A1 | 9/2020 | Deluca et al. |
| 2020/0336909 A1 | 10/2020 | Seel et al. |
| 2020/0379711 A1 | 12/2020 | Graham et al. |
| 2020/0379714 A1 | 12/2020 | Graham et al. |
| 2020/0379729 A1 | 12/2020 | Graham et al. |
| 2020/0379730 A1 | 12/2020 | Graham et al. |
| 2020/0380972 A1 | 12/2020 | Carrigan et al. |
| 2021/0081560 A1 | 3/2021 | Dellinger et al. |
| 2021/0255816 A1 | 8/2021 | Behzadi et al. |
| 2021/0255819 A1 | 8/2021 | Graham et al. |
| 2021/0352172 A1* | 11/2021 | Kim ..................... H04R 27/00 |
| 2022/0062704 A1* | 3/2022 | D'Auria ............... G16H 20/30 |
| 2022/0078552 A1* | 3/2022 | Delhoume ......... H04N 21/4532 |
| 2022/0116399 A1 | 4/2022 | Carrigan et al. |
| 2022/0129144 A1 | 4/2022 | Carrigan et al. |
| 2022/0191162 A1 | 6/2022 | Hegarty et al. |
| 2022/0254120 A1* | 8/2022 | Berliner ................ G06F 1/163 |
| 2022/0357964 A1 | 11/2022 | Carrigan et al. |
| 2022/0392455 A1 | 12/2022 | Ma et al. |
| 2023/0315495 A1 | 10/2023 | Carrigan et al. |

FOREIGN PATENT DOCUMENTS

| | | |
|---|---|---|
| AU | 2008100011 A4 | 2/2008 |
| CN | 101371258 A | 2/2009 |
| CN | 101625620 A | 1/2010 |
| CN | 101753656 A | 6/2010 |
| CN | 101882046 A | 11/2010 |
| CN | 102043587 A | 5/2011 |
| CN | 102130998 A | 7/2011 |
| CN | 102523213 A | 6/2012 |
| CN | 104503688 A | 4/2015 |
| CN | 104012150 B | 5/2018 |
| CN | 109314795 A | 2/2019 |
| CN | 109688442 A | 4/2019 |
| DE | 212006000081 U1 | 8/2008 |
| EP | 2144148 A2 | 1/2010 |
| EP | 1964022 B1 | 3/2010 |
| EP | 2200306 A2 | 6/2010 |
| EP | 2230623 A1 | 9/2010 |
| EP | 3163495 A1 | 5/2017 |
| JP | 6-149525 A | 5/1994 |
| JP | 2001-5599 A | 1/2001 |

(56) References Cited

FOREIGN PATENT DOCUMENTS

| | | | |
|---|---|---|---|
| JP | 2001-356878 | A | 12/2001 |
| JP | 2005-276120 | A | 10/2005 |
| JP | 2006-185154 | A | 7/2006 |
| JP | 2007-334301 | A | 12/2007 |
| JP | 2009-110378 | A | 5/2009 |
| JP | 2009-123208 | A | 6/2009 |
| JP | 2009-140018 | A | 6/2009 |
| JP | 2009-521753 | A | 6/2009 |
| JP | 2009-181244 | A | 8/2009 |
| JP | 2010-9335 | A | 1/2010 |
| JP | 2010-147717 | A | 7/2010 |
| JP | 2010-211631 | A | 9/2010 |
| JP | 2011-28403 | A | 2/2011 |
| JP | 2011-60281 | A | 3/2011 |
| JP | 2011-76621 | A | 4/2011 |
| JP | 2011-199637 | A | 10/2011 |
| JP | 2011-232899 | A | 11/2011 |
| JP | 2011-253273 | A | 12/2011 |
| JP | 2013-25357 | A | 2/2013 |
| JP | 2014-502454 | A | 1/2014 |
| JP | 2015-533441 | A | 11/2015 |
| KR | 10-2008-0079333 | A | 8/2008 |
| KR | 10-2010-0005438 | A | 1/2010 |
| KR | 10-2010-0036351 | A | 4/2010 |
| KR | 10-2011-0114873 | A | 10/2011 |
| KR | 10-2011-0129574 | A | 12/2011 |
| KR | 10-2011-0139570 | A | 12/2011 |
| KR | 10-2015-0031010 | A | 3/2015 |
| KR | 10-2015-0121177 | A | 10/2015 |
| KR | 10-2016-0012008 | A | 2/2016 |
| KR | 10-2016-0141847 | A | 12/2016 |
| KR | 10-2017-0027999 | A | 3/2017 |
| KR | 10-2011177 | B1 | 8/2019 |
| KR | 10-2022-0004223 | A | 1/2022 |
| TW | I339344 | B | 3/2011 |
| TW | I355957 | B | 1/2012 |
| WO | 2001/75597 | A2 | 10/2001 |
| WO | 2007/076210 | A1 | 7/2007 |
| WO | 2009/005563 | A1 | 1/2009 |
| WO | 2010/044151 | A1 | 4/2010 |
| WO | 2010/065752 | A2 | 6/2010 |
| WO | 2011/130839 | A1 | 10/2011 |
| WO | 2011/149231 | A2 | 12/2011 |
| WO | 2012/006480 | A2 | 1/2012 |
| WO | 2014/151089 | A1 | 9/2014 |
| WO | 2016/057117 | A1 | 4/2016 |
| WO | 2017/218199 | A1 | 12/2017 |
| WO | 2018/025030 | A2 | 2/2018 |
| WO | 2018/067531 | A1 | 4/2018 |
| WO | 2018/085671 | A1 | 5/2018 |
| WO | 2018/089700 | A1 | 5/2018 |
| WO | 2018/213401 | A1 | 11/2018 |
| WO | 2018/213415 | A1 | 11/2018 |
| WO | 2020/076365 | A1 | 4/2020 |
| WO | 2020/242577 | A1 | 12/2020 |

OTHER PUBLICATIONS

Office Action received for Australian Patent Application No. 2022203561, dated Dec. 16, 2022, 2 pages.
2014-502454, JP, A, Japanese Patent Office in an Office Action for related Patent Application No. 2021-569562 dated May 13, 2022.
10-2016-0141847, KR, A, Korean Patent Office in an Office Action for related Patent Application No. 10-2021-7035472 dated Nov. 23, 2021.
10-2017-0027999, KR, A, Korean Patent Office in an Office Action for related Patent Application No. 10-2021-7035472 dated Nov. 23, 2021.
Intention to Grant received for European Patent Application No. 20720675.6, dated Mar. 24, 2023, 9 pages.
Notice of Allowance received for U.S. Appl. No. 16/922,675, dated Mar. 22, 2023, 8 pages.
Office Action received for Japanese Patent Application No. 2022-201453, dated Mar. 6, 2023, 8 pages (5 pages of English Translation and 3 pages of Official Copy).
Corrected Notice of Allowance received for U.S. Appl. No. 17/871,627, dated Mar. 7, 2023, 2 pages.
Final Office Action received for U.S. Appl. No. 17/489,508, dated Mar. 10, 2023, 25 pages.
Notice of Acceptance received for Australian Patent Application No. 2022203561, dated Feb. 27, 2023, 3 pages.
Office Action received for European Patent Application No. 20760624.5, dated Mar. 7, 2023, 13 pages.
Supplemental Notice of Allowance received for U.S. Appl. No. 16/888,775, dated Mar. 1, 2023, 2 pages.
Advisory Action received for U.S. Appl. No. 13/744,343, dated Jul. 30, 2015, 4 pages.
Advisory Action received for U.S. Appl. No. 16/583,989, dated Sep. 22, 2020, 5 pages.
Advisory Action received for U.S. Appl. No. 16/584,347, dated Aug. 28, 2020, 2 pages.
Akshay, "Control your SmartThings compatible devices on the Gear S2 and S3 with the Smarter Things app", Online available at: https://iotgadgets.com/2017/09/control-smartthings-compatible-devices-gear-s2-s3-smarter-things-app/, Sep. 7, 2017, 4 pages.
Applicant Initiated Interview Summary received for U.S. Appl. No. 15/995,044, dated Jul. 21, 2020, 5 pages.
Applicant Initiated Interview Summary received for U.S. Appl. No. 15/995,044, dated Oct. 28, 2019, 6 pages.
Applicant Initiated Interview Summary received for U.S. Appl. No. 16/583,989, dated Aug. 3, 2020, 6 pages.
Applicant Initiated Interview Summary received for U.S. Appl. No. 16/583,989, dated Mar. 25, 2020, 4 pages.
Applicant Initiated Interview Summary received for U.S. Appl. No. 16/584,490, dated Jul. 28, 2020, 4 pages.
Applicant Initiated Interview Summary received for U.S. Appl. No. 16/584,321, dated Apr. 8, 2020, 5 pages.
Applicant Initiated Interview Summary received for U.S. Appl. No. 16/584,347, dated Sep. 1, 2020, 3 pages.
Applicant Initiated Interview Summary received for U.S. Appl. No. 16/584,490, dated Jan. 31, 2020, 4 pages.
Applicant Initiated Interview Summary received for U.S. Appl. No. 16/922,675, dated Dec. 16, 2020, 3 pages.
Applicant Initiated Interview Summary received for U.S. Appl. No. 16/922,675, dated Nov. 2, 2020, 3 pages.
Applicant Initiated Interview Summary received for U.S. Appl. No. 16/922,675, dated Sep. 3, 2021, 2 pages.
Corrected Notice of Allowance received for U.S. Appl. No. 16/584,347, dated Nov. 9, 2020, 2 pages.
Corrected Notice of Allowance received for U.S. Appl. No. 16/584,347, dated Sep. 23, 2020, 5 pages.
Customize Notifications and Content on Your Galaxy Phone's Lock Screen, Online Available at: https://www.samsung.com/us/support/answer/ANS00062636, Oct. 4, 2017, 5 pages.
Decision on Appeal received for Korean Patent Application No. 10-2014-7023252, mailed on Feb. 27, 2019, 58 pages (9 pages of English Translation and 49 pages of Official Copy).
Decision on Appeal received for Korean Patent Application No. 10-2017-7010440, mailed on Jan. 22, 2020, 20 pages (3 pages of English Translation and 17 pages of Official Copy).
Decision to Grant received for European Patent Application No. 12188713.7, dated Dec. 6, 2018, 2 pages.
Decision to Grant received for European Patent Application No. 13702856.9, dated Jun. 6, 2019, 2 pages.
Extended European Search Report (includes Partial European Search Report and European Search Opinion) received for European Patent Application No. 12188713.7, dated Jul. 30, 2015, 11 pages.
Extended European Search Report received for European Patent Application No. 19173909.3, dated Sep. 13, 2019, 4 pages.
Feng et al., "Continuous Remote Mobile Identity Management Using Biometric Integrated Touch-Display", 45th Annual IEEE/ACM International Symposium on Microarchitecture Workshops (MICROW), 2012, pp. 55-62.
Final Office Action received for U.S. Appl. No. 12/842,899, dated Nov. 23, 2012, 12 pages.

(56) References Cited

OTHER PUBLICATIONS

Final Office Action received for U.S. Appl. No. 13/744,343, dated Mar. 27, 2015, 27 pages.
Final Office Action received for U.S. Appl. No. 14/015,512, dated Nov. 29, 2016, 14 pages.
Final Office Action received for U.S. Appl. No. 14/015,512, dated Sep. 28, 2015, 15 pages.
Final Office Action received for U.S. Appl. No. 15/995,044, dated Apr. 14, 2020, 11 pages.
Final Office Action received for U.S. Appl. No. 16/583,989, dated Jul. 10, 2020, 23 pages.
Final Office Action received for U.S. Appl. No. 16/584,321, dated May 22, 2020, 12 pages.
Final Office Action received for U.S. Appl. No. 16/584,347, dated Jun. 10, 2020, 20 pages.
Final Office Action received for U.S. Appl. No. 16/584,490, dated May 1, 2020, 48 pages.
Final Office Action received for U.S. Appl. No. 16/922,675, dated Dec. 3, 2020, 21 pages.
Final Office Action received for U.S. Appl. No. 16/922,675, dated Nov. 30, 2020, 12 pages.
Gookin Dan, "Lock Screen Settings on Your Android Phone", Online Available at: https://www.dummies.com/consumer-electronics/smartphones/droid/lock-screen-settings-on-your-android-phone/, Sep. 23, 2015, 6 pages.
Heath Alex, "Weird iOS 5 Bug Lets Prying Eyes View Saved Photos on A Locked iPhone", Online Available at: http://www.cultofmac.com/137827/weird-ios-5-bug-lets-preying-eyes-view-saved-photos-on-a-locked-iphone/, Jan. 3, 2012, 7 pages.
Intention to Grant received for European Patent Application No. 12188713.7, dated Jul. 9, 2018, 11 pages.
Intention to Grant received for European Patent Application No. 13702856.9, dated Jan. 29, 2019, 8 pages.
International Preliminary Report on Patentability received for PCT Patent Application No. PCT/US2013/022197, dated Jul. 31, 2014, 11 pages.
International Preliminary Report on Patentability received for PCT Patent Application No. PCT/US2014/018907, dated Sep. 24, 2015, 10 pages.
International Search Report and Written Opinion received for PCT Patent Application No. PCT/US2013/022197, dated Jul. 9, 2013, 15 pages.
International Search Report and Written Opinion received for PCT Patent Application No. PCT/US2014/018907, dated Jul. 2, 2014, 13 pages.
International Search Report and Written Opinion received for PCT Patent Application No. PCT/US2020/025526, dated Aug. 11, 2020, 18 pages.
International Search Report and Written Opinion received for PCT Patent Application No. PCT/US2020/035488, dated Nov. 17, 2020, 21 pages.
Invitation to Pay Additional Fees received for PCT Patent Application No. PCT/US2020/025526, dated Jun. 15, 2020, 12 pages.
Invitation to Pay Additional Fees received for PCT Patent Application No. PCT/US2020/035488, dated Sep. 23, 2020, 15 pages.
Locklear Mallory, "Samsung to bring SmartThings control to its Gear smartwatches", Online available at: https://www.engadget.com/2018-01-08-samsung-smartthings-app-gear-smartwatches.html, Jan. 8, 2018, 12 pages.
Low Cherlynn, "So you bought a smartwatch. Now what?", Online available at: https://www.engadget.com/2018-02-06-how-to-set-up-your-smartwatch.html, Feb. 6, 2018, 19 pages.
Nakamura Asami, "iPhone 4S & iOS 5 Start Guide", Mynavi Corporation, MacFan, Special Supplement, Dec. 2011, pp. 26, 54, 77 and 114-115.
Ni et al., "DiffUser: Differentiated User Access Control on Smartphones", IEEE 6th International Conference on Mobile Adhoc and Sensor Systems, 2009, pp. 1012-1017.
Non-Final Office Action received for U.S. Appl. No. 12/842,899, dated May 29, 2012, 16 pages.
Non-Final Office Action received for U.S. Appl. No. 13/436,433, dated Oct. 24, 2013, 14 pages.
Non-Final Office Action received for U.S. Appl. No. 13/689,708, dated Nov. 6, 2014, 12 pages.
Non-Final Office Action received for U.S. Appl. No. 13/744,343, dated May 29, 2014, 31 pages.
Non-Final Office Action received for U.S. Appl. No. 13/744,349, dated Apr. 9, 2014, 31 pages.
Non-Final Office Action received for U.S. Appl. No. 14/015,512, dated Apr. 22, 2015, 13 pages.
Non-Final Office Action received for U.S. Appl. No. 14/015,512, dated May 20, 2016, 13 pages.
Non-Final Office Action received for U.S. Appl. No. 14/329,704, dated Jul. 28, 2016, 22 pages.
Non-Final Office Action received for U.S. Appl. No. 15/187,463, dated Jun. 27, 2017, 14 pages.
Non-Final Office Action received for U.S. Appl. No. 15/187,463, dated Nov. 4, 2016, 11 pages.
Non-Final Office Action received for U.S. Appl. No. 15/995,044, dated Jun. 27, 2019, 17 pages.
Non-Final Office Action received for U.S. Appl. No. 16/583,989, dated Jan. 24, 2020, 20 pages.
Non-Final Office Action received for U.S. Appl. No. 16/584,321, dated Jan. 7, 2020, 19 pages.
Non-Final Office Action received for U.S. Appl. No. 16/584,347, dated Dec. 20, 2019, 16 pages.
Non-Final Office Action received for U.S. Appl. No. 16/584,490, dated Dec. 10, 2019, 27 pages.
Non-Final Office Action received for U.S. Appl. No. 16/922,675, dated Aug. 13, 2020, 17 pages.
Non-Final Office Action received for U.S. Appl. No. 16/922,675, dated May 4, 2021, 23 pages.
Non-Final Office Action received for U.S. Appl. No. 17/062,891, dated Jul. 13, 2021, 12 pages.
Notice of Acceptance received for Australian Patent Application No. 2013209538, dated Mar. 2, 2016, 3 pages.
Notice of Allowance Action received for U.S. Appl. No. 15/187,463, dated Mar. 7, 2018, 10 pages.
Notice of Allowance received for Australian Patent Application No. 2012238304, dated Jan. 12, 2015, 2 pages.
Notice of Allowance received for Chinese Patent Application No. 201210436438.5, dated Mar. 2, 2017, 2 pages (1 page of English Translation and 1 page of Official Copy).
Notice of Allowance received for Chinese Patent Application No. 201380015521.8, dated Dec. 1, 2017, 2 pages (1 page of English Translation and 1 page of official copy).
Notice of Allowance received for Japanese Patent Application No. 2014-553464, dated Sep. 16, 2016, 3 pages (Official Copy only) See Communication under 37 CFR § 1.98(a) (3).
Notice of Allowance received for Japanese Patent Application No. 2015-209145, dated Apr. 2, 2018, 4 pages (1 page of English Translation and 3 pages of Official copy).
Notice of Allowance received for Japanese Patent Application No. 2016-160214, dated Mar. 30, 2018, 4 pages (1 page of English Translation and 3 pages of Official copy).
Notice of Allowance received for Japanese Patent Application No. 2012-224547, dated Sep. 24, 2015, 3 pages (Official Copy Only) See Communication under 37 CFR § 1.98(a) (3).
Notice of Allowance received for Korean Patent Application No. 10-2012-0133650, dated Oct. 24, 2014, 2 pages (Official Copy only) See Communication under 37 CFR § 1.98(a) (3).
Notice of Allowance received for Korean Patent Application No. 10-2014-0076290, dated Feb. 23, 2016, 3 pages (1 page of English Translation and 2 pages of Official Copy).
Notice of Allowance received for Korean Patent Application No. 10-2017-7010440, dated Feb. 10, 2020, 5 pages (2 pages of English Translation and 3 pages of Official Copy).
Notice of Allowance received for Korean Patent Application No. 10-2018-7032756, dated May 6, 2020, 4 pages (1 page of English Translation and 3 pages of Official Copy).
Notice of Allowance received for Korean Patent Application No. 10-2020-7021254, dated Aug. 2, 2021, 4 pages (2 pages of English Translation and 2 pages of Official Copy).

(56) References Cited

OTHER PUBLICATIONS

Notice of Allowance received for Taiwanese Patent Application No. 102102267, dated Mar. 13, 2018, 5 pages (2 pages of English Translation and 3 pages of Official Copy).
Notice of Allowance received for U.S. Appl. No. 13/744,343, dated Oct. 1, 2015, 13 pages.
Notice of Allowance received for U.S. Appl. No. 13/436,433, dated Apr. 11, 2014, 16 pages.
Notice of Allowance received for U.S. Appl. No. 14/183,395, dated Nov. 12, 2015, 8 pages.
Notice of Allowance received for U.S. Appl. No. 12/842,899, dated May 2, 2013, 6 pages.
Notice of Allowance received for U.S. Appl. No. 13/689,708, dated Mar. 16, 2015, 8 pages.
Notice of Allowance received for U.S. Appl. No. 13/744,343, dated Aug. 28, 2015, 16 pages.
Notice of Allowance received for U.S. Appl. No. 13/744,343, dated Feb. 17, 2016, 7 pages.
Notice of Allowance received for U.S. Appl. No. 13/744,349, dated Aug. 12, 2015, 9 pages.
Notice of Allowance received for U.S. Appl. No. 13/744,349, dated Oct. 17, 2014, 10 pages.
Notice of Allowance received for U.S. Appl. No. 14/015,512, dated Apr. 5, 2017, 7 pages.
Notice of Allowance received for U.S. Appl. No. 14/015,512, dated Jul. 18, 2017, 2 pages.
Notice of Allowance received for U.S. Appl. No. 14/015,512, dated Jul. 28, 2017, 3 pages.
Notice of Allowance received for U.S. Appl. No. 14/329,704, dated Apr. 21, 2017, 2 pages.
Notice of Allowance received for U.S. Appl. No. 14/329,704, dated Mar. 7, 2017, 16 pages.
Notice of Allowance received for U.S. Appl. No. 15/057,610, dated Nov. 21, 2018, 15 pages.
Notice of Allowance received for U.S. Appl. No. 15/995,044, dated Sep. 3, 2020, 6 pages.
Notice of Allowance received for U.S. Appl. No. 16/583,989, dated Apr. 1, 2021, 5 pages.
Notice of Allowance received for U.S. Appl. No. 16/583,989, dated Dec. 24, 2020, 7 pages.
Notice of Allowance received for U.S. Appl. No. 16/584,321, dated Aug. 25, 2020, 9 pages.
Notice of Allowance received for U.S. Appl. No. 16/584,347, dated Sep. 15, 2020, 9 pages.
Notice of Allowance received for U.S. Appl. No. 16/584,490, dated Aug. 27, 2020, 13 pages.
Notice of Allowance received for U.S. Appl. No. 16/584,490, dated Mar. 26, 2021, 13 pages.
Notice of Allowance received for U.S. Appl. No. 16/888,775, dated Jul. 26, 2021, 5 pages.
Notice of Allowance received for U.S. Appl. No. 16/888,775, dated Jun. 3, 2021, 11 pages.
Notice of Allowance received for U.S. Appl. No. 16/922,675, dated Jan. 21, 2021, 7 pages.
Notice of Allowance received for U.S. Appl. No. 16/922,675, dated Sep. 27, 2021, 10 pages.
Nozawa Naoki, "iPad Perfect Manual for iOS 4", First Edition Second Issue, Sotechsha Co., Ltd, Jun-Ichi Yanagisawa, Jan. 31, 2011, 5 pages (Official Copy only) See Communication under 37 CFR § 1.98(a) (3).
Numata Satoshi, "Advanced Guide to iOS 5 Programming", Answer Book iOS Programming First Edition, Shuwa System Co., Ltd., First Edition First Issue, Jan. 1, 2012, 5 pages.
Office Action received for Australian Patent Application No. 2012238304, dated Mar. 14, 2014, 4 pages.
Office Action Received for Australian Patent Application No. 2012238304, dated Sep. 25, 2013, 5 pages.
Office Action received for Australian Patent Application No. 2013209538, dated Apr. 21, 2015, 5 pages.
Office Action received for Australian Patent Application No. 2015202073, dated Jul. 29, 2016, 3 pages.
Office Action received for Australian Patent Application No. 2015202073, dated May 15, 2017, 3 pages.
Office Action received for Australian Patent Application No. 2016203731, dated Mar. 23, 2017, 4 pages.
Office Action received for Chinese Patent Application No. 201210436438.5, dated Jan. 28, 2016, 27 pages (15 pages of English Translation and 12 pages of Official Copy).
Office Action received for Chinese Patent Application No. 201210436438.5, dated Aug. 23, 2016, 6 pages (3 pages of English Translation and 3 pages of Official Copy).
Office Action received for Chinese Patent Application No. 201210436438.5, dated Jun. 24, 2015, 15 pages (3 pages of English Translation and 12 pages of Official copy).
Office Action received for Chinese Patent Application No. 201380015521.8, dated Apr. 1, 2017, 14 pages (3 pages of English Translation and 11 pages of Official Copy).
Office Action received for Chinese Patent Application No. 201380015521.8, dated Aug. 1, 2017., 6 pages (3 pages of English Translation and 3 pages of Official Copy).
Office Action received for Chinese Patent Application No. 201380015521.8, dated Jul. 27, 2016, 16 pages (3 pages of English Translation and 13 pages of Official copy).
Office Action received for European Patent Application No. 12188713.7, dated Nov. 15, 2016, 9 pages.
Office Action received for European Patent Application No. 13702856.9, dated Dec. 14, 2016, 9 pages.
Office Action received for European Patent Application No. 13702856.9, dated Sep. 18, 2018, 4 pages.
Office Action received for European Patent Application No. 19173909.3, dated Mar. 17, 2020, 6 pages.
Office Action received for Japanese Patent Application No. 2014-553464, dated Oct. 2, 2015, 10 pages (5 pages of English Translation and 5 pages of Official Copy).
Office Action received for Japanese Patent Application No. 2012-224547, dated Jan. 24, 2014, 7 pages (4 pages of English translation and 3 pages of Official copy).
Office Action received for Japanese Patent Application No. 2012-224547, dated Oct. 31, 2014, 7 pages (4 pages of English translation and 3 pages of Official copy).
Office Action received for Japanese Patent Application No. 2014-553464, dated Apr. 22, 2016, 6 pages (3 pages of English Translation and 3 pages of Official copy).
Office Action received for Japanese Patent Application No. 2015-209145, dated Nov. 7, 2016, 5 pages (2 pages of English Translation and 3 pages of Official Copy).
Office Action received for Japanese Patent Application No. 2015-209145, dated Sep. 11, 2017, 10 pages (5 pages of English Translation and 5 pages of Official Copy).
Office Action received for Japanese Patent Application No. 2016-160214, dated Jul. 3, 2017, 7 pages (3 pages of English Translation and 4 pages of Official Copy).
Office Action received for Korean Patent Application No. 10-2014-0076290, dated Aug. 20, 2015, 4 pages (1 page of English Translation & 3 pages of Official Copy).
Office Action received for Korean Patent Application No. 10-2014-7023252, dated Apr. 29, 2016, 9 pages (4 pages of English Translation and 5 pages of Official Copy).
Office Action received for Korean Patent Application No. 10-2014-7023252, dated Mar. 15, 2017, 10 pages (5 pages of English Translation and 5 pages of Official Copy).
Office Action received for Korean Patent Application No. 10-2014-7023252, dated Nov. 24, 2016, 8 pages (3 pages of English Translation and 5 pages of Official Copy).
Office Action received for Korean Patent Application No. 10-2014-7023252, dated Sep. 3, 2015, 9 pages (4 pages of English Translation and 5 pages of Official Copy).
Office Action received for Korean Patent Application No. 10-2017-7010440, dated Aug. 10, 2018, 7 pages (3 pages of English Translation and 4 pages of Official Copy).

(56) References Cited

OTHER PUBLICATIONS

Office Action received for Korean Patent Application No. 10-2017-7010440, dated Feb. 20, 2018, 10 pages (4 pages of English Translation and 6 pages of Official Copy).
Office Action received for Korean Patent Application No. 10-2018-7032756, dated Oct. 25, 2019, 10 pages (4 pages of English Translation and 6 pages of Official Copy).
Office Action received for Korean Patent Application No. 10-2020-7021254, dated Aug. 28, 2020, 10 pages (4 pages of English Translation and 6 pages of Official Copy).
Office Action received for Korean Patent Application No. 10-2020-7021254, dated Jun. 17, 2021, 7 pages (3 pages of English Translation and 4 pages of Official Copy).
Office Action received for Taiwanese Patent Application No. 102102267, dated Dec. 8, 2014, 10 pages (4 pages of English Translation and 6 pages of Official Copy).
Office Action received for Taiwanese Patent Application No. 102102267, dated May 7, 2015, 6 pages (Official Copy only) See Communication under 37 CFR § 1.98(a) (3).
Office Action received for Taiwanese Patent Application No. 102102267, dated Aug. 23, 2017, 6 pages (3 pages of English Translation and 3 pages of Official Copy).
Office Action received for Taiwanese Patent Application No. 102102267, dated Feb. 26, 2016, 6 pages (2 pages of English Translation and 4 pages of Official Copy).
Samsung, "Control an individual smart device on your watch", Online Available at: https://www.samsung.com/us/support/troubleshooting/TSG01003208/, Nov. 9, 2018, 1 page.
Samsung, "Problems with SmartThings on your Samsung Smartwatch", Online Available at: https://www.samsung.com/us/support/troubleshooting/TSG01003169/#smartthings-error-on-samsung-smartwatch, Nov. 9, 2018, 10 pages.
Samsung, "Samsung—User manual—Galaxy Watch", Online available at: https://content.abt.com/documents/90234/SM-R810NZDAXAR-use.pdf, Aug. 24, 2018, 102 pages.
Shima Toru, ""Galaxy Nexus" with Android 4.0 Released!", Ascii Media Works Co., Ltd., vol. 23, No. 860, Dec. 6, 2011, 5 pages.
Smart Home App—What is the Widget, Online Available at: https://support.vivint.com/s/article/Vivint-Smart-Home-App-What-is-the-Widget, Jan. 26, 2019, 4 pages.
Stroud, Forrest, "Screen Lock Meaning & Definition", Online Available at: https://www.webopedia.com/definitions/screen-lock, Jan. 30, 2014, 3 pages.
Supplemental Notice of Allowance received for U.S. Appl. No. 15/057,610, dated Jan. 17, 2019, 2 pages.
Supplemental Notice of Allowance received for U.S. Appl. No. 16/584,490, dated Apr. 13, 2021, 2 pages.
Xiao et al., "A Facial Presence Monitoring System for Information Security", IEEE Workshop on Computational Intelligence in Biometrics: Theory, Algorithms, and Applications, 2009, 8 pages.
Corrected Notice of Allowance received for U.S. Appl. No. 17/871,627, dated May 3, 2023, 2 pages.
International Preliminary Report on Patentability received for PCT Patent Application No. PCT/US2021/054470, dated Apr. 27, 2023, 9 pages.
Applicant-Initiated Interview Summary received for U.S. Appl. No. 17/489,508, dated Aug. 7, 2023, 5 pages.
Office Action received for Australian Patent Application No. 2022218540, dated Aug. 3, 2023, 5 pages.
Notice of Allowance received for Chinese Patent Application No. 202111646465.0, dated Feb. 6, 2023, 3 pages (1 page of English Translation and 2 pages of Official Copy).
Notice of Allowance received for U.S. Appl. No. 16/888,775, dated Feb. 21, 2023, 5 pages.
Cohn Emily, "Sonos Just Fixed the Most Annoying Thing About Its iPhone App", online available at <https://www.businessinsider.com/sonos-mobile-app-works-on-lock-screen-2016-6>, Jun. 27, 2016, 2 pages.
Fingas Jon, "Sonos Puts Speaker Controls On Your iPhone's Lock Screen", online available at <https://www.engadget.com/2016-06-21-sonos-ios-lock-screen-controls.html>, Jun. 21, 2016, 3 pages.
Invitation to Pay Additional Fees and Partial International Search Report received for PCT Patent Application No. PCT/US2022/032340, dated Nov. 21, 2022, 14 pages.
Kazmucha Allyson, "Sonos Controller App for iPhone and iPad Review", online available at https://www.imore.com/sonos-controller-app-iphone-and-ipad-review, Mar. 1, 2018, 4 pages.
Notice of Allowance received for U.S. Appl. No. 16/922,675, dated Dec. 8, 2022, 9 pages.
Final Office Action received for U.S. Appl. No. 17/489,508, dated Aug. 25, 2023, 29 pages.
Applicant-Initiated Interview Summary received for U.S. Appl. No. 17/108,944, dated Apr. 20, 2023, 2 pages.
Corrected Notice of Allowance received for U.S. Appl. No. 16/922,675, dated Apr. 14, 2023, 6 pages.
Corrected Notice of Allowance received for U.S. Appl. No. 17/871,627, dated Apr. 11, 2023, 3 pages.
Applicant-Initiated Interview Summary received for U.S. Appl. No. 17/108,944, dated Nov. 28, 2022, 2 pages.
Notice of Allowance received for Japanese Patent Application No. 2022-135126, dated Nov. 18, 2022, 4 pages (1 page of English Translation and 3 pages of Official Copy).
Extended European Search Report received for European Patent Application No. 22171322.5, dated Oct. 10, 2022, 8 pages.
Non-Final Office Action received for U.S. Appl. No. 17/489,508, dated Oct. 19, 2022, 20 pages.
Notice of Allowance received for U.S. Appl. No. 16/888,775, dated Oct. 19, 2022, 6 pages.
Hoffman Chris, "How to Ungroup Notifications on iPhone or iPad", Retrieved from the internet <URL: https://www.howtogeek.com/366566/how-to-ungroup-notifications-on-iphone-or-ipad/>, Sep. 17, 2018, 3 pages.
Applicant-Initiated Interview Summary received for U.S. Appl. No. 17/306,354, dated Jun. 28, 2023, 3 pages.
Non-Final Office Action received for U.S. Appl. No. 17/489,508, dated Jun. 21, 2023, 26 pages.
International Preliminary Report on Patentability received for PCT Patent Application No. PCT/US2021/056674, dated May 11, 2023, 7 pages.
Applicant-Initiated Interview Summary received for U.S. Appl. No. 17/489,508, dated Jun. 2, 2023, 4 pages.
Non-Final Office Action received for U.S. Appl. No. 17/306,354, dated Jun. 2, 2023, 21 pages.
Notice of Allowance received for Japanese Patent Application No. 2022-201453, dated Jun. 5, 2023, 4 pages (1 page of English Translation and 3 pages of Official Copy).
Applicant-Initiated Interview Summary received for U.S. Appl. No. 17/062,891, dated Apr. 5, 2022, 4 pages.
Applicant-Initiated Interview Summary received for U.S. Appl. No. 17/062,891, dated Nov. 22, 2021, 4 pages.
Corrected Notice of Allowance received for U.S. Appl. No. 16/922,675, dated Mar. 4, 2022, 6 pages.
Decision to Grant received for European Patent Application No. 19173909.3, dated Apr. 7, 2022, 3 pages.
Final Office Action received for U.S. Appl. No. 17/062,891, dated Jan. 3, 2022, 13 pages.
Intention to Grant received for European Patent Application No. 19173909.3, dated Dec. 8, 2021, 8 pages.
International Preliminary Report on Patentability received for PCT Patent Application No. PCT/US2020/025526, dated Dec. 9, 2021, 13 pages.
International Preliminary Report on Patentability received for PCT Patent Application No. PCT/US2020/035488, dated Dec. 9, 2021, 16 pages.
International Search Report and Written Opinion received for PCT Patent Application No. PCT/US2021/054470, dated Feb. 2, 2022, 12 pages.
International Search Report and Written Opinion received for PCT Patent Application No. PCT/US2021/056674, dated Jan. 26, 2022, 10 pages.

(56) References Cited

OTHER PUBLICATIONS

Non-Final Office Action received for U.S. Appl. No. 16/922,675, dated Jun. 8, 2022, 21 pages.
Notice of Acceptance received for Australian Patent Application No. 2020282362, dated Jan. 4, 2022, 3 pages.
Notice of Acceptance received for Australian Patent Application No. 2020285521, dated Mar. 15, 2022, 3 pages.
Notice of Acceptance received for Australian Patent Application No. 2022202458, dated May 6, 2022, 3 pages.
Notice of Allowance received for Japanese Patent Application No. 2021-563716, dated Mar. 14, 2022, 4 pages (1 page of English Translation and 3 pages of Official Copy).
Notice of Allowance received for Korean Patent Application No. 10-2021-7035472, dated Nov. 23, 2021, 4 pages (2 pages of English Translation and 2 pages of Official Copy).
Notice of Allowance received for Korean Patent Application No. 10-2021-7041874, dated Mar. 24, 2022, 4 pages (1 page of English Translation and 3 pages of Official Copy).
Notice of Allowance received for U.S. Appl. No. 16/888,775, dated Jan. 12, 2022, 5 pages.
Notice of Allowance received for U.S. Appl. No. 16/922,675, dated Feb. 10, 2022, 8 pages.
Notice of Allowance received for U.S. Appl. No. 17/062,891, dated Apr. 25, 2022, 9 pages.
Office Action received for Australian Patent Application No. 2020282362, dated Nov. 25, 2021, 3 pages.
Office Action received for Australian Patent Application No. 2020285521, dated Dec. 20, 2021, 3 pages.
Office Action received for Indian Patent Application No. 202118054338, dated Jun. 21, 2022, 5 pages.
Office Action received for Japanese Patent Application No. 2021-569562, dated May 13, 2022, 6 pages (3 pages of English Translation and 3 pages of Official Copy).
Office Action received for Korean Patent Application No. 10-2021-7036007, dated Dec. 24, 2021, 10 pages (4 pages of English Translation and 6 pages of Official Copy).
Office Action received for Korean Patent Application No. 10-2021-7036007, dated May 19, 2022, 11 pages (5 pages of English Translation and 6 pages of Official Copy).
Office Action received for Korean Patent Application No. 10-2021-7041874, dated Jan. 19, 2022, 5 pages (2 pages of English Translation and 3 pages of Official Copy).
Office Action received for Korean Patent Application No. 10-2022-7006175, dated May 27, 2022, 7 pages (3 pages of English Translation and 4 pages of Official Copy).
Corrected Notice of Allowance received for U.S. Appl. No. 16/922,675, dated Jan. 20, 2023, 3 pages.
Corrected Notice of Allowance received for U.S. Appl. No. 17/871,627, dated Feb. 8, 2023, 2 pages.
Final Office Action received for U.S. Appl. No. 17/108,944, dated Feb. 6, 2023, 19 pages.
Notice of Allowance received for Korean Patent Application No. 10-2021-7036007, dated Jan. 25, 2023, 7 pages (2 pages of English Translation and 5 pages of Official Copy).
Notice of Allowance received for Korean Patent Application No. 10-2022-7006175, dated Jan. 12, 2023, 7 pages (2 pages of English Translation and 5 pages of Official Copy).
Notice of Allowance received for U.S. Appl. No. 17/871,627, dated Jan. 20, 2023, 11 pages.
Corrected Notice of Allowance received for U.S. Appl. No. 17/062,891, dated Aug. 2, 2022, 2 pages.
Non-Final Office Action received for U.S. Appl. No. 17/108,944, dated Sep. 13, 2022, 17 pages.
Notice of Allowance received for Japanese Patent Application No. 2021-569562, dated Jul. 29, 2022, 4 pages (1 page of English Translation and 3 pages of Official Copy).
Notice of Allowance received for Japanese Patent Application No. 2022-079682, dated Jul. 15, 2022, 4 pages (1 page of English Translation and 3 pages of Official Copy).
Office Action received for European Patent Application No. 20720675.6, dated Sep. 8, 2022, 6 pages.
Extended European Search Report received for European Patent Application No. 23168537.1, dated Jul. 25, 2023, 13 pages.
Notice of Allowance received for U.S. Appl. No. 16/922,675, dated Jul. 19, 2023, 13 pages.
Notice of Allowance received for U.S. Appl. No. 17/306,354, dated Jul. 24, 2023, 7 pages.
Applicant-Initiated Interview Summary received for U.S. Appl. No. 16/922,675, dated Nov. 15, 2022, 2 pages.
Applicant-Initiated Interview Summary received for U.S. Appl. No. 17/489,508, dated Nov. 17, 2022, 6 pages.
Office Action received for Chinese Patent Application No. 202111646465.0, dated Oct. 21, 2022, 11 pages (6 pages of English Translation and 5 pages of Official Copy).
Corrected Notice of Allowance received for U.S. Appl. No. 16/922,675, dated Jan. 9, 2023, 3 pages.
Extended European Search Report received for European Patent Application No. 22195584.2, dated Jan. 5, 2023, 13 pages.
International Search Report and Written Opinion received for PCT Patent Application No. PCT/US2022/032340, dated Jan. 12, 2023, 18 pages.
Notice of Acceptance received for Australian Patent Application No. 2023201189, dated Nov. 2, 2023, 3 pages.
Office Action received for Japanese Patent Application No. 2022-129377, dated Nov. 10, 2023, 6 pages (3 pages of English Translation and 3 pages of Official Copy).
Office Action received for Australian Patent Application No. 2023201189, dated Sep. 8, 2023, 2 pages.
Applicant-Initiated Interview Summary received for U.S. Appl. No. 17/489,508, dated Oct. 12, 2023, 5 pages.
Intention to Grant received for European Patent Application No. 20720675.6, dated Oct. 5, 2023, 9 pages.
Notice of Acceptance received for Australian Patent Application No. 2022218540, dated Oct. 16, 2023, 3 pages.
Notice of Allowance received for Chinese Patent Application No. 202111483033.2, dated Oct. 7, 2023, 4 pages (1 page of English Translation and 3 pages of Official Copy).
International Preliminary Report on Patentability received for PCT Patent Application No. PCT/US2022/032340, dated Dec. 21, 2023, 13 pages.

* cited by examiner

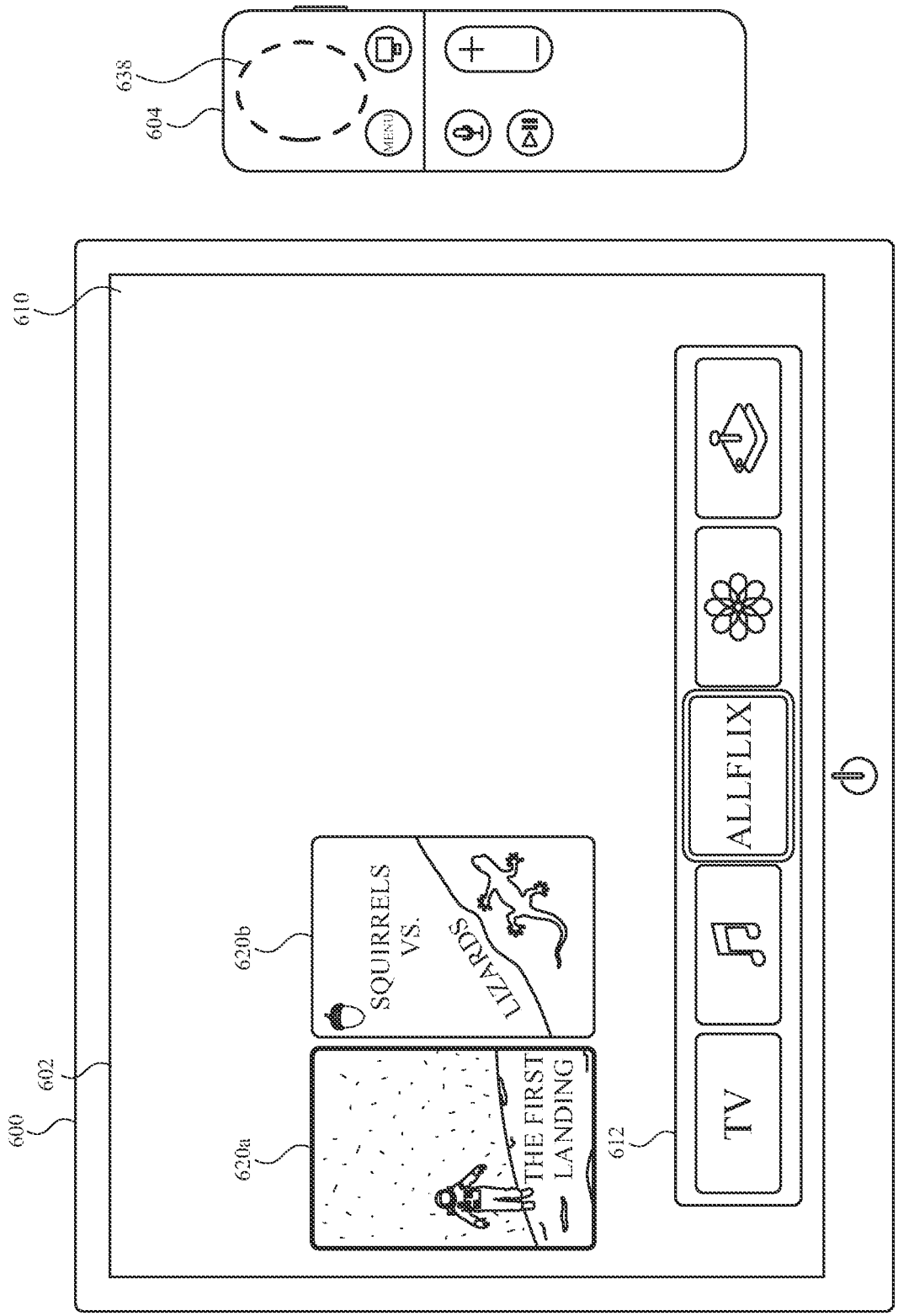

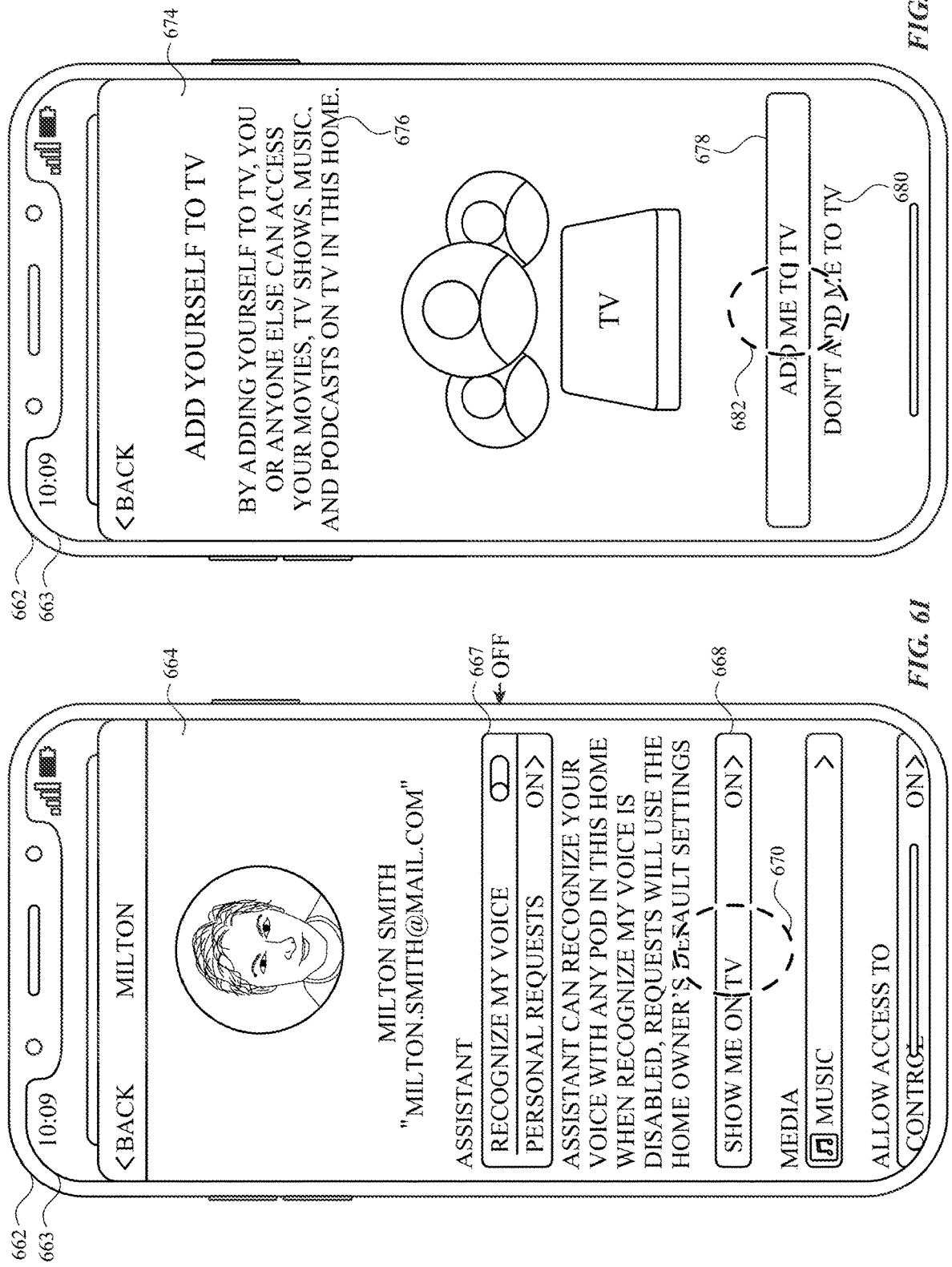

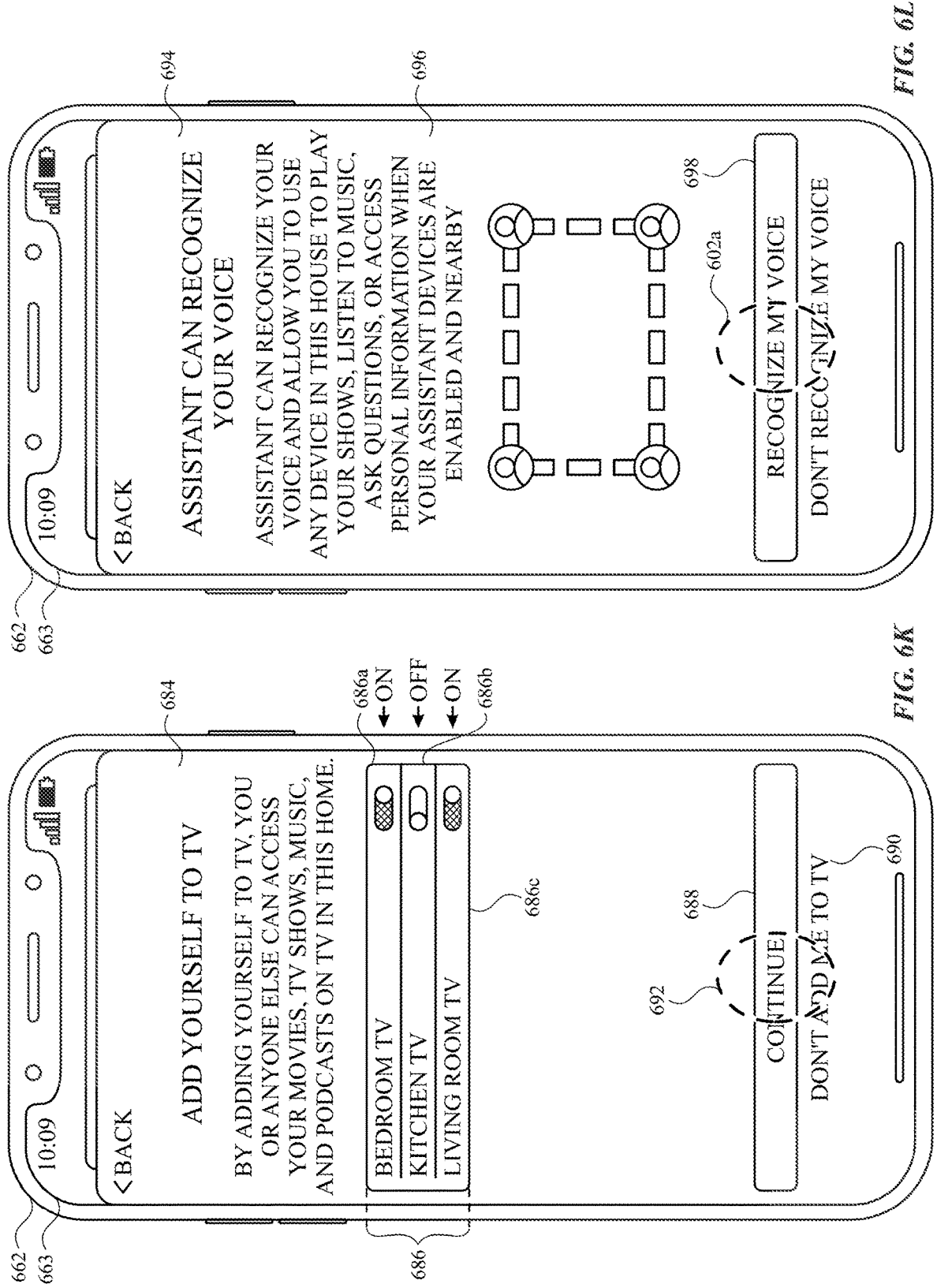

METHODS AND USER INTERFACES FOR VOICE-BASED USER PROFILE MANAGEMENT

CROSS-REFERENCE TO RELATED APPLICATIONS

This application claims priority to U.S. Provisional Application No. 63/197,475, entitled "METHODS AND USER INTERFACES FOR VOICE-BASED USER PROFILE MANAGEMENT," filed Jun. 6, 2021, the entire contents of which are hereby incorporated by reference.

FIELD

The present disclosure relates generally to computer user interfaces, and more specifically to techniques for managing user profiles.

BACKGROUND

User profiles implemented on computer systems provide a customized experience to each user of such systems. Each user's experiences may be tailored based on one or more user characteristics, such as user preferences or behavior.

BRIEF SUMMARY

Some techniques for managing user profiles using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing user profiles. Such methods and interfaces optionally complement or replace other methods for managing user profiles. Such methods and interfaces reduce the cognitive burden on a user and produce a more efficient human-machine interface. For battery-operated computing devices, such methods and interfaces conserve power and increase the time between battery charges.

Example methods are described herein. An example method includes, at a computer system in communication with a display generation component and one or more input devices: receiving, via the one or more input devices, a user input including a request to access a first restricted media item; and in response to receiving the user input: in accordance with a determination that the user input is a voice input and a determination that the voice input corresponds to a stored user profile that is authorized to access the first restricted media item using voice inputs, initiating playback of the first restricted media item; and in accordance with a determination that the user input is a voice input and a determination that the voice input does not correspond to a stored user profile that is authorized to access the first restricted media item using voice inputs: forgoing initiating playback of the first restricted media item; and causing display, at the display generation component, of a validation user interface.

An example method includes, at a computer system in communication with a display generation component and a voice input device: while a first user profile is active, receiving, via the voice input device, a voice input; and in response to receiving the voice input: in accordance with a determination that the voice input includes a request to switch user profiles, and a determination that the voice input corresponds to a second user profile, switching from the first user profile to the second user profile; and in accordance with a determination that the voice input includes a request to switch user profiles, and a determination that the voice input does not correspond to a stored user profile: forgoing switching user profiles; and causing display, at the display generation component, of a disambiguation user interface that includes a plurality of candidate user profiles.

Example non-transitory computer-readable storage media are described herein. An example non-transitory computer-readable storage medium stores one or more programs configured to be executed by one or more processors of a computer system that is in communication with a display generation component and one or more input devices and includes instructions for: receiving, via the one or more input devices, a user input including a request to access a first restricted media item; and in response to receiving the user input: in accordance with a determination that the user input is a voice input and a determination that the voice input corresponds to a stored user profile that is authorized to access the first restricted media item using voice inputs, initiating playback of the first restricted media item; and in accordance with a determination that the user input is a voice input and a determination that the voice input does not correspond to a stored user profile that is authorized to access the first restricted media item using voice inputs: forgoing initiating playback of the first restricted media item; and causing display, at the display generation component, of a validation user interface.

An example non-transitory computer-readable storage medium stores one or more programs configured to be executed by one or more processors of a computer system that is in communication with a display generation component and a voice device, the one or more programs including instructions for: while a first user profile is active, receiving, via the voice input device, a voice input; and in response to receiving the voice input: in accordance with a determination that the voice input includes a request to switch user profiles, and a determination that the voice input corresponds to a second user profile, switching from the first user profile to the second user profile; and in accordance with a determination that the voice input includes a request to switch user profiles, and a determination that the voice input does not correspond to a stored user profile: forgoing switching user profiles; and causing display, at the display generation component, of a disambiguation user interface that includes a plurality of candidate user profiles.

Example transitory computer-readable storage media are described herein. An example non-transitory computer-readable storage medium stores one or more programs configured to be executed by one or more processors of a computer system that is in communication with a display generation component and one or more input devices and includes instructions for: receiving, via the one or more input devices, a user input including a request to access a first restricted media item; and in response to receiving the user input: in accordance with a determination that the user input is a voice input and a determination that the voice input corresponds to a stored user profile that is authorized to access the first restricted media item using voice inputs, initiating playback of the first restricted media item; and in accordance with a determination that the user input is a voice input and a determination that the voice input does not correspond to a stored user profile that is authorized to access the first restricted media item using voice inputs: forgoing initiating playback of the first restricted media item; and causing display, at the display generation component, of a validation user interface.

An example transitory computer-readable storage medium stores one or more programs configured to be executed by one or more processors of a computer system that is in communication with a display generation component and a voice device, the one or more programs including instructions for: while a first user profile is active, receiving, via the voice input device, a voice input; and in response to receiving the voice input: in accordance with a determination that the voice input includes a request to switch user profiles, and a determination that the voice input corresponds to a second user profile, switching from the first user profile to the second user profile; and in accordance with a determination that the voice input includes a request to switch user profiles, and a determination that the voice input does not correspond to a stored user profile: forgoing switching user profiles; and causing display, at the display generation component, of a disambiguation user interface that includes a plurality of candidate user profiles.

Example computer systems are described herein. An example computer system is configured to communicate with a display generation component and one or more input devices and includes: one or more processors; and memory storing one or more programs configured to be executed by the one or more processors, the one or more programs including instructions for: receiving, via the one or more input devices, a user input including a request to access a first restricted media item; and in response to receiving the user input: in accordance with a determination that the user input is a voice input and a determination that the voice input corresponds to a stored user profile that is authorized to access the first restricted media item using voice inputs, initiating playback of the first restricted media item; and in accordance with a determination that the user input is a voice input and a determination that the voice input does not correspond to a stored user profile that is authorized to access the first restricted media item using voice inputs: forgoing initiating playback of the first restricted media item; and causing display, at the display generation component, of a validation user interface.

An example computer system is configured to communicate with a display generation component and a voice input device and includes one or more processors; and memory storing one or more programs configured to be executed by the one or more processors, the one or more programs including instructions for: while a first user profile is active, receiving, via the voice input device, a voice input; and in response to receiving the voice input: in accordance with a determination that the voice input includes a request to switch user profiles, and a determination that the voice input corresponds to a second user profile, switching from the first user profile to the second user profile; and in accordance with a determination that the voice input includes a request to switch user profiles, and a determination that the voice input does not correspond to a stored user profile: forgoing switching user profiles; and causing display, at the display generation component, of a disambiguation user interface that includes a plurality of candidate user profiles.

An example computer system is configured to communicate with a display generation component and one or more input devices and includes means for receiving, via the one or more input devices, a user input including a request to access a first restricted media item; and means for, in response to receiving the user input: in accordance with a determination that the user input is a voice input and a determination that the voice input corresponds to a stored user profile that is authorized to access the first restricted media item using voice inputs, initiating playback of the first restricted media item; and in accordance with a determination that the user input is a voice input and a determination that the voice input does not correspond to a stored user profile that is authorized to access the first restricted media item using voice inputs: forgoing initiating playback of the first restricted media item; and causing display, at the display generation component, of a validation user interface.

An example computer system is configured to communicate with a display generation component and a voice input device and includes means for, while a first user profile is active, receiving, via the voice input device, a voice input; and means for, in response to receiving the voice input: in accordance with a determination that the voice input includes a request to switch user profiles, and a determination that the voice input corresponds to a second user profile, switching from the first user profile to the second user profile; and in accordance with a determination that the voice input includes a request to switch user profiles, and a determination that the voice input does not correspond to a stored user profile: forgoing switching user profiles; and causing display, at the display generation component, of a disambiguation user interface that includes a plurality of candidate user profiles.

Example computer program products are described herein. An example computer program product includes one or more programs configured to be executed by one or more processors of a computer system that is in communication with a display generation component and one or more input devices, the one or more programs including instructions for: receiving, via the one or more input devices, a user input including a request to access a first restricted media item; and in response to receiving the user input: in accordance with a determination that the user input is a voice input and a determination that the voice input corresponds to a stored user profile that is authorized to access the first restricted media item using voice inputs, initiating playback of the first restricted media item; and in accordance with a determination that the user input is a voice input and a determination that the voice input does not correspond to a stored user profile that is authorized to access the first restricted media item using voice inputs: forgoing initiating playback of the first restricted media item; and causing display, at the display generation component, of a validation user interface.

An example computer program product includes one or more programs configured to be executed by one or more processors of a computer system that is in communication with a display generation component and a voice input device, the one or more programs including instructions for: while a first user profile is active, receiving, via the voice input device, a voice input; and in response to receiving the voice input: in accordance with a determination that the voice input includes a request to switch user profiles, and a determination that the voice input corresponds to a second user profile, switching from the first user profile to the second user profile; and in accordance with a determination that the voice input includes a request to switch user profiles, and a determination that the voice input does not correspond to a stored user profile: forgoing switching user profiles; and causing display, at the display generation component, of a disambiguation user interface that includes a plurality of candidate user profiles.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing user profiles, thereby increasing the effectiveness, efficiency, and user satisfaction with such devices. Such methods and interfaces may complement or replace other methods for managing user profiles.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 6A-6M illustrate exemplary user interfaces for providing media content in accordance with some embodiments.

DESCRIPTION OF EMBODIMENTS

Figure 1A:
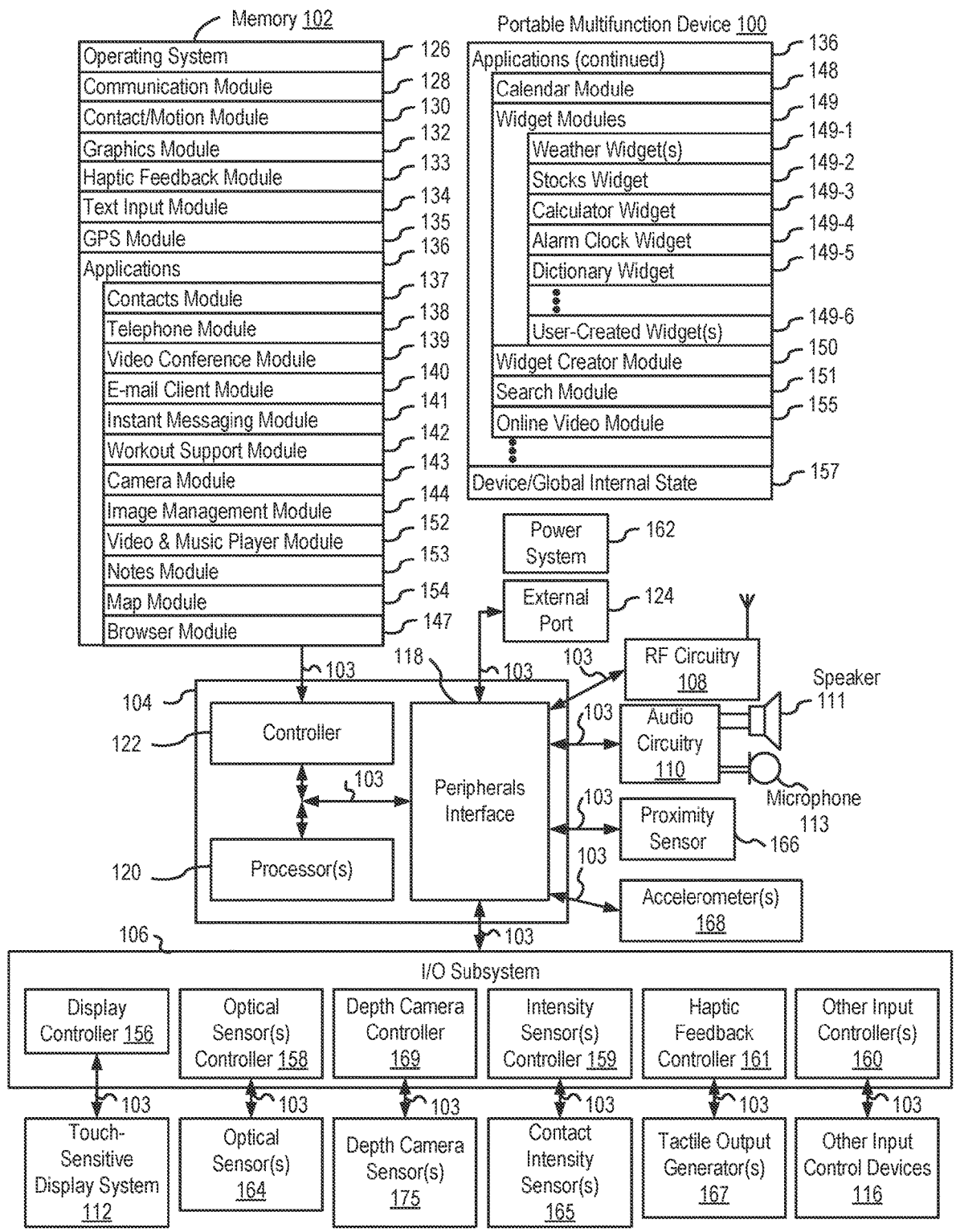
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for computer systems (e.g., electronic devices) that provide efficient methods and interfaces for managing user profiles. For example, computer systems, such as those described herein may provide a manner in which users may initiate playback of media items and/or switch profiles using voice inputs. Such techniques can reduce the cognitive burden on a user who requests access to media content and/or a user profile, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing event notifications. FIGS. 6A-6M illustrate exemplary user interfaces for providing media content. FIG. 7 is a flow diagram illustrating methods of providing media content in accordance with some embodiments. The user interfaces in FIGS. 6A-6M are used to illustrate the processes described below, including the processes in FIG. 7. FIGS. 8A-8E illustrate exemplary user interfaces for switching user profiles. FIG. 9 is a flow diagram illustrating methods of switching user profiles in accordance with some embodiments. The user interfaces in FIGS. 8A-8E are used to illustrate the processes described below, including the processes in FIG. 9.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
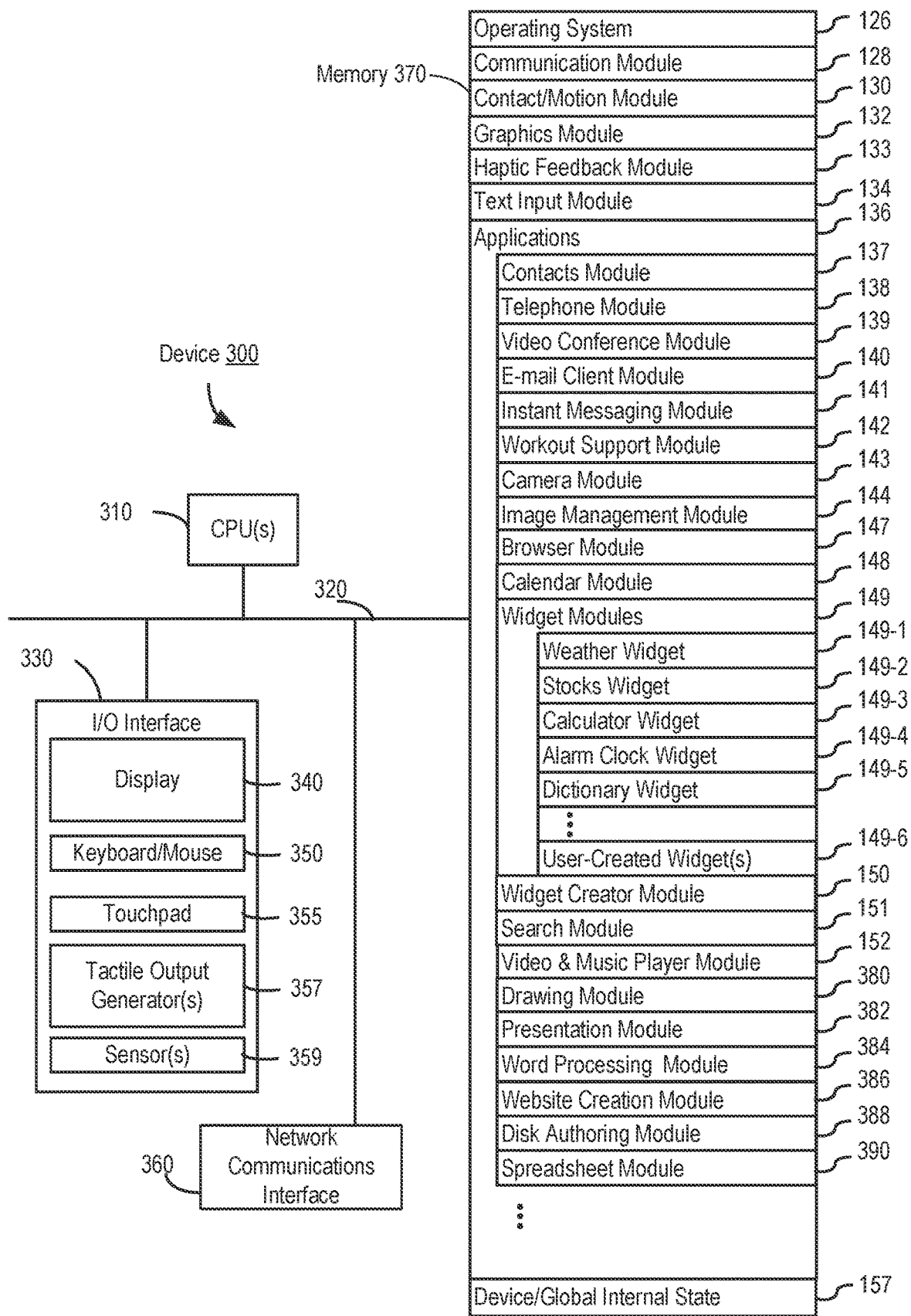
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
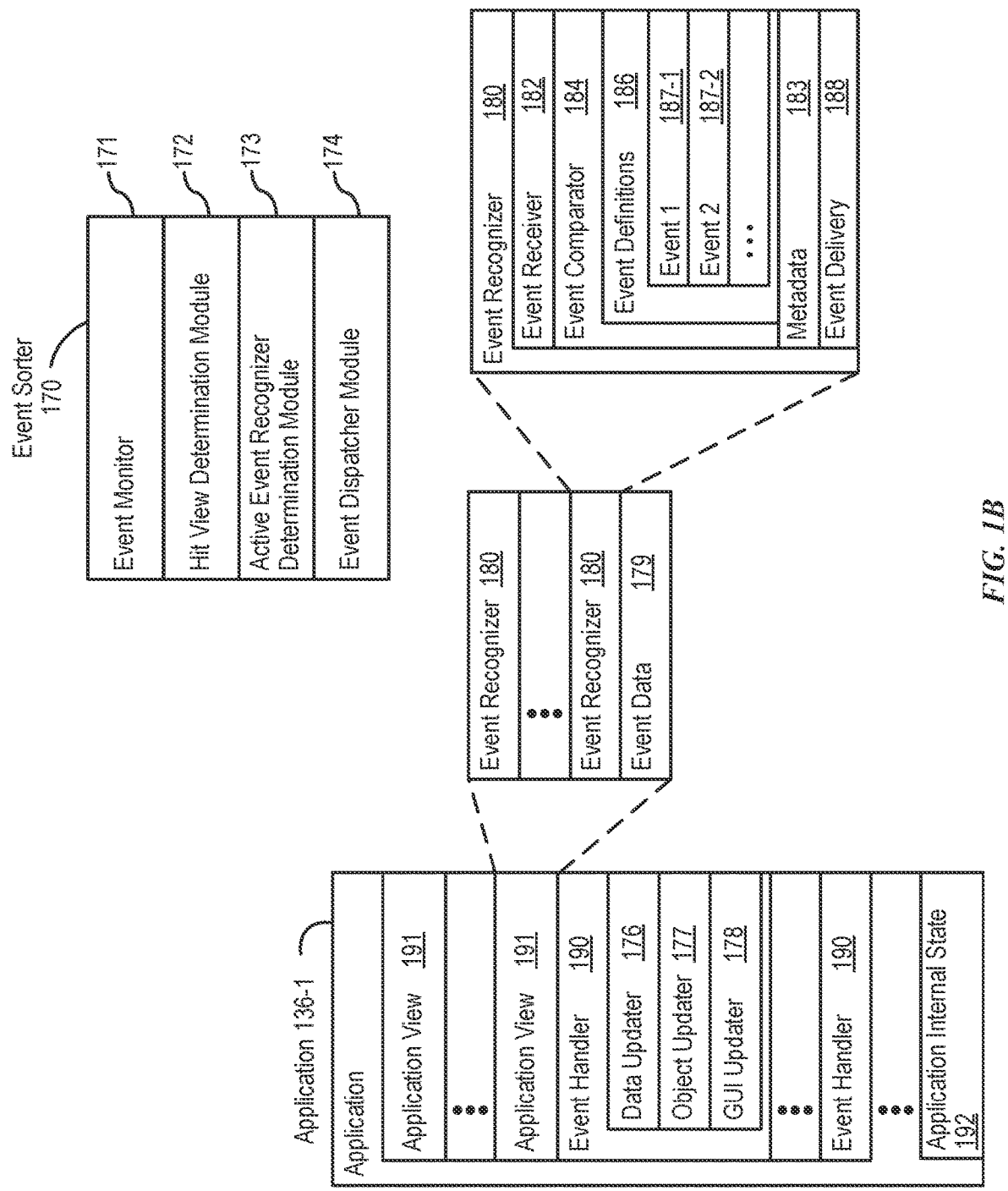
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
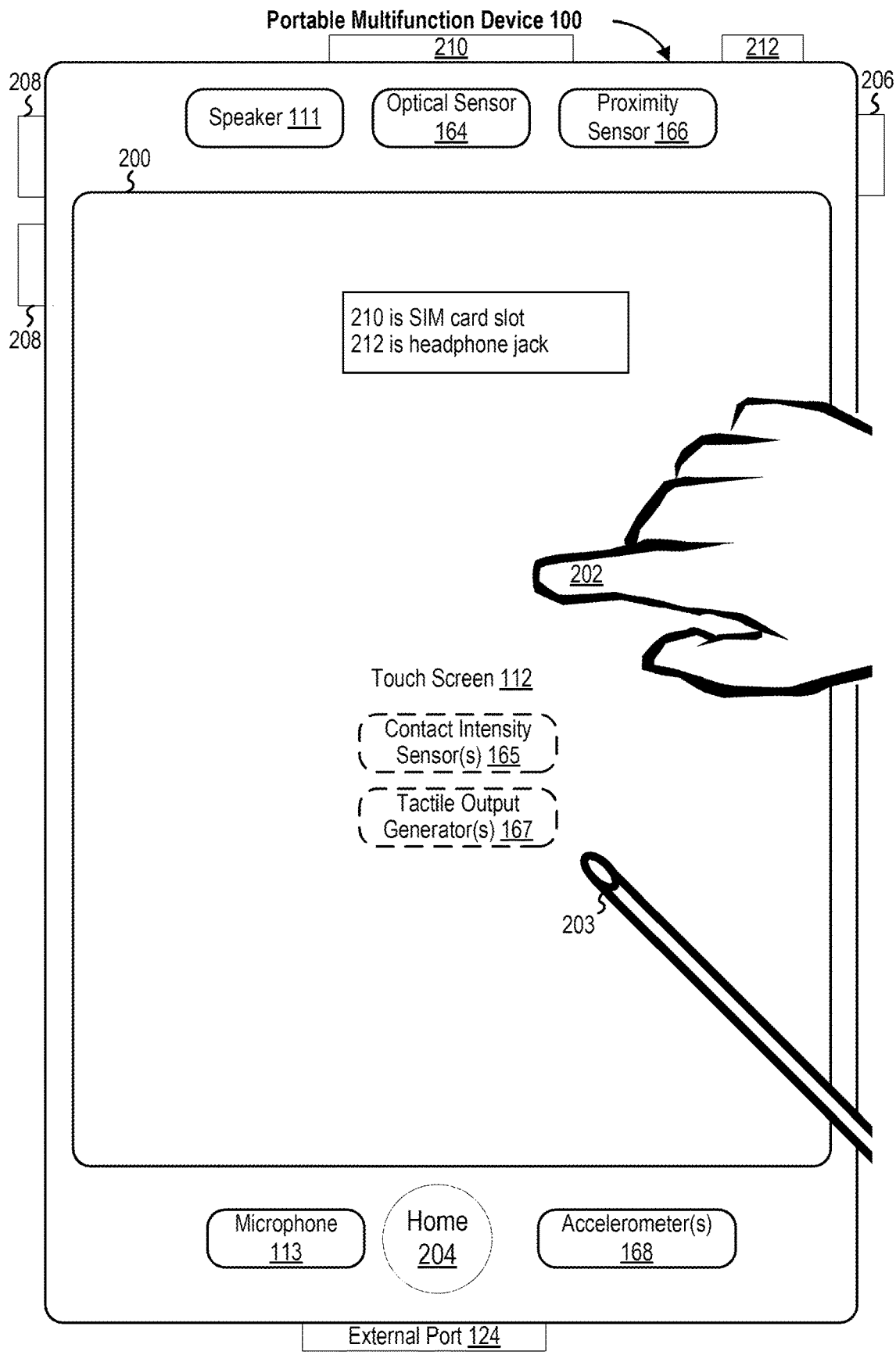
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
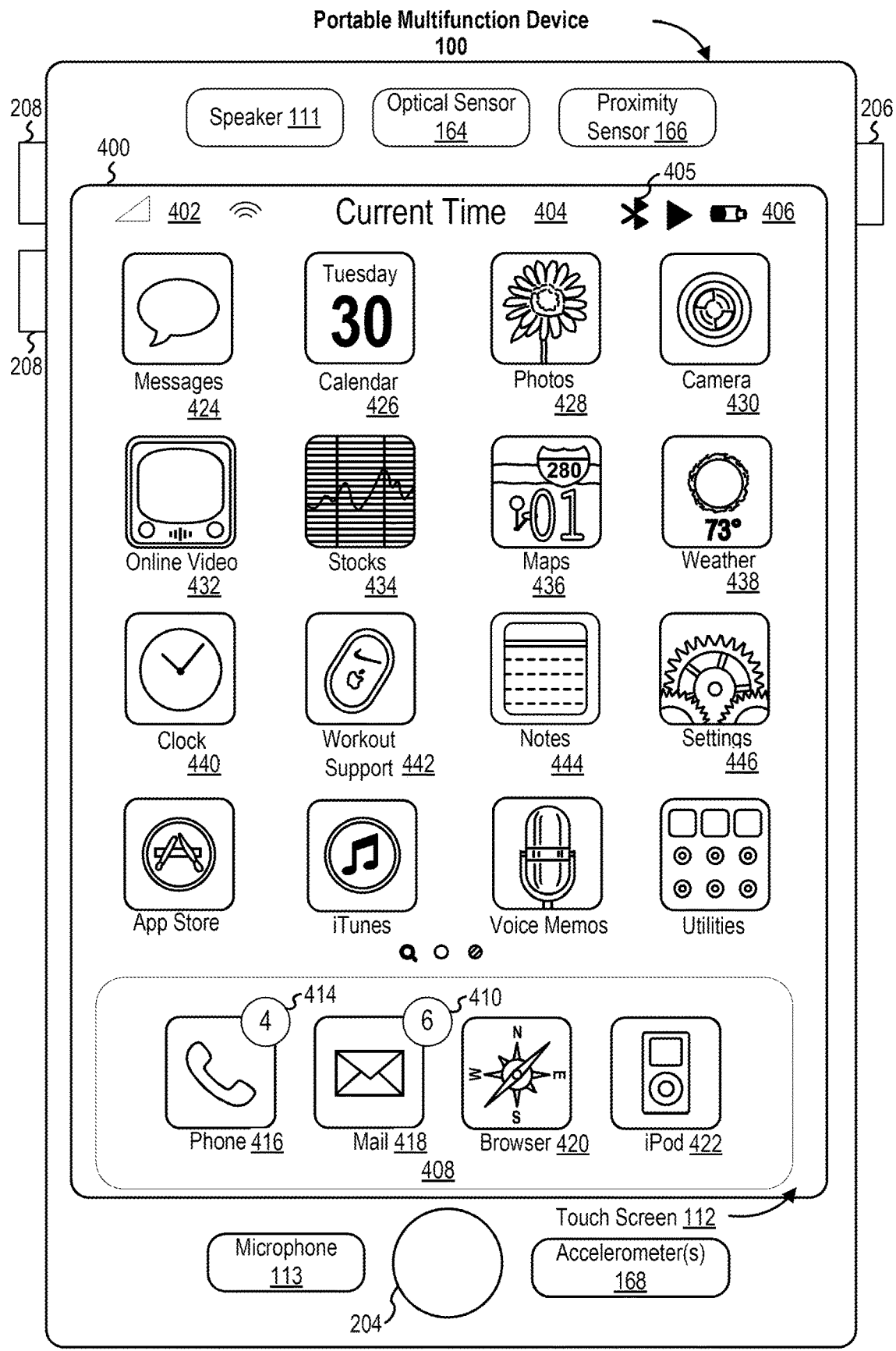
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
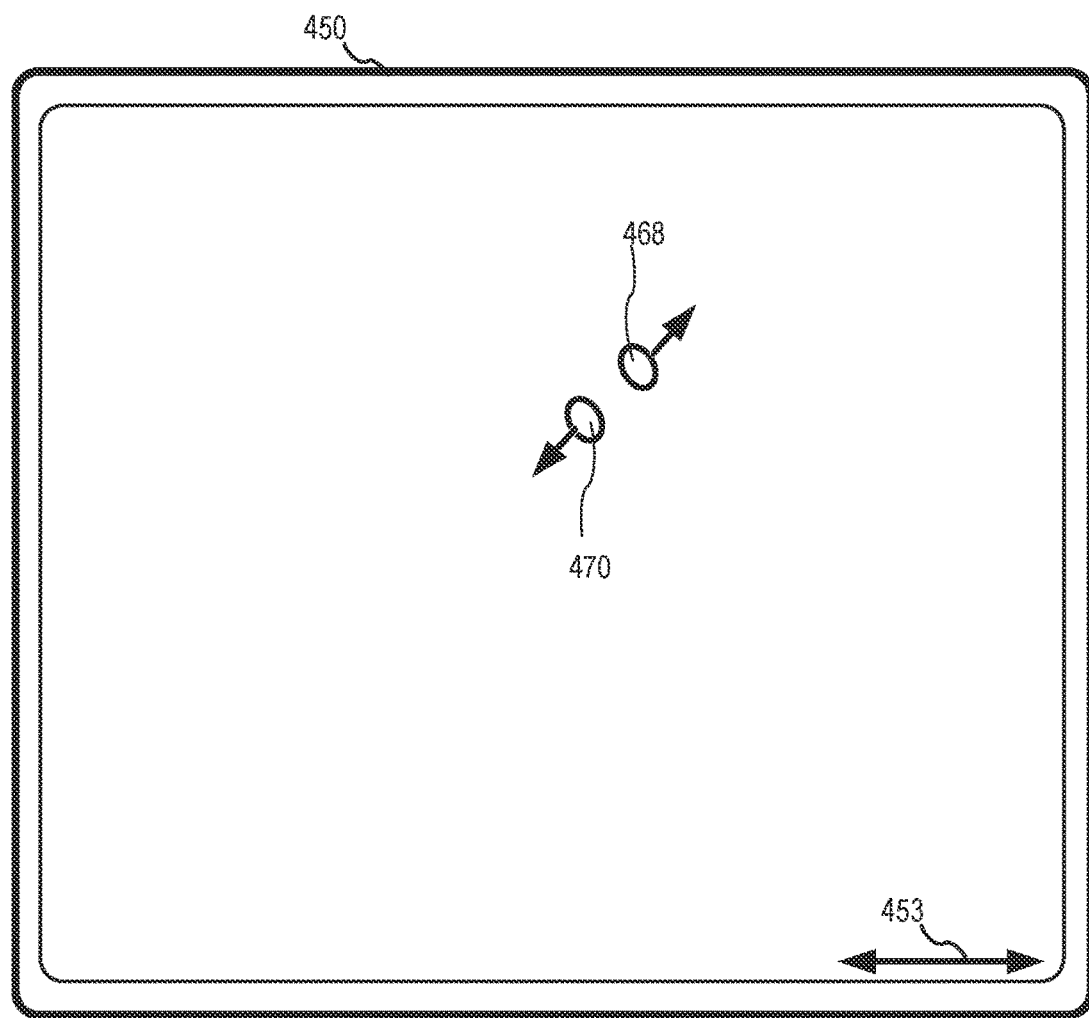
FIG. 4B illustrates an exemplary user interface for a multifunction device with a touch-sensitive surface that is separate from the display in accordance with some embodiments.
Figure 4B:
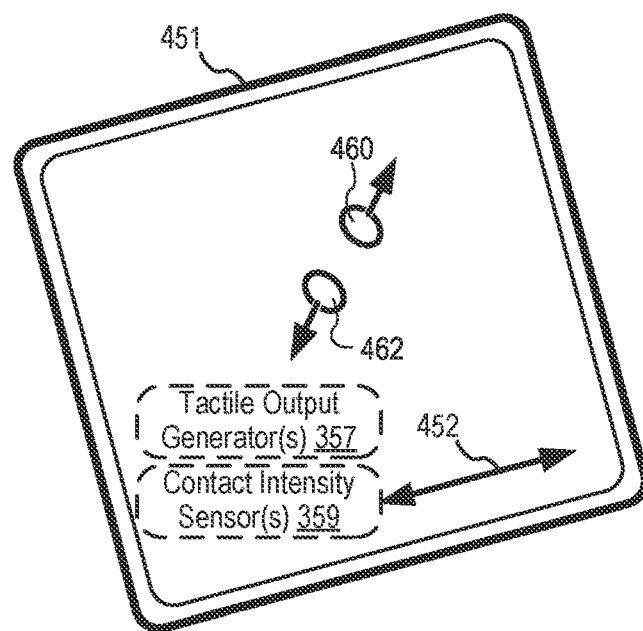

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
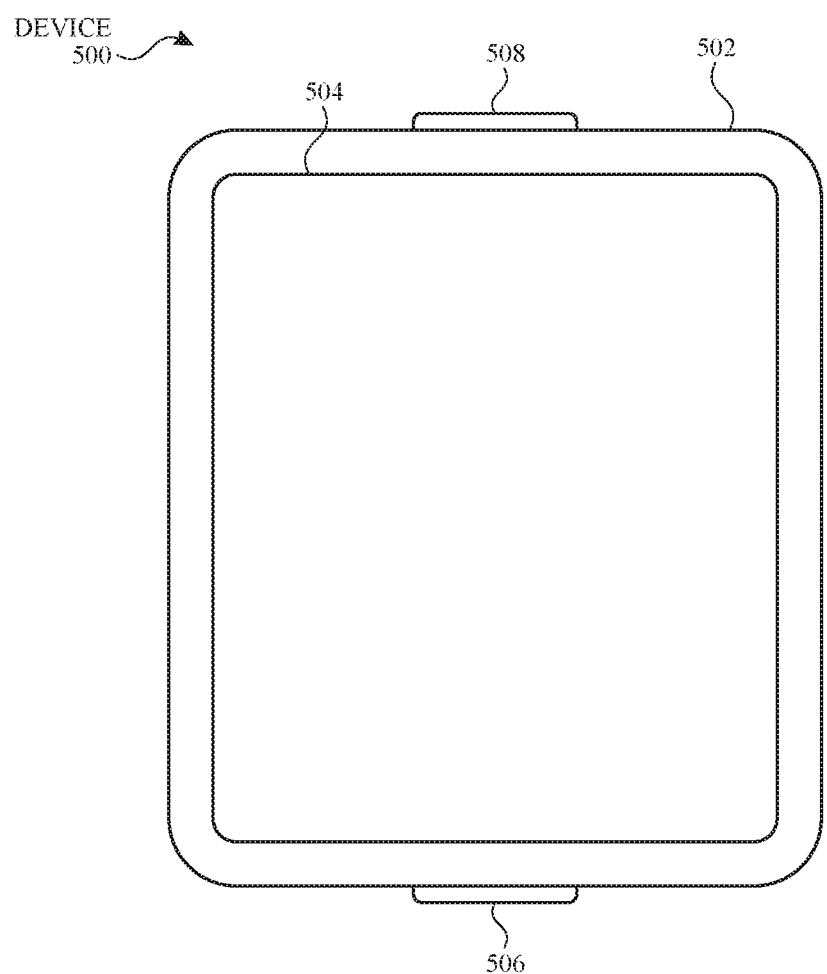
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
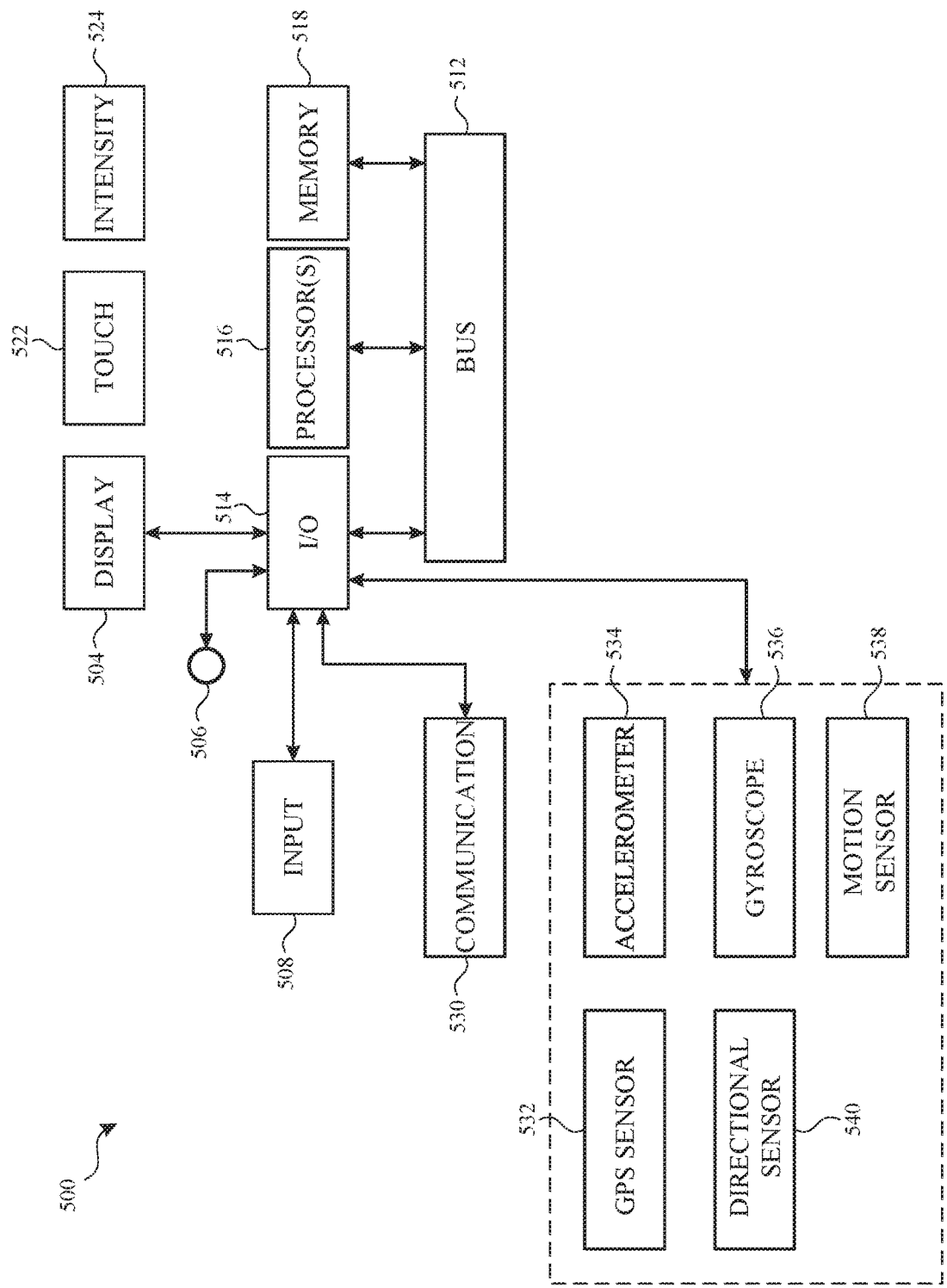
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 (FIG. 7) and 900 (FIG. 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6M illustrate exemplary devices and user interfaces for providing media content, in accordance with some embodiments. The user interfaces in these figures are used to illustrate the processes described below, including the processes in FIG. 7.

In the examples described in FIGS. 6A-6M, a device 600 (e.g., a device having one or more features of device 100, 300, and/or 500) causes display, on display 602, of the user interfaces described below. In some embodiments, display 602 is an integrated part of device 600. In some embodiments, device 600 is a separate digital media player (e.g., set top box) that is in communication (e.g., wireless, wired) with display 602.

In some embodiments, device 600 is connected to a remote control 604, which is configured to transmit data (e.g., via RF communication, via Bluetooth, via infrared) to device 600 based on user input (e.g., voice input, tactile input) detected at remote control 604. Remote control 604 includes a selection region 604a, which includes a touch-sensitive surface for detecting tap, press, and swipe gestures, a menu button 604b, a television button 604c, a microphone button 604d, a play/pause button 604e, and volume control buttons 604f.

Figure 6A:
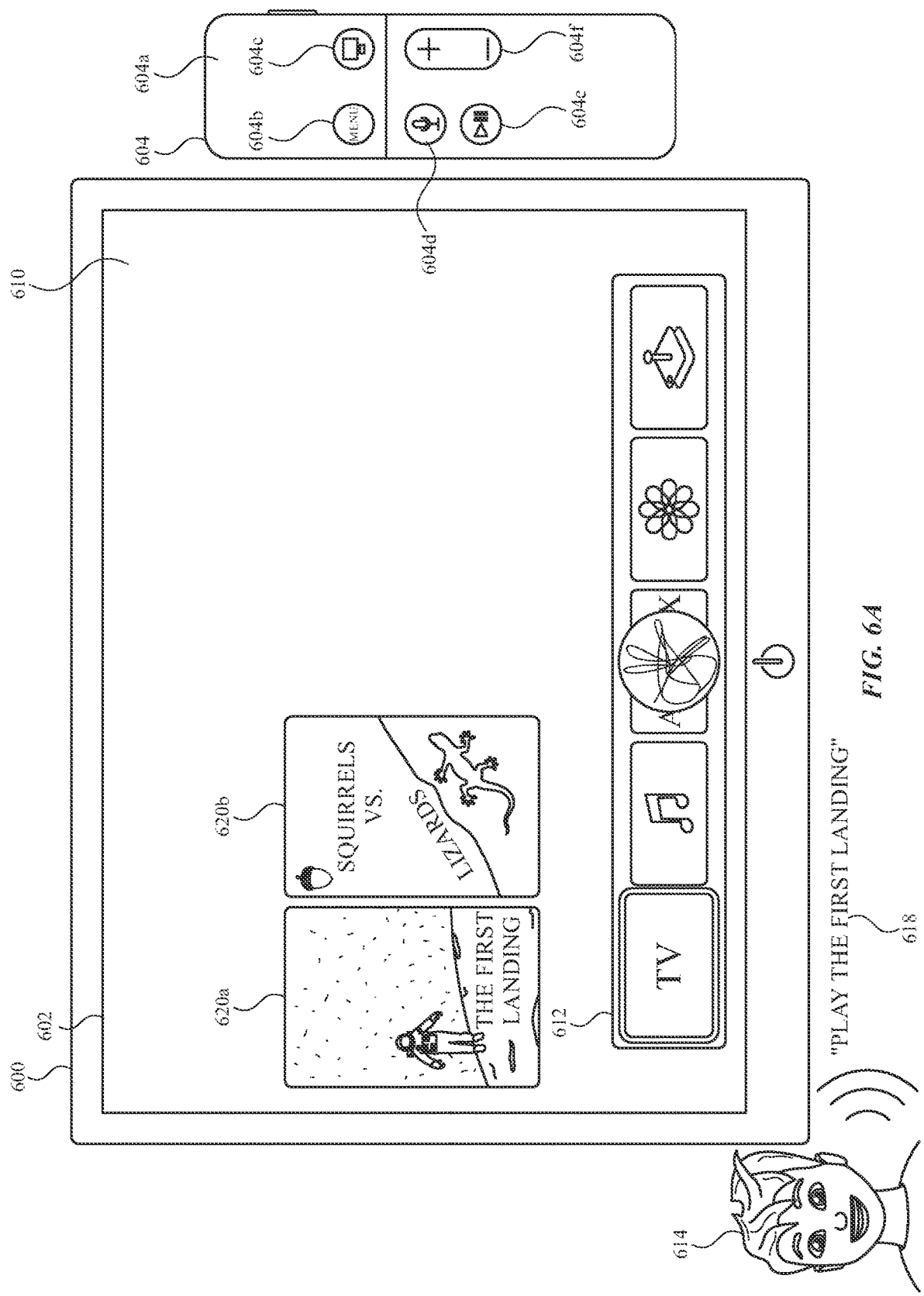
Figure 7:
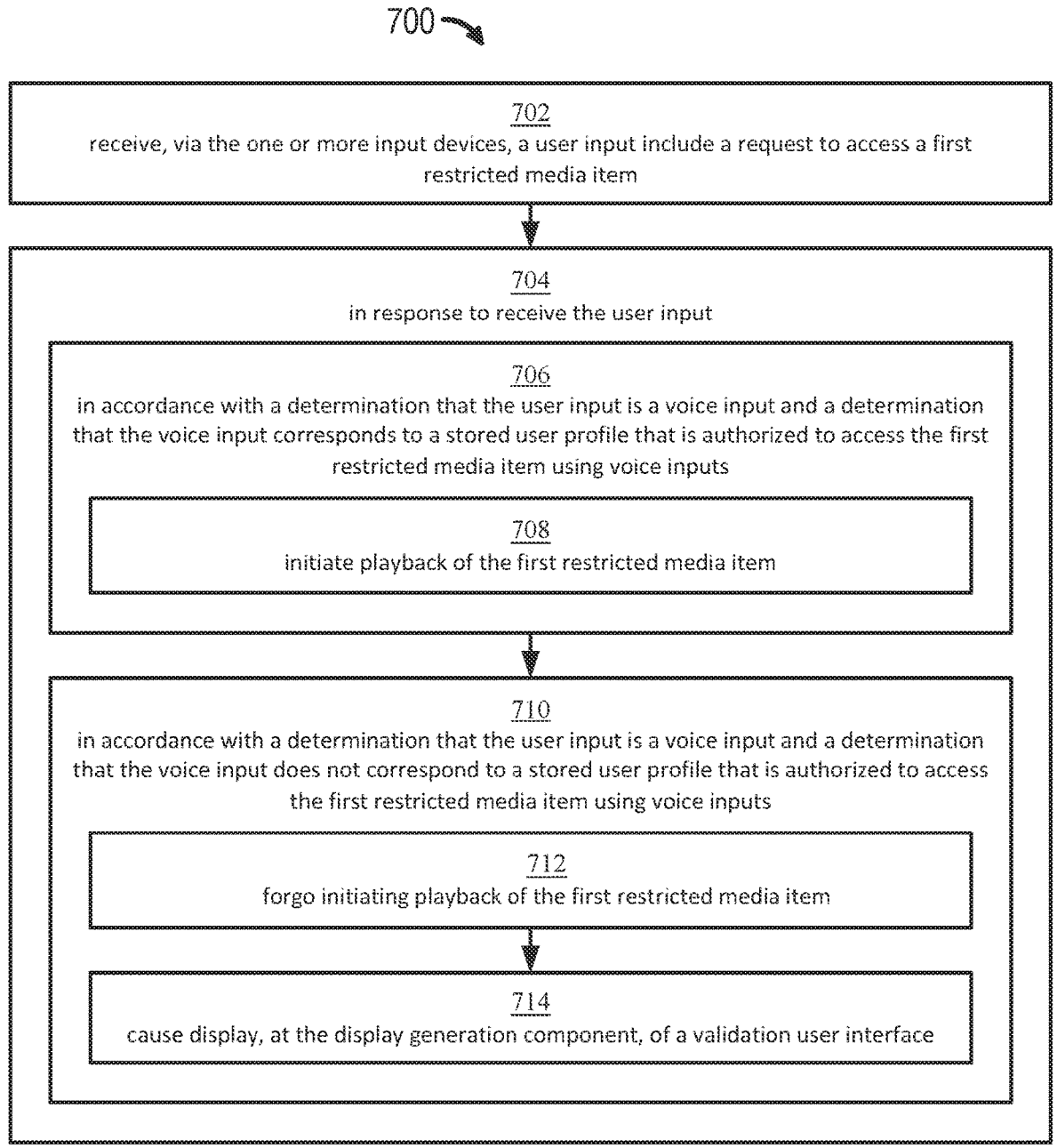
FIG. 7 is a flowchart of a process for providing media content in accordance with some embodiments.

At FIG. 6A, device 600 (e.g., a smart television) is causing display, on display 602 (e.g., the integrated screen of device 600), home interface 610. In some embodiments, device 600 is a digital media player in communication with (e.g., connected to) display 602 (e.g., a television). Home interface 610 includes applications 612. In some embodiments, applications 612 include one or more one or more applications that may be used on device 600 to provide content (e.g., media items). Home interface 610 further includes media items 620a, 620b. In some embodiments, one or more of media items 620 are recommended media items or media items selected by device 600 based on user preferences and/or previous user behavior.

While device 600 causes display of home interface 610, device 600 receives, from user 614, user input 618 ("Play The First Landing") requesting device 600 to initiate playback of restricted media item 620a "The First Landing". In response to the user input, device 600 determines whether user input 618 is a voice input. If user input 618 is a voice input, device 600 determines whether voice input 618 matches a user profile of device 600 (e.g., a user profile stored on device 600), and if so, whether the user profile is authorized to access requested media item 620a. In some embodiments, determining whether voice input 618 matches a user profile of device 600 includes determining whether voice input 618 matches a voice profile of a user profile of device 600. The voice profile includes one or more voice models which can be used to detect (e.g., identify) a voice of a user associated with the voice profile.

Figure 6B:
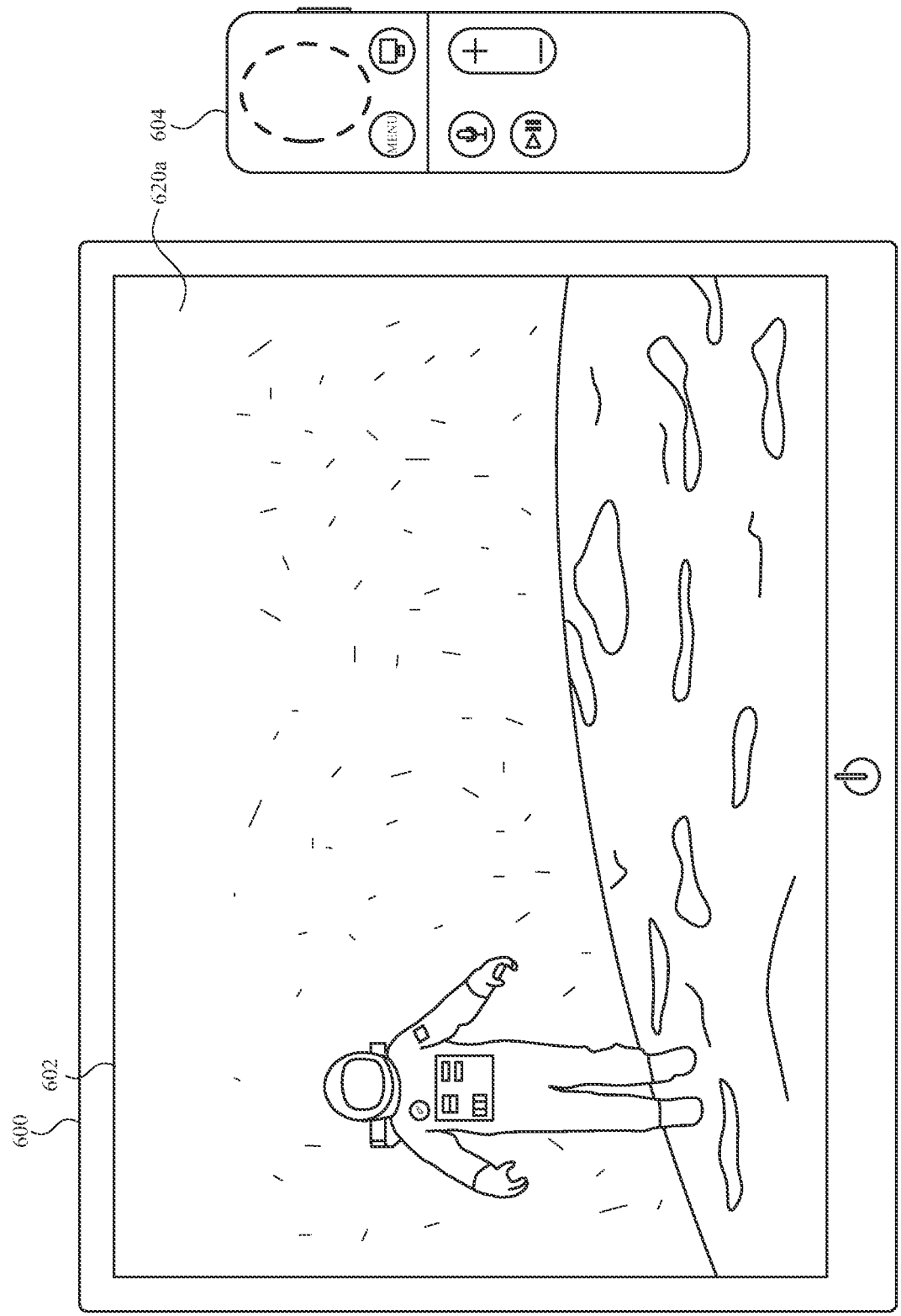

As shown in FIG. 6B, if device 600 determines that voice input 618 matches a user profile authorized to access requested media item 620a, device 600 initiates playback of media item 620a.

Figure 6C:
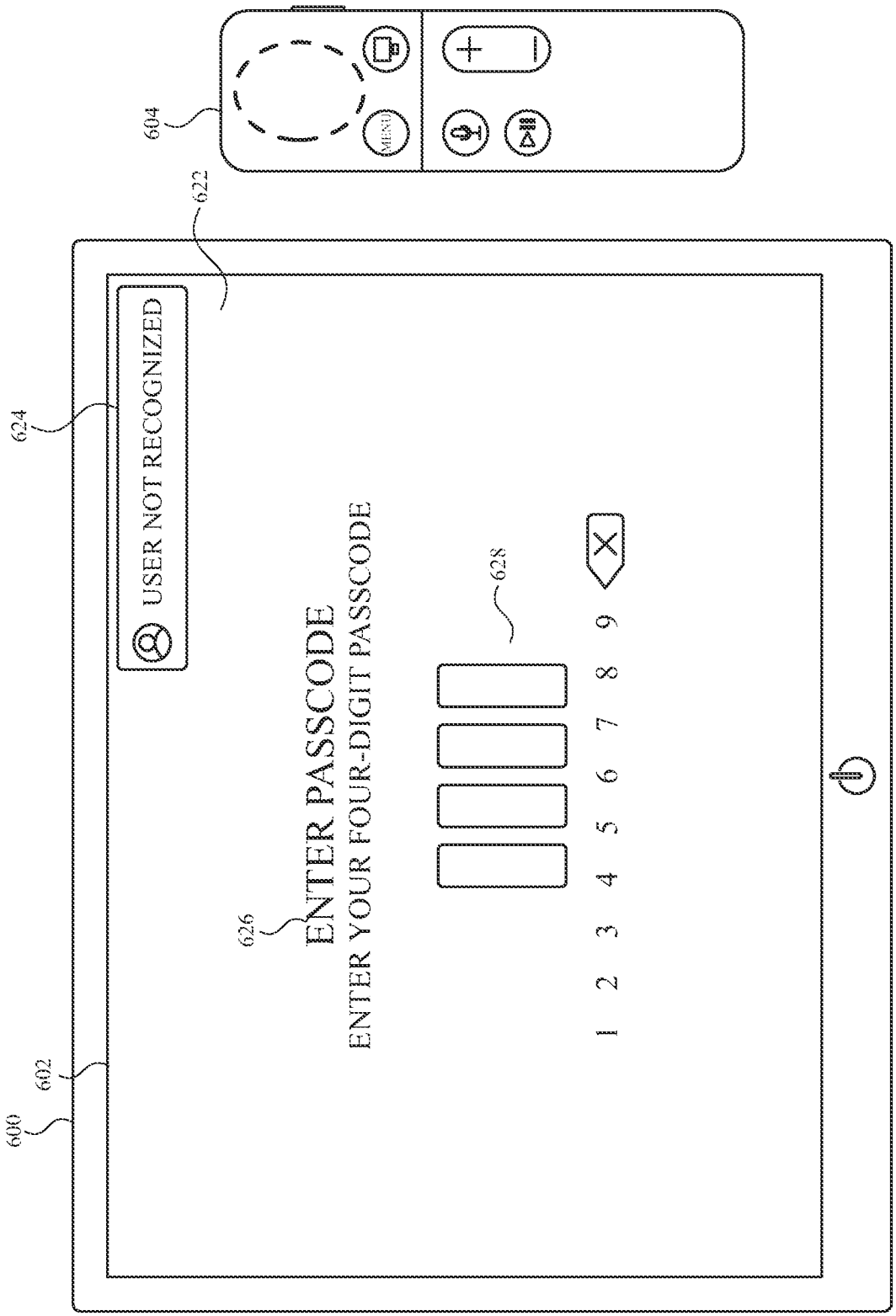

If device 600 determines that voice input 618 does not match a user profile, device 600 causes display 602 to display (e.g., replace display of home interface 610 with) passcode interface 622, as shown in FIG. 6C. Passcode interface 622 includes notifications, 624, 626, and field 628. Notification 624 indicates that voice input 618 could not be matched to any user profiles of device 600 (e.g., "User not recognized"). Notification 626 indicates that an alternative form of authentication can be used to access media item 620a. For example, notification 626 indicates that a user can enter a passcode (e.g., password) in field 628 to access media item 620a. If a valid passcode is provided for a user profile authorized to view requested media item 620a, device 600 initiates playback of media item 620a, as shown in FIG. 6B.

Figure 6D:
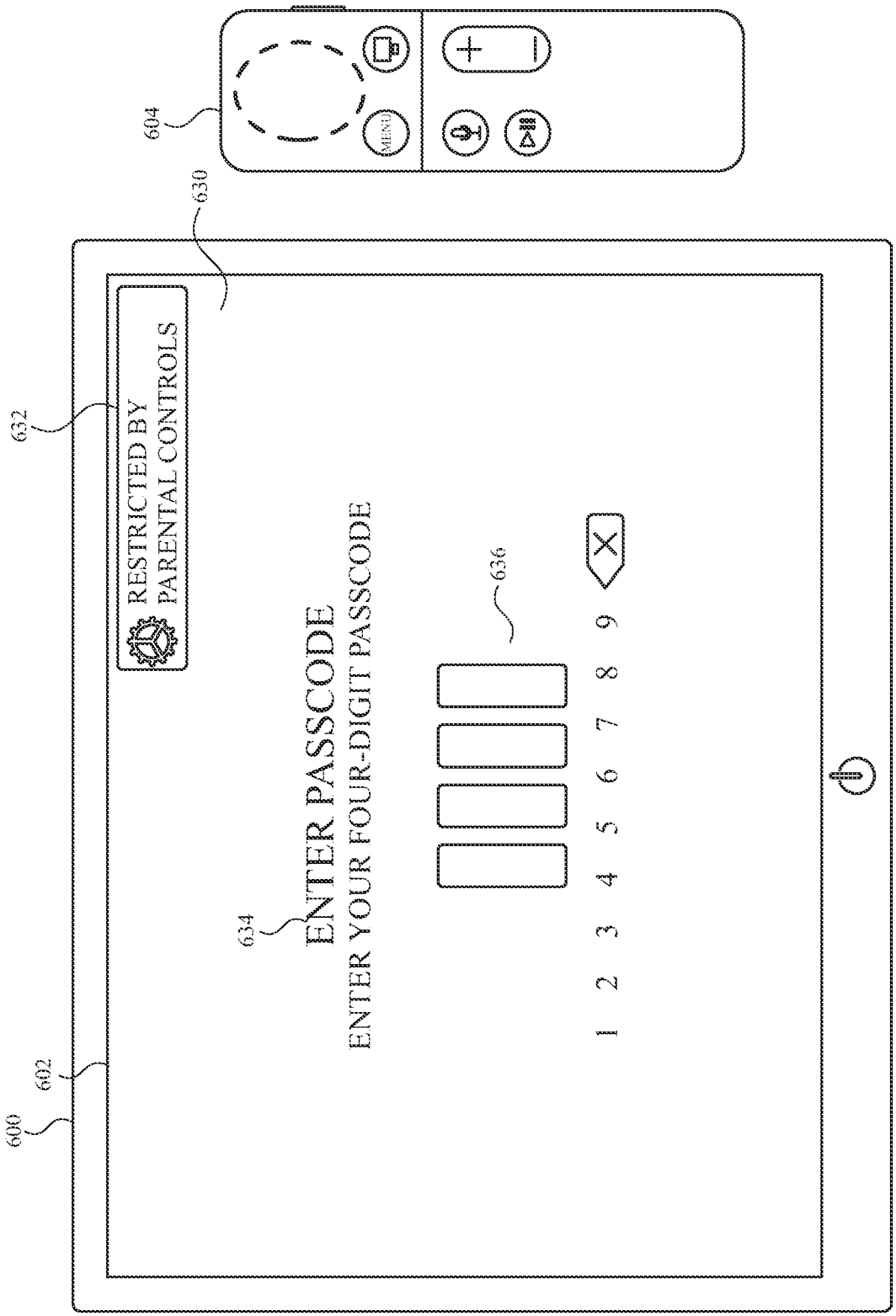
Figure 6F:
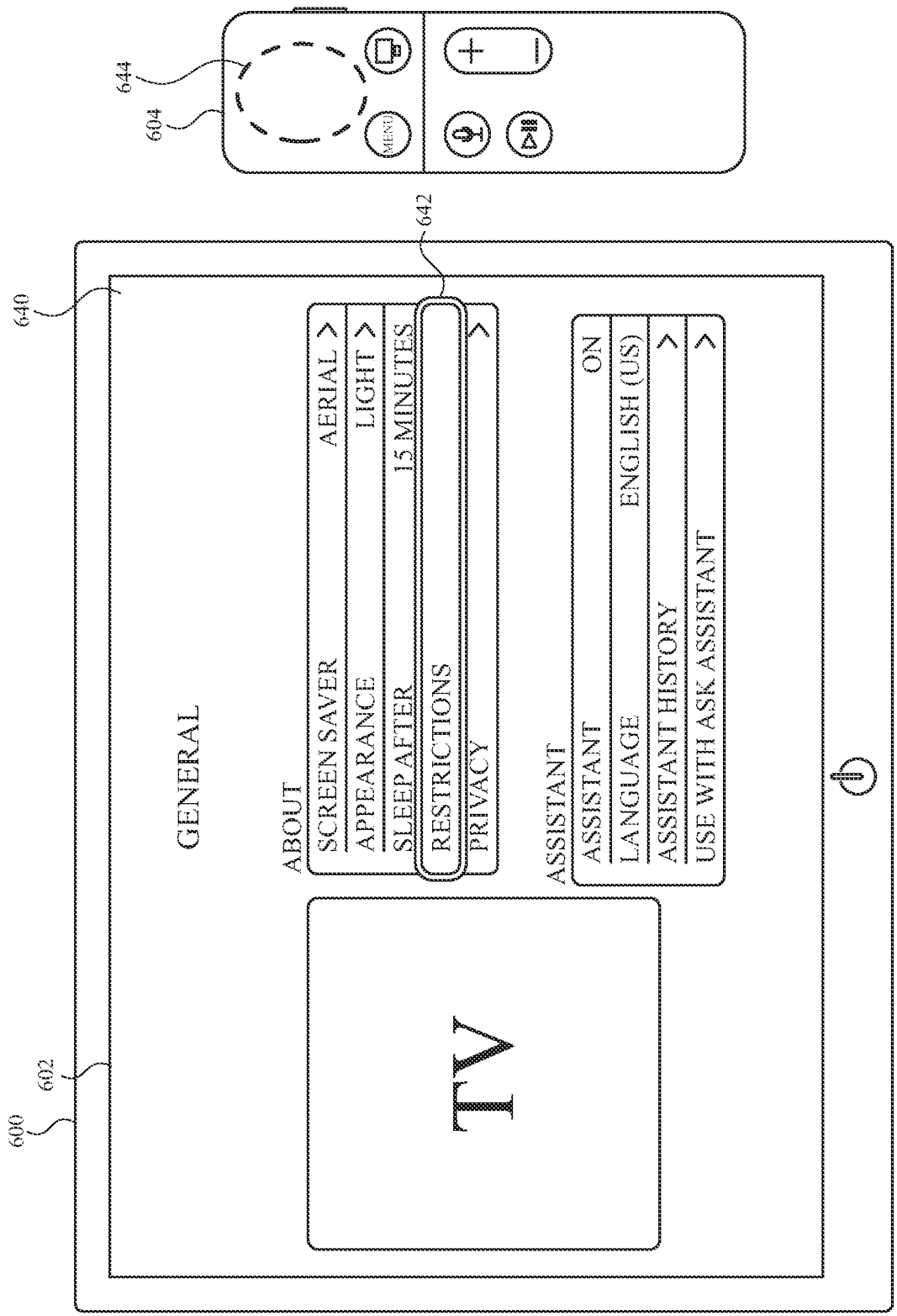

If device 600 determines that a voice input matches a user profile, and that the user profile is not authorized to access requested media item 420a, device 600 causes display 602 to display (e.g., replace display of user interface 610 with) passcode interface 630, as shown in FIG. 6D. Passcode interface 630 includes notifications, 632, 634, and field 636. Notification 632 indicates that voice input 618 matched a user profile of device 600, but that the matched user profile is not authorized to view media item 620a (e.g., "Restricted by parental controls"). Notification 634 indicates that an alternative form of authentication can be used to access media item 620a. For example, notification 634 indicates that a user can enter a passcode (e.g., password) in field 636 to access media item 620a. In some embodiments, a valid passcode is a passcode associated with an administrator or parental user account of device 600 that authorizes user accounts to access media items when such user accounts would otherwise be restricted from accessing the media items.

In some embodiments, if a received user input is not a voice input, device 600 instructs the user to provide an alternative form of authentication to access the restricted media item. With reference to FIG. 6E, while device 600 causes display of home interface 610 including a focus on media item 620a, remote control 604 detects activation of selection region 604a via user input 638 corresponding to a selection (and request to initiate playback) of media item 620a. Remote control 604 transmits an indication of input 638 to device 600, and in response to the indication of input 638, device 600 causes display 602 to display (e.g., replace display of home interface 610 with) a passcode interface (e.g., passcode interface 630 FIG. 6D) such that a user can provide a passcode to access media item 620a, as described.

FIGS. 6F-6M illustrate techniques for managing features (e.g., voice features, such as voice recognition) of a user profile. At FIG. 6F, device 600 is causing display 602 to display configuration menu interface 640 of a settings application of device 600. As shown, configuration menu interface 640 includes menu affordance 642, and a focus is on menu affordance 642, indicated by the bold outline around menu affordance 642. While device 600 causes display of user interface 640 with the focus on menu affordance 642, remote control 604 detects activation of selection region 604a via user input 644 corresponding to a selection of menu affordance 642 and transmits an indication of user input 644 to device 600. Device 600 receives, from remote control 604, the indication of input 644 corresponding to selection of menu affordance 642.

Figure 6G:
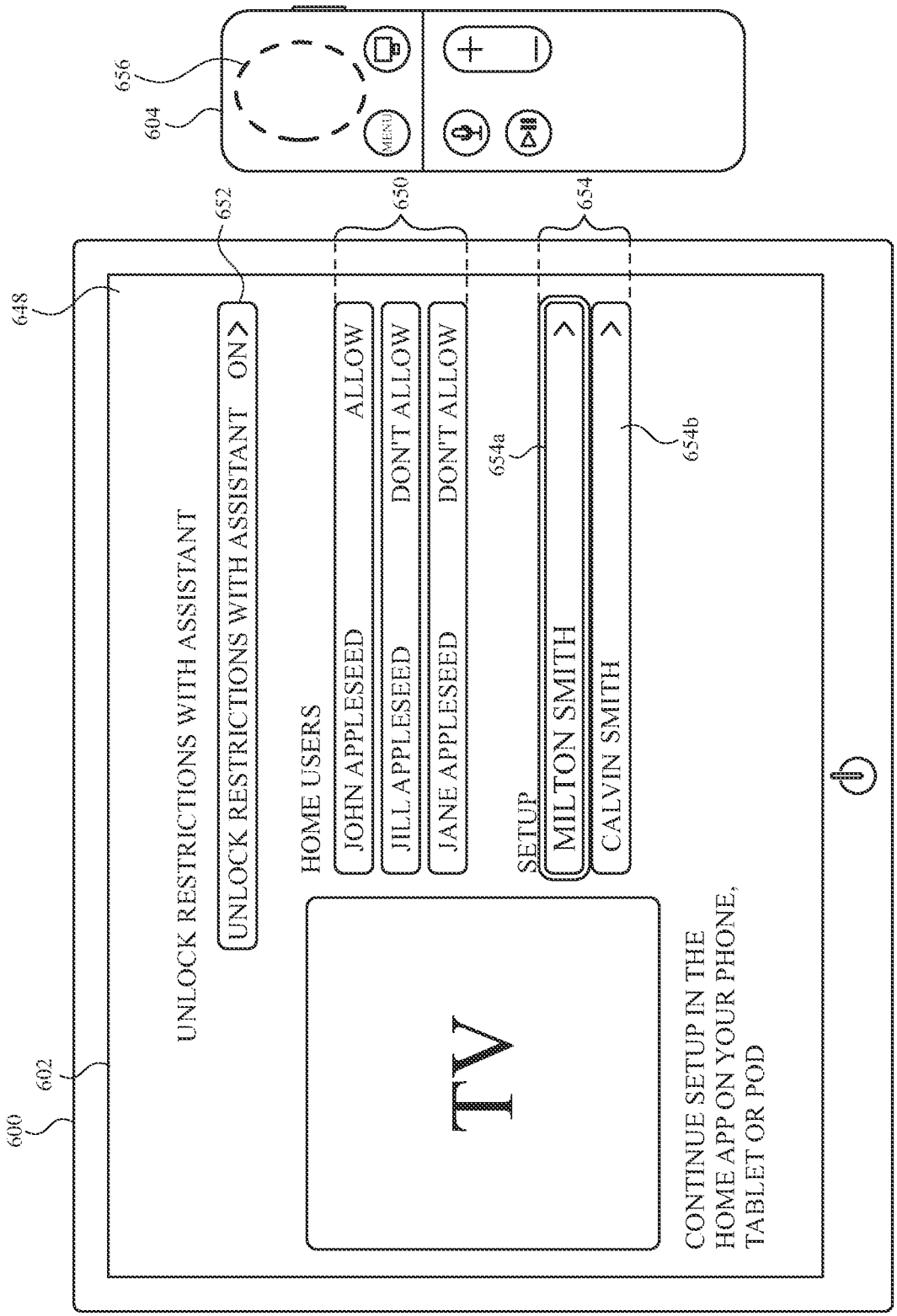

In response to detecting (e.g., receiving the indication of) input 644, device 600 causes display 602 to display (e.g., replace display of user interface 640 with) voice restrictions menu 648, as shown in FIG. 6G. Voice restrictions menu 648 includes voice restriction affordances 650, global voice restriction affordance 652, and voice setup affordances 654. Global voice restriction affordance 652 is be selected (e.g., via user input) to enable or disable voice recognition on device 600 for all user profiles stored on device 600.

In some embodiments, voice recognition is selectively enabled for individual user profiles. For example, each voice restriction affordance 648 can be selected (e.g., via user input) to enable (e.g., "allow") or disable (e.g., "don't allow") the use of voice inputs on device 600 for a particular user profile. With reference to FIG. 6G, for example, the use of voice inputs on device 600 for user profile "John Appleseed" is enabled, and the use of voice inputs on device 600 for user profiles "Jill Appleseed" and "Jane Appleseed" is disabled.

In some embodiments, voice recognition is enabled for a user profile on device 600 only if the user profile belongs to a home ecosystem (e.g., the user profile has rights to modify settings of devices and/or accessories included in the home ecosystem) and, additionally, voice recognition for the user profile is enabled within the home ecosystem. As an example, user profiles for John Appleseed, Jill Appleseed, and Jane Appleseed belong to a home ecosystem and are configured such that voice recognition is enabled for each of the user profiles within the home ecosystem. Accordingly, a voice restriction affordance 648 is provided for each of the user profiles John Appleseed, Jill Appleseed, and Jane Appleseed.

In some embodiments, user profiles can be added to a home ecosystem and/or voice recognition can be enabled for the user profiles within the home ecosystem. As an example, each voice setup affordance 654 corresponds to a user profile stored on device 600 (e.g., Milton Smith, Calvin Smith) that does not belong to the home ecosystem, or belongs to the home ecosystem but does not have voice recognition enabled within the home ecosystem. In response to selection of a voice setup affordance 654 corresponding to a user profile, device 600 displays instructions for performing a process for configuring the user profile (e.g., adding the user profile to the home ecosystem and/or enabling voice recognition for the user profile within the home ecosystem).

As shown in FIG. 6G, a focus is on voice setup affordance 654a for the user profile Milton Smith, indicated by the bold outline around voice setup affordance 654a. While device 600 causes display of user interface 650 with the focus on voice setup affordance 654a, remote control 604 detects activation of selection region 604a via user input 656 corresponding to selection of voice setup affordance 654a and provides (e.g., transmits) an indication of user input 656 to device 600. Device 600 receives, from remote control 604, the indication of input 656 corresponding to selection of voice setup affordance 654a.

Figure 6H:
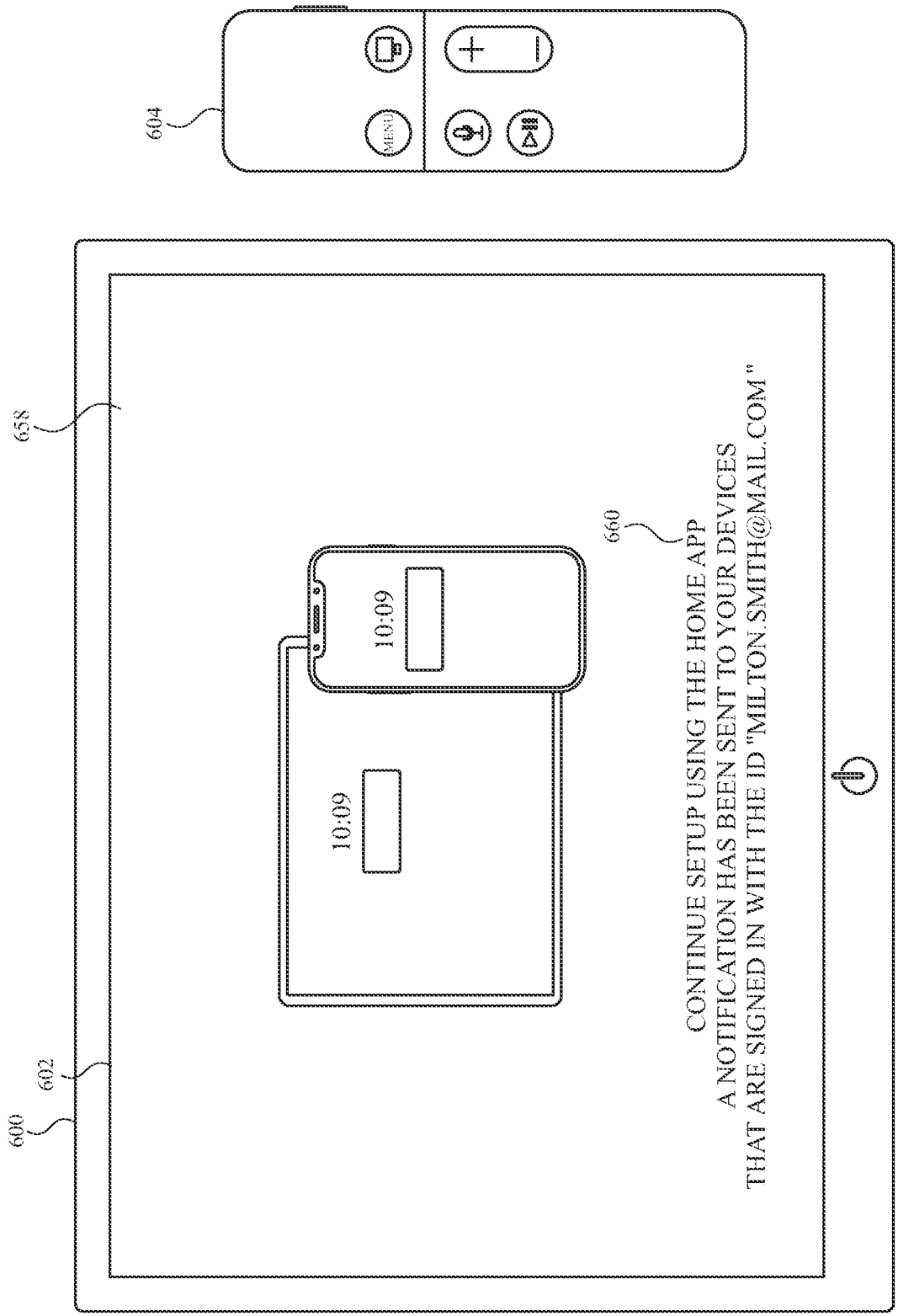

In response to detecting (e.g., receiving the indication of) input 656 indicating a selection of voice setup affordance 654a, device 600 causes display 602 to display (e.g., replace display of voice restrictions menu interface 650 with) instructions interface 658, as shown in FIG. 6H. Instructions interface 658 includes indicator 660 indicating that the user profile for Milton Smith can be configured using a home automation application of another device (e.g., device 100, 300, 500) associated with the user (e.g., Milton), such as device 662 (FIG. 6I).

FIGS. 6I-6L illustrate a process for configuring a user profile. FIG. 6I depicts device 662, which is a smartphone with display 663 in some embodiments. Display 663 of device 662 includes a touch-sensitive surface on which device 662 can detect user gestures (e.g., tap, swipe, drag). In some embodiments, device 662 includes one or more features of electronic devices 100, 300, and/or 500.

At FIG. 6I, device 662 displays user profile interface 664. User profile interface 664 is a user interface of a home automation application in some examples. User profile interface 664 includes voice enable object 667, and configure profile affordance 668. Voice enable option 667, when activated, enables or disables the use of voice recognition for the user profile in the home ecosystem.

At FIG. 6I, device 662 detects tap gesture 670 on configure profile affordance 668. In response to detecting tap gesture 670, device 662 displays (e.g., replaces display of user profile interface 664 with) add profile interface 674, as shown in FIG. 6J. Configure profile interface 674 includes indicator 676, continue affordance 678, and cancel affordance 680. Indicator 676 indicates that the user has initiated a process for configuring one or more features of the user profile and that performing the process will allow the user profile to be added to one or more devices (e.g., device 600), if the user profile is not already stored on the device. Activation of the cancel affordance 680 causes the device 662 to cease display of configure profile interface 674 and/or cease the process for configuring the user profile.

At FIG. 6J, device 662 detects tap gesture 682 on continue affordance 678. In response to detecting tap gesture 682, device 662 displays (e.g., replaces display of add profile interface 674 with) device selection interface 684, as shown in FIG. 6K. Device selection interface 684 includes candidate device objects 686, continue affordance 688 and cancel affordance 690. Activation of the cancelation affordance 690 causes device 662 to cease display of device selection interface 684 and/or cease the process for configuring the user profile.

In some embodiments, each of the candidate device objects 686 corresponds to a respective device (e.g., device 600), for instance, of a home ecosystem. In some embodiments, candidate device objects 686 correspond to devices of the home ecosystem having a particular device type (e.g., set top box).

In some embodiments, a candidate device object 686 is activated to add a user profile to the corresponding device. As an example, with reference to FIG. 6K, device objects 686a, 686c are activated. Accordingly, in response to detecting tap gesture 692 on continue affordance, device 662 instructs a device corresponding to "Bedroom TV" and a device corresponding to "Living Room TV" to add the user profile Milton Smith, if the user profile for Milton Smith is not already stored thereon. Optionally, device 662 instructs a device corresponding to "Kitchen TV" to remove the user profile Milton Smith if the user profile is stored on the device for "Kitchen TV".

Further in response to detecting tap gesture 692, device 662 displays (e.g., replaces display of device selection interface 684 with) voice recognition interface 694, as shown in FIG. 6L. Voice recognition interface 694 includes indicator 696 and recognition affordance 698. Indicator 696 indicates that selection of recognition affordance 698 will enable voice recognition for the user profile on one or more devices to which the user profile has been added (e.g., device 600). At FIG. 6L, device 662 detects tap gesture 602a on completion affordance 698. In response to detecting tap gesture 602a, device 662 enables voice recognition for the user profile Milton Smith within the home ecosystem. As a result of enabling voice recognition in this manner, voice recognition is enabled for Milton Appleseed on device 600, as described.

It will be appreciated that while a particular process for managing user profile features has been described with respect to FIGS. 6I-6L, in some embodiments, one or more aspects of the process can, optionally, be altered or omitted. By way of example, the process for configuring user profiles can be implemented without use of a device selection interface (e.g., device selection interface 684). Instead, selection of a continue affordance of a user profile feature interface causes device 662 to forgo displaying the device selection interface and display a voice recognition interface. As another example, if voice recognition is enabled for a user within a home ecosystem (e.g., in response to enabling voice enable option 667), device 662 forgoes displaying voice recognition interface 694.

Figure 6M:
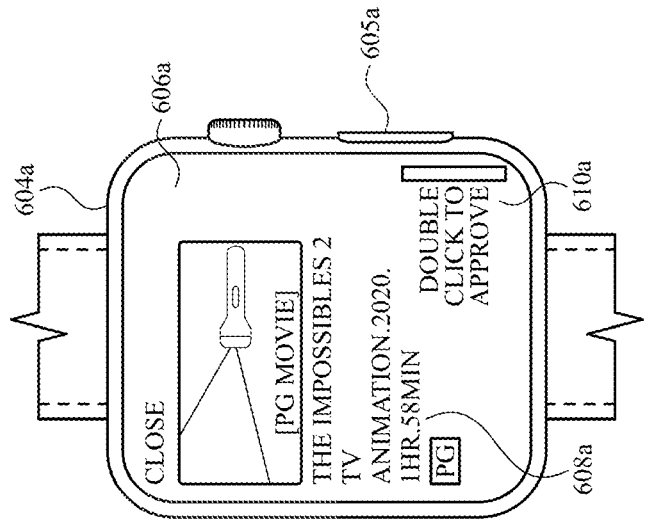
Figure 6M:
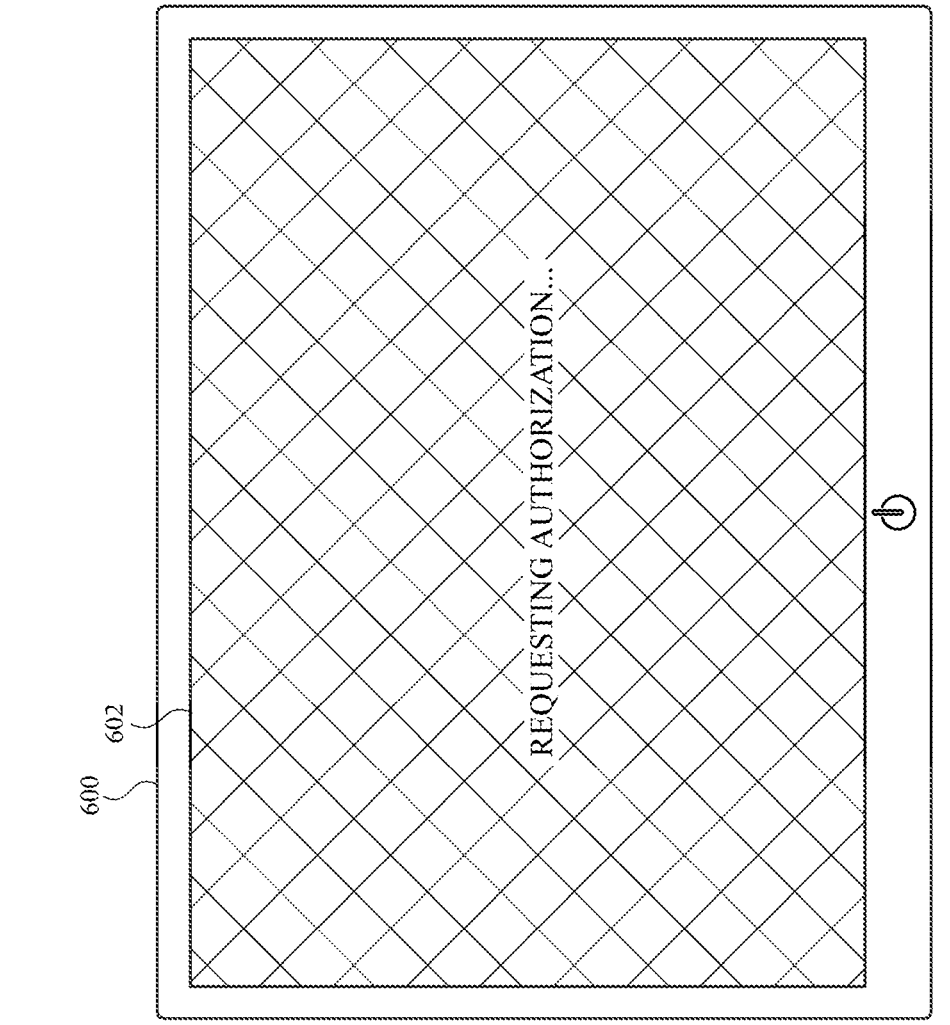

As described, in some embodiments, in response to determining that a user profile requesting access to a media item is authorized to access the media item, device 600 initiates playback of the media item. In some embodiments, in response to initiating playback (or prior to playback), the device 600 notifies an external device (e.g., a device associated with a parent account) that playback of the media item is being initiated (e.g., notifies the external device that access to the media item has been granted. In some embodiments, approval from an external device is required before playback may be initiated. As shown in FIG. 6M, device 600 is in communication with external device 604a, which is a smartwatch. In some embodiments, external device 604a is a smartphone (e.g., device 662). In some embodiments, external device 604a includes one or more features of devices 100, 300, and/or 500. In response to receiving a request to initiate playback of a media item requiring approval, device 600 notifies external device 604a of a request to access media item 608a ("The Impossibles 2").

In response, external device 604a displays authorization interface 606a. Authorization interface 606a includes indicators 608a, 610a. Indicator 608a identifies the media item of the request ("The Impossibles 2"), and indicator 610a indicates a manner in which the request can be approved ("double click to approve"). In response to receiving one or more inputs indicating that playback of the media item is approved (e.g., double press of button 605a), external device 604a notifies device 600 that playback of the media item has been approved, and in response, device 600 initiates playback of the requested media item.

FIG. 7 is a flow diagram illustrating a method for providing media content in accordance with some embodiments. Method 700 is performed at a computer system (e.g., 100, 300, 500, 600) (e.g., a digital media player (e.g., a set top device; a digital media player), a smartphone) that is in communication with a display generation component (e.g., 602) (e.g., a television, a display controller, an internal or external touch-sensitive display system) and one or more input devices (e.g., a touch-sensitive surface, a hardware button, a microphone). Some operations in method 700 are, optionally, combined, the orders of some operations are, optionally, changed, and some operations are, optionally, omitted.

As described below, method 700 provides an intuitive way for providing media content. The method reduces the cognitive burden on a user for providing (e.g., accessing) media content, thereby creating a more efficient human-machine interface. For battery-operated computing devices, enabling a user to provide media content faster and more efficiently conserves power and increases the time between battery charges.

The computer system (e.g., 600) receives (702), via the one or more input devices (e.g., 604), a user input (e.g., 618, 638). In some embodiments, the user input is a voice (e.g., speech) input (e.g., 638) (including a request to access a first restricted media item (e.g., 620*a*, 620*b*) (e.g., restricted media content). In some embodiments, the user input is a tactile input (e.g., 638) (e.g., selection of button, for instance, at the device or at a remote control device communicatively coupled to the computer system, or selection of an affordance on a display at, or communicatively coupled to, the device. In some embodiments, the voice input includes a request to access media content, such as movies, TV shows, music, and/or photos (e.g., "Hey Voice Assistant, play Baseball"). In some embodiments, the media content is restricted such that only authorized user profiles may access (e.g., view, play) the restricted media content. In some embodiments, content is restricted based on whether a user's profile is authorized to request media content using voice commands. In some embodiments, content is restricted based on a content rating of the media content indicating suitable age groups for the media content. In some embodiments, all content is restricted. In some embodiments, the request includes a digital assistant trigger (e.g., "Hey Siri") to indicate that a voice input is intended for the computer system.

In response (704) to the receiving the user input (e.g., 618, 638), and in accordance with (706) a determination that the user input is a voice input and a determination that the voice input corresponds (e.g., sufficiently matches a stored user voice profile) to a stored (e.g., on the computer system) user profile (e.g., user voice profile for a user) that is authorized to access the first restricted media item using voice inputs, the computer system initiates (708) playback of the first restricted media item (e.g., 620*a*). In some embodiments, the computer system determines whether a user's profile has been authorized to view requested restricted media content; In some embodiments, the computer system determines if the user's profile is authorized to request media content using voice inputs. In some embodiments, the computer system additionally or alternatively determines if the user's profile is authorized to view media content having a particular content rating; by way of example, if requested restricted media content is rated PG-13, the device can determine whether the user's profile has been assigned permissions to view media content rated PG-13). In some embodiments, once the computer system has determined that the user's profile is authorized to view the restricted media content, the computer system automatically initiates playback of the media content. In some embodiments, the media content is played without additional user input. In some embodiments, the media content is played without displaying additional user interfaces.

In response (704) to the receiving the user input (e.g., 618, 638), and in accordance with a determination (710) that the user input is a voice input and a determination that the voice input does not correspond (e.g., a failure to make a determination that the voice input corresponds to an authorized user voice profile) to a stored user profile that is authorized to access the first restricted media item using voice inputs, the computer system forgoes (712) initiating playback of the first restricted media item (e.g., 620*a*).

In response (704) to the receiving the user input, and in accordance with a determination (710) that the user input is a voice input and a determination that the voice input does not correspond (e.g., a failure to make a determination that the voice input corresponds to an authorized user voice profile) to a stored user profile that is authorized to access the first restricted media item using voice inputs, the computer system causes (714) display, at the display generation component (e.g., 602), of a validation user interface (e.g., 622, 630). In some embodiments, if the computer system determines that the user is not authorized to view the restricted media content, the computer system allows for a user to be authorized in an alternative manner. In some embodiments, the computer system causes display if a validation user interface including a prompt for entry of a passcode. In some embodiments, the computer system receives a set of inputs including a passcode, and if a passcode is determined to be valid, the user is authorized and playback of the restricted media content is initiated. In some embodiments, the validation user interface includes one or more options and/or affordances for providing user credentials (e.g., user names and/or passwords). Initiating playback of a restricted media item in accordance with a determination that a voice input is a request to access the restricted media item and a determination that the voice input corresponds to a user voice profile authorized to access the restricted media item enables the user to quickly and efficiently initiate playback of the restricted media item, which reduces the number of inputs needed to perform an operation.

In some embodiments, the determination that the received voice input corresponds to a stored user profile (e.g., user account) that is authorized to access the first restricted media item includes a determination that a voice profile of a stored user profile matches the received voice input (e.g., 618, 638) (e.g., matching the voice input to a voice profile associated with a user profile for a user). In some embodiments, the voice input is compared to a voice model for each user profile of the computer system). Determining an identity of a user that provided the voice input based on the voice input enables the computing system to quickly, efficiently, and accurately identify a user requesting access to restricted media items, which performs an operation when a set of conditions has been met without requiring further user input.

In some embodiments, the computer system forgoing initiating playback of the first restricted media item includes (e.g., displaying the validation user interface includes), in accordance with a determination that the voice input corresponds to a stored user profile that is not authorized to access the first restricted media item, displaying a first visual indication (e.g., 632). In some embodiments, if the voice input corresponds to a user voice profile (e.g., of a user profile), but the user voice profile is not authorized to access restricted media items using voice inputs, the computing system causes display of a notification indicating the same. In some embodiments, the notification is an alphanumeric string (e.g., "Restricted by Parental Controls") and/or an image.

In some embodiments, the computer system forgoing initiating playback of the first restricted media item includes, in accordance with a determination that the voice input does not correspond to a stored user profile (e.g., the voice input is not matched to any stored user voice profile), displaying a second visual indication (e.g., 624), different than the first visual indication. In some embodiments, if a voice input does not correspond to a user profile, the computing system causes display of a notification indicating the same. In some embodiments, the notification is an alphanumeric string (e.g., "user not recognized") and/or an image). Displaying a first visual notification in accordance with a determination that the voice input corresponds to a stored user profile that is not authorized to access the first restricted media item, and displaying a second visual notification, different than the first visual indication, in accordance with a determination that the voice input does not correspond to a stored user profile enables the user to quickly and efficiently diagnose a failure to initiate playback of restricted media items in response to a request, which provides improved visual feedback.

In some embodiments, while displaying the validation user interface (e.g., 622, 630), the computer system receives a second user input (e.g., alphanumeric string, such as a numeric passcode), via the one or more input devices (e.g., 604). In some embodiments, the validation user interface includes a prompt for entry of a passcode. In some embodiments, the computing system receives a user input (e.g., passcode) while displaying the validation user interface and determines whether the user input includes a valid passcode for initiating a requested media item. In some embodiments, passcodes are profile-specific and a passcode is valid if it is a passcode for a profile requesting access to the restricted media item. In some embodiments, a passcode is valid if the user's profile is authorized to view media content having a particular content rating. In some embodiments, passcodes are valid for all profiles.

In some embodiments, while displaying the validation user interface (e.g., 622, 630), in response to receiving the second user input, in accordance with a determination that the second user input is a valid passcode for initiating playback of the first restricted media item, the computer system initiates playback of the first restricted media item (e.g., 620a). In some embodiments, once the computing system has determined that the passcode is valid, the computing system automatically initiates playback of the media content. In some embodiments, the media content is played without additional user input. In some embodiments, the media content is played without displaying additional user interfaces.

In some embodiments, while displaying the validation user interface, in response to receiving the second user input, in accordance with a determination that the user input is not a valid passcode for initiating playback of the first restricted media item, the computer system forgoes initiating playback of the first restricted media item. In some embodiments, if the computing system determines that the passcode is not valid, the computing system displays, at the display generation component, a notification indicating that the passcode is not valid.

In some embodiments, in response to the user input, in accordance with a determination that the user input is not a voice input (e.g., the user input is a tactile input, for instance, provided using a remote control device), the computer system causes display, at the display generation component, of a second validation user interface (e.g., 622, 630). In some embodiments, if the computing system receives a user input including a request to access a first restricted media item and the user input is not a voice input, the computing system causes display of a second validation user interface; in this manner, the user can authenticate with the computing system and initiate playback of the requested restricted media item. In some embodiments, the second validation interface is the same as the validation interface). Causing display of a second validation user interface in accordance with a with a determination that the user input is not a voice input enables the user to quickly and efficiently authenticate with a computing system when unable to do so by voice input, which reduces the number of inputs needed to perform an operation.

In some embodiments, prior to receiving the user input, the computer system receives, via the one or more input devices, a first set of user inputs (e.g., a set of one or more inputs used to navigate through a set of user interfaces, for instance, of a settings menu and/or used to enable or disable one or more features). In some embodiments, in response to receiving the first set of user inputs and in accordance with a determination that a set of authorizing criteria are met, the computer system enables a voice media playback feature for a stored user profile to authorize the stored user profile to access the first restricted media item using voice inputs. In some embodiments, a voice media playback feature may be configured for a user voice profile. In some embodiments, if enabled for a user voice profile, the user voice profile is authorized to initiate playback of restricted media items using voice inputs. In some embodiments, a user may navigate to a voice media playback interface and select an affordance to cause the computing system to selectively enable (e.g., enable and/or disable) the voice media playback feature. Enabling a voice media playback feature in response to receiving the first set of user inputs and in accordance with a determination that a set of authorizing criteria are met enables a user to control whether the user's voice inputs can be used to initiate playback of restricted media items, which provides additional control options without cluttering the user interface.

In some embodiments, the computer system is in communication with an external electronic device (e.g., 604a), and the set of authorizing criteria includes a criterion that is met when a determination is made that a required set of inputs (e.g., a confirmation input received in response to a notification at the external electronic device that was triggered by the first set of user inputs) was received at the external electronic device. In some embodiments, the computer system receives, from the external electronic device, an indication that the required set of inputs was received at the external electronic device.

In some embodiments, in accordance with a determination that a set of notification criteria are met, the computer system provides, to a second external device (e.g., 600, 604a), a notification indicating that access to the restricted media item has been granted in response to the request to access the restricted media item (e.g., 608a). In some embodiments, the set of notification criteria include a criterion (e.g., requirement) that access to restricted media content has been granted for one or more particular profiles of the computing system (e.g., non-owner profiles, children profiles). In some embodiments, the notification is provided prior to initiating playback of the restricted media item (e.g., while a navigation interface is displayed). In some embodiments, a user of the external device must approve playback of the restricted media content in response to the notification for the computing device to initiate playback of the restricted media item. In some embodiments, the notification is provided after initiating playback of the restricted media item.

Note that details of the processes described above with respect to method 700 (e.g., FIG. 7) are also applicable in an analogous manner to the methods described below. For example, method 900 optionally includes one or more of the characteristics of the various methods described above with reference to method 700. For example, in some instances a user may provide a voice input to switch to a new user profile, as described with respect to method 900 and thereafter provide a voice input requesting playback of a media item for which the requested account is authorized to access, as described with respect to method 700. For brevity, these details are not repeated below.

FIGS. 8A-8E illustrate exemplary user interfaces for switching user profiles, in accordance with some embodiments. The user interfaces in these figures are used to illustrate the processes described below, including the processes in FIG. 9.

In the examples described in FIGS. 8A-8E, device 600 (e.g., device 100, 300, 500) causes display, on display 602, of the user interfaces described below. In some embodiments, display 602 is an integrated part of device 600. In some embodiments, device 600 is a separate digital media player (e.g., set top box) that is in communication (e.g., wireless, wired) with display 602. For simplicity, device 600 is not shown in FIGS. 8A-8E.

Figure 8A:
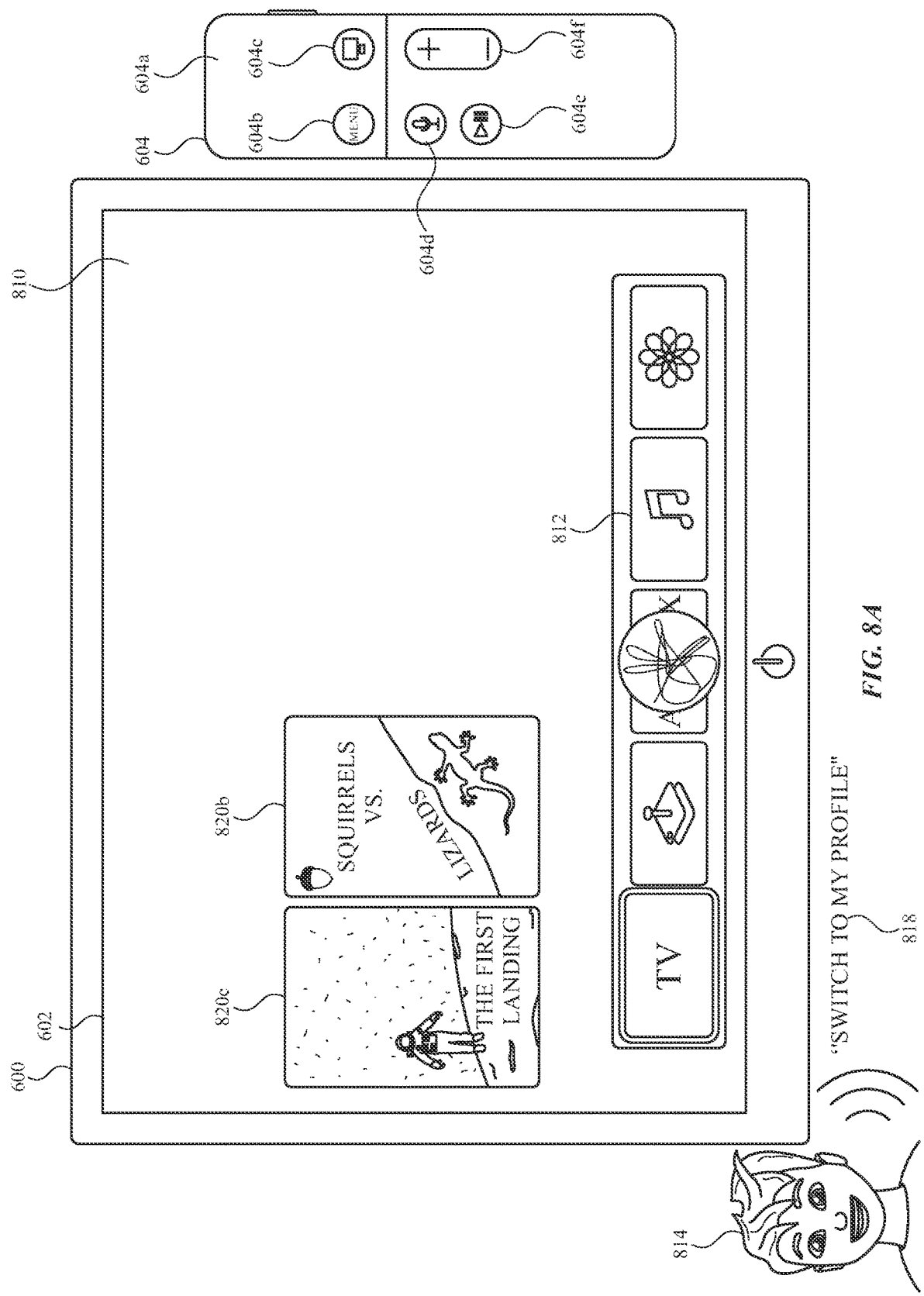
FIGS. 8A-8E illustrate exemplary user interfaces for switching user profiles in accordance with some embodiments.
Figure 9:
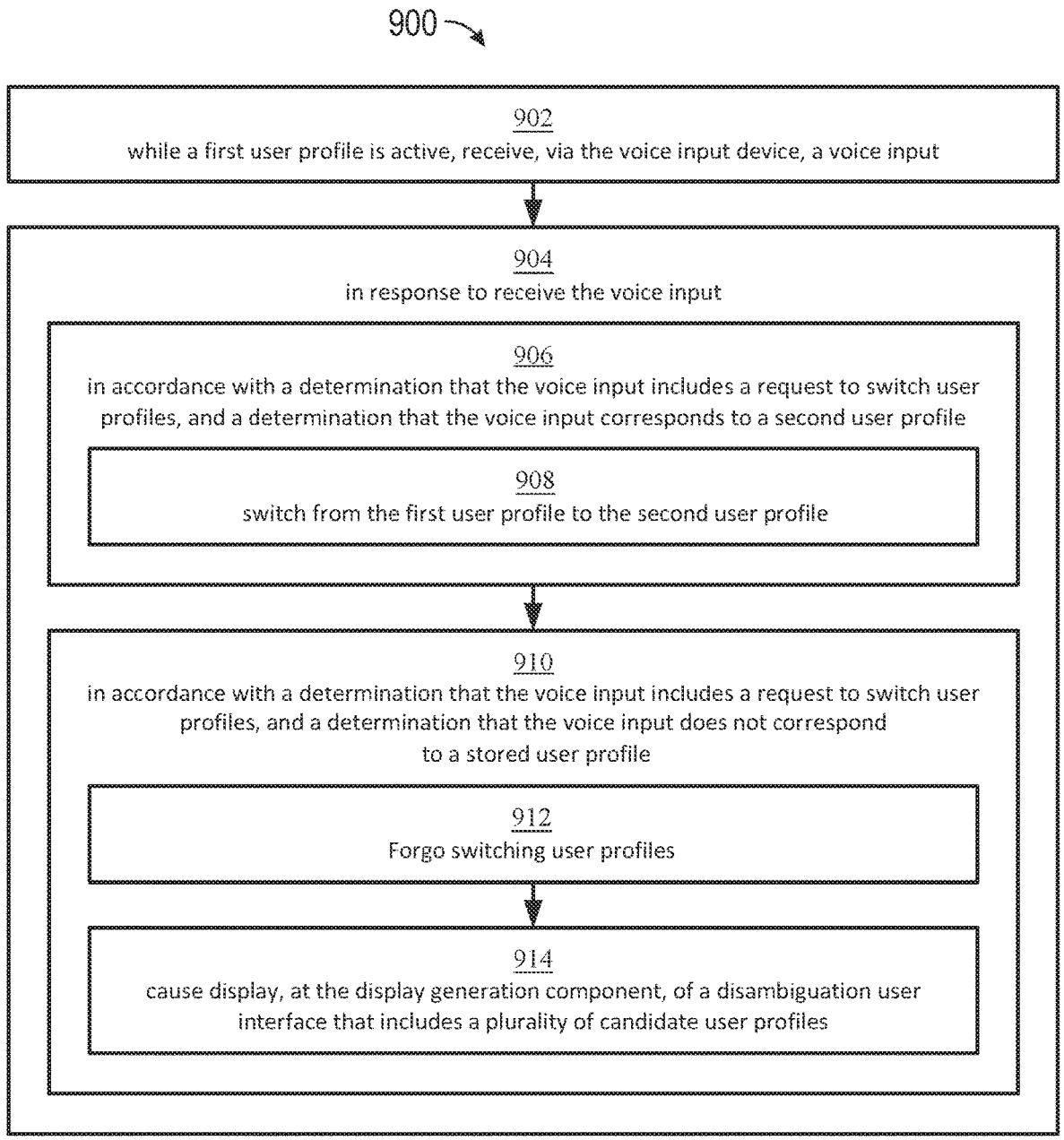
FIG. 9 is a flowchart of a process for switching user profiles in accordance with some embodiments.

At FIG. 8A, device 600 is causing display 602 (e.g., a television, a monitor) to display home interface 810, while a first profile stored on device 600 is active and a second profile stored on device 600 is inactive. User interface 810 includes applications 812. In some embodiments, applications 812 include one or more one or more applications that can be used on device 600 to provide content (e.g., media items). In some examples, applications 812 include one or more applications selected for the first profile. Home interface 810 further includes media items 820a, 820b. In some embodiments, one or more of media items 820 are recommended media items, or media items selected by device 600 for the first user profile.

In some embodiments, applications 812 and/or media items 820 of home interface 810 are selected for the first profile based on contextual information, such as contextual information of the device 600 and contextual information of the first user profile. Contextual information of device 600 includes contextual information regarding a state of device 600 (e.g., time, day, week, location). Contextual information of the first user profile includes any information that may be used to personalize home interface 810 for a user, including user-specific information for a user associated with the first user profile (e.g., calendar, age, permissions). In some embodiments, contextual information of the first user profile includes content previously accessed by the first user profile and/or prior usage of the device 600 while the first profile was active (e.g., dwell time on one or more media items while browsing for content).

While device 600 causes display of user interface 810, device 600 receives a voice input (e.g., indication of a voice input at remote control 604). As an example, with reference to FIG. 8A, device 600 receives, from user 814, voice input 818 requesting that device 600 switch profiles (e.g., "Switch to my profile").

In response to voice input 818, device 600 determines whether voice input 818 includes a request to switch user profiles, and if so, whether voice input 818 corresponds to a second user profile, for instance, different than the first user profile. In some embodiments, determining whether voice input 818 includes a request to switch profiles includes deriving a user intent from the voice input and determining whether the user intent corresponds to a task for switching profiles. In some embodiments, determining whether the voice input corresponds to a second user profile includes determining whether voice input 818 matches a voice profile of a user profile. The voice profile includes one or more voice models used to identify a voice of a user associated with the voice profile. In some embodiments, determining whether voice input 818 corresponds to a second user profile includes determining whether voice input 818 includes a reference to a profile, for instance, stored on device 600 (e.g., "John" in "switch to John's profile").

Figure 8B:
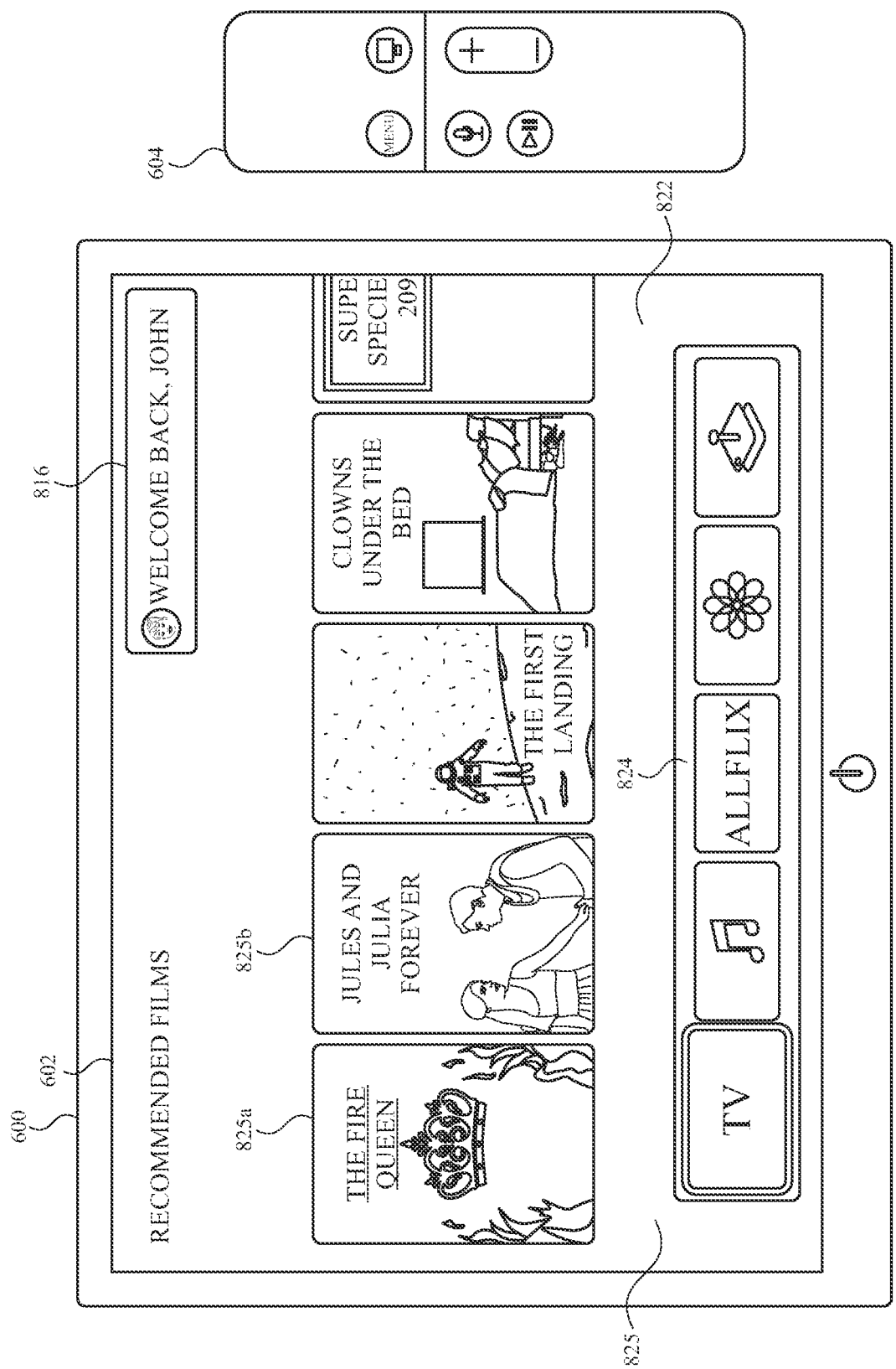

If device 600 determines that voice input 818 includes a request to switch user profiles and corresponds to a second user profile, device 600 switches from the first user profile to the second user profile. As a result, the second user profile is active and the first user profile is inactive. Additionally, device 600 causes display 602 to display (e.g., replace display of user interface 810 with) home interface 822, as shown in FIG. 8B. Home interface 822 includes indicator 816. Indicator 816 indicates that device 600 has switched profiles, and optionally, further identifies the second user profile (e.g., "Welcome back, John").

User interface 822 includes applications 824 and media items 825, including media items 825a, 825b. In some embodiments, applications 824 include one or more one or more applications that can be used on device 600 to provide content (e.g., media items). In some examples, applications 824 include one or more applications selected for the second profile. Home interface 810 further includes media items 820a, 820b. In some embodiments, one or more of media items 820 are recommended media items, or media items selected by device 600 for the second user profile. In some embodiments, applications 824 and/or media items 820a, 820b are selected for the second profile based on contextual information, as described.

Figure 8C:
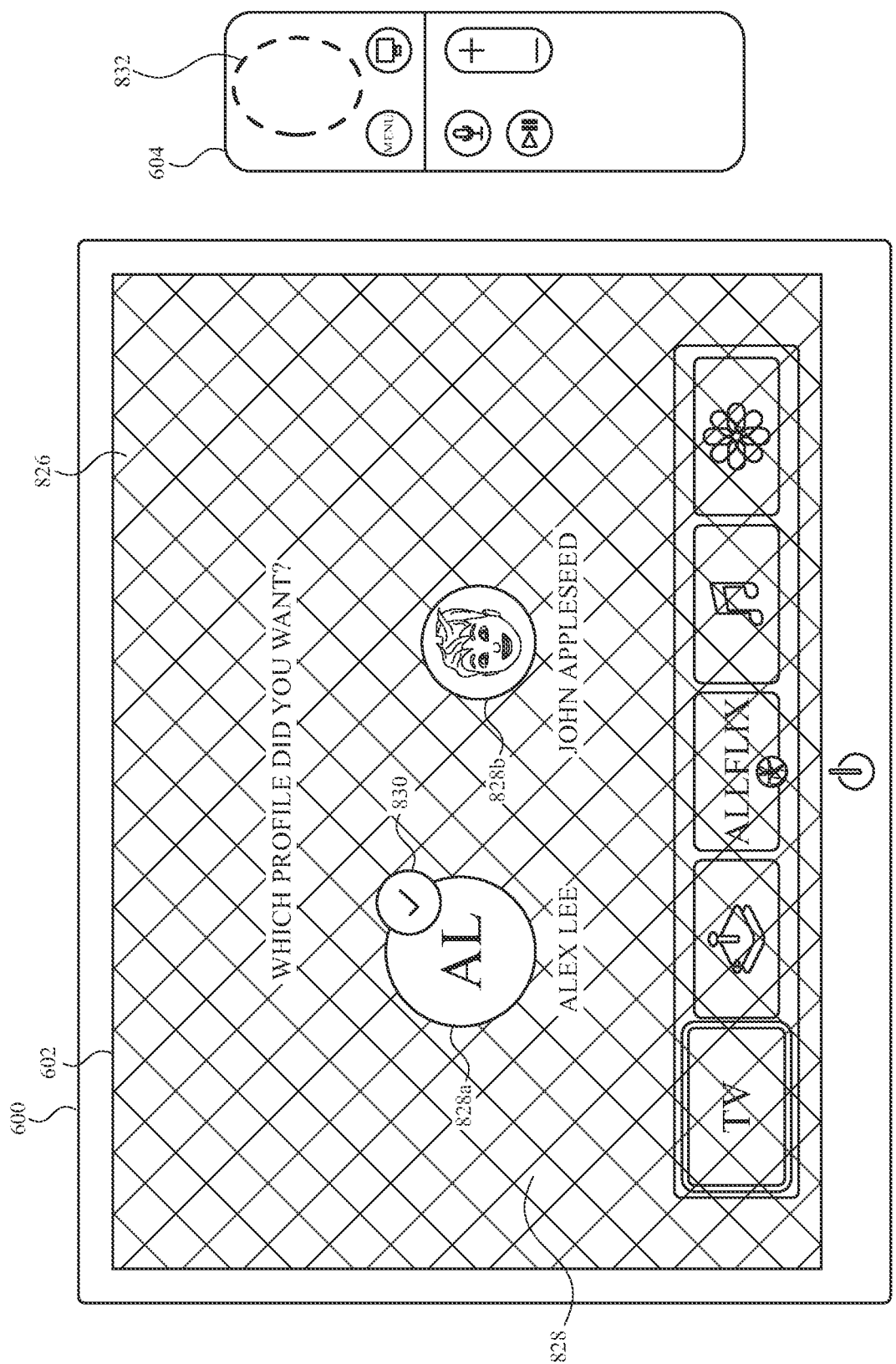

If device 600 determines voice input 818 includes a request to switch profiles, but does not correspond to a user profile (e.g., a user profile stored on device 600), device 600 causes display 602 to display disambiguation user interface 826, as shown in FIG. 8C. In some embodiments, device 600 displays (e.g., replaces display of home interface 810 with) disambiguation user interface 826. In some embodiments, device 600 overlays disambiguation user interface 826 on home interface 810.

Disambiguation user interface 826 includes candidate user profiles 828, each of which corresponds to a respective user profile of device 600. In some embodiments, disambiguation user interface 826 includes candidate user profiles 828 for all user profiles of device 600. In some embodiments, disambiguation user interface 826 includes candidate user profiles 828 for a subset of user profiles of device 600. By way of example, in response to determining voice input 818 includes a request to switch profiles, but does not correspond to a user profile stored on device 600, device 600 identifies a threshold number of user profiles determined to most likely correspond to voice input 818. Device 600 identifies the threshold number of profiles by generating a confidence score for each user profile and selects the threshold number of user profiles having the highest confidence scores. In some embodiments, candidate user profiles 828 are displayed according to their respective confidence scores. In some embodiments, candidate user profiles 828 include the currently active user profile (e.g., the first user profile 828*a*), which is, optionally, highlighted, for instance, using a particular visual indication, such as a particular color or an object (e.g., checkmark 830) displayed near or on the candidate user profile corresponding to the active user profile. Highlighting the active user profile in this manner indicates which user profile is currently being used by device 600.

While device 600 causes display of disambiguation interface 826, device 600 receives a user input 832 (e.g., indication of a user input at remote control 604) corresponding to a selection of a candidate user profile. In response to the user input indicating a selection of the candidate user profile, device 600 switches to the selected user profile.

Figure 8D:
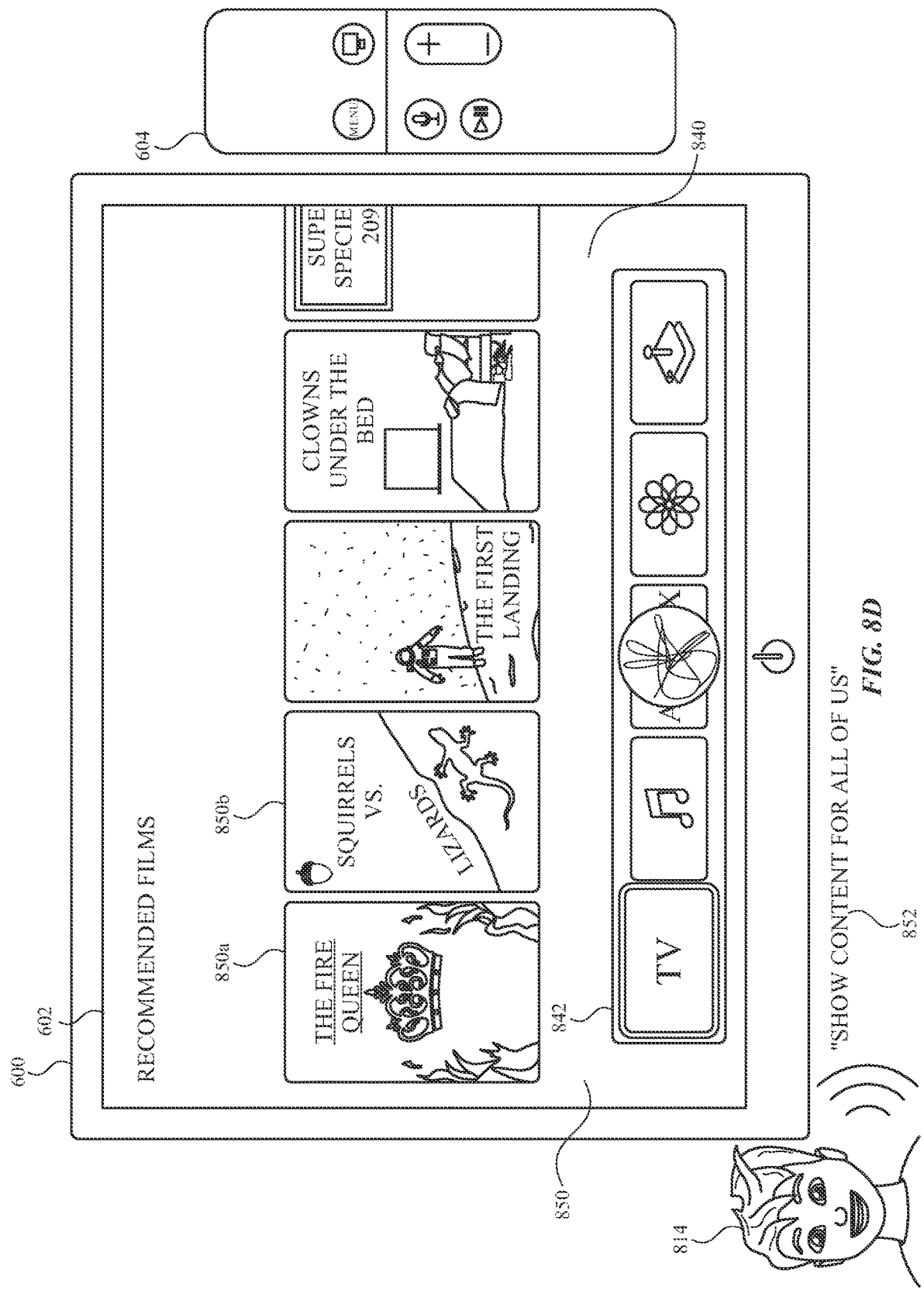
Figure 8E:
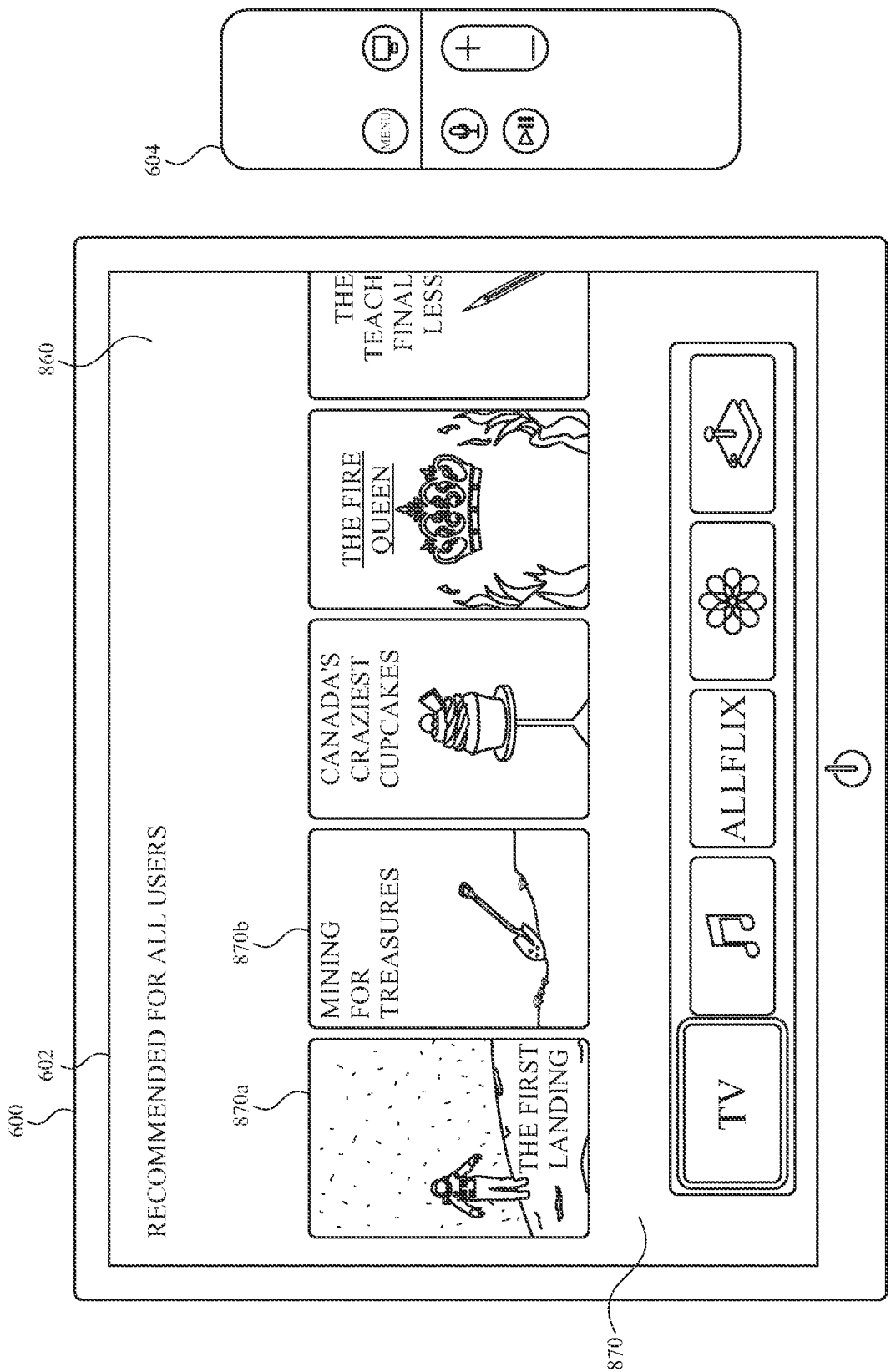

FIGS. 8D-8E illustrate a process for providing recommended media items. At FIG. 8D, device 600 is causing display 602 (e.g., a television, a monitor) to display home interface 840 while a third user profile stored on device 600 is active and a fourth user profile stored on device 600 is inactive. Home interface 840 includes applications 842. In some embodiments, applications 842 include one or more one or more applications that can be used on device 600 to provide content (e.g., media items). User interface 840 further includes media items 850*a*, 850*b*. In some embodiments, one or more of media items 850 are recommended media items, or media items selected by device 600 based on user preferences and/or previous user behavior of a user for the third user profile.

While device 600 causes display of user interface 840, device 600 receives voice input 852 (e.g., indication of voice input 852 at remote control 604). As shown in FIG. 8D, device 600 receives, from user 808, voice input 852 requesting that device 600 provide recommended content for multiple users (e.g., "Show content for all of us").

In response voice input 852, device 600 determines whether voice input 852 includes a request to provide media item recommendations for multiple users. If so, device 600 identifies a set of user profiles. In some embodiments, device 600 identifies users in the vicinity of device 600 and identifies any user profiles stored on device 600 corresponding to the users in the vicinity of device 600. Users are identified in this manner, for instance, using biometric identification (e.g., face identification, voice recognition). In some embodiments, device 600 identifies user profiles based on voice input 852. A voice input can specify, for instance, one or more user profiles explicitly, and/or contextually (e.g., "Find something for Joe and me to watch"). In some embodiments, device 600 identifies user profiles based on a context state of device 600 (e.g., location, time of day, day of week, etc.). If, for instance, a user requests recommendations at a particular time of day, device 600 can identify users profiles for users that typically watch media items on device 600 at or near the say time of day.

In response to identifying the user profiles, device 600 identifies a set of recommended media items for one or more of the identified user profiles. In some embodiments, identifying recommended media items in this manner includes identifying recommended media items for each user profile and combining the identified recommended media items into a combined set of recommended media items. In some embodiments, identifying recommended media items in this manner includes identifying recommended media items for each user profile and selecting a predetermined number of media items, for instance, corresponding to each profile.

Upon identifying recommended media items for the user profiles, device 600 causes display 602 to display (e.g., replace display of user interface 840 with) user interface 860, as shown in FIG. 8E. User interface 860 includes recommended media items 870 (e.g., recommended media item 870*a*, recommended media item 870*b*), which are comprised of the identified recommended media items, in some embodiments.

FIG. 9 is a flow diagram illustrating a method for providing media content using a computer system in accordance with some embodiments. Method 900 is performed at a computer system (e.g., 100, 300, 500, 600) (e.g., a digital media player (e.g., a set top device), a smartphone) that is in communication with a display generation component (e.g., 602) (e.g., a television, a display controller, an internal or external touch-sensitive display system) and a voice input device (e.g., a microphone). Some operations in method 900 are, optionally, combined, the orders of some operations are, optionally, changed, and some operations are, optionally, omitted.

As described below, method 900 provides an intuitive way for switching user profiles. The method reduces the cognitive burden on a user for switching user profiles, thereby creating a more efficient human-machine interface. For battery-operated computing devices, enabling a user to switch user profiles faster and more efficiently conserves power and increases the time between battery charges.

While a first user profile (e.g., a profile associated with a set of user preferences, user authorizations, and/or user access history, a user profile stored on the computer system) is active, the computer system (e.g., 600) receives (902), via the voice input device, a voice input (e.g., 818) (e.g., speech input).

In response (904) to receiving the voice input, and in accordance (906) with a determination that the voice input includes a request to switch (e.g., transition from the first user profile to a different user profile) user profiles, and a determination that the voice input corresponds to (e.g., sufficiently matches a stored user voice profile that is associated with the second user profile) a second user profile, the computer system switches (908) from the first user profile to the second user profile. In some embodiments, the computer system determines whether the voice input indicates an intent for the computer system to switch from a user profile currently active on the computer system to a different user profile (e.g., "switch to John's profile"). In some embodiments, the computer system determines whether the voice input references a particular profile (e.g., "switch to John's profile"). In some embodiments, the computer system determines whether the voice input contextually references a particular profile; as an example, the voice input may recite "switch to my profile", in which case the computer system identifies the profile as a profile of the user providing the voice input. In some embodiments, the computer system identifies a user providing the voice input only when necessary to identify a user profile referenced by a voice input; as another example, the voice input may recite "switch to the previous profile", in which case the computer system identifies the profile as the profile most recently active prior to the currently active user profile. In some embodiments, the computer system determines a confidence score for each user profile of the computer system indicating the likelihood that the voice input is indicative of that user profile. In some embodiments, the computer system selects the user profile with the highest confidence score satisfying a threshold confidence score (otherwise the computer system may determine that the voice input is not indicative of a user profile). In some embodiments, once the computer system has determined that a voice input includes a request to transition between user profiles and that the voice input is indicative of a user profile, the computer system transitions (e.g., switches) from the current user profile to the user profile indicated by the voice input. In some embodiments, after switching from the first user profile to the second user profile, the computing system provides a notification indicating that the profile has been switched (e.g., "Welcome, Jeff").

In response (904) to receiving the voice input, and in accordance (910) with a determination that the voice input includes a request to switch user profiles, and a determination that the voice input does not correspond to (e.g., a failure to make a determination that the voice input corresponds to an authorized user voice profile) a stored user profile (e.g., the second user profile and/or any other user profile accessible to the computer system), the computer system forgoes (912) switching user profiles (e.g., maintaining the first user profile as the active profile).

In response (904) to receiving the voice input, in accordance (910) with a determination that the voice input includes a request to switch user profiles, and a determination that the voice input does not correspond to (e.g., a failure to make a determination that the voice input corresponds to an authorized user voice profile) a stored user profile (e.g., the second user profile and/or any other user profile accessible to the computer system) the computer system causes (914) display, at the display generation component (e.g., 602), of a disambiguation user interface (e.g., 826) that includes a plurality of candidate user profiles (e.g., 828). In some embodiments, the computer system may determine that a user input includes a request to transition between profiles, but is not indicative of a user profile, and in response, cause display of a disambiguation user interface. In some embodiments, the disambiguation user interface includes all or a subset or user profiles of the computer system. In some embodiments, the user may navigate using the disambiguation user interface to select a desired user profile. In some embodiments, the current user profile is highlighted in the disambiguation user interface. In some embodiments, the user profiles are arranged based on how recently each of the user profiles was active. In some embodiments, the user profiles are arranged based on their respective confidence scores. Switching from a first user profile to a second user profile in accordance with a determination that a voice input includes a request to switch user profiles and a determination that the voice input corresponds to a second user profile enables the user to quickly and efficiently transition between user profiles of a computing device, which reduces the number of inputs needed to perform an operation.

In some embodiments, the determination that the voice input corresponds to the second user profile includes a determination that the voice input (e.g., 818) matches a voice profile of the second user profile (e.g., voice model). In some embodiments, the computing system determines whether the voice input matches a voice model for a user profile of the computing system.

In some embodiments, the determination that the voice input corresponds to the second user profile includes a determination that a portion of the voice input includes a reference to the second user profile. In some embodiments, a reference to another profile is a name of a user (e.g., "switch to Eric's profile). In some embodiments, a reference to another profile is a reference to a previously active profile (e.g., "switch to the previous profile"). Determining that a voice input includes a reference to a second user profile enables the computing system to quickly, efficiently, and accurately identify a user profile requested by a user, which performs an operation when a set of conditions has been met without requiring further user input.

In some embodiments, after switching from the first user profile to the second user profile, the computer system identifies a set of content (e.g., 825*a*, 825*b*) for the second user profile based on context information of the second user profile. In some embodiments, after switching profiles, the computing system identifies content for the newly active user profile. In some embodiments, content includes personalized content (e.g., recommended media items) and/or application (e.g., streaming application) recommendations for the user of the active user profile. In some embodiments, content is identified based on context information, for instance, of the active user profile. In some embodiments, context information includes context information for the computing system, such as time, day, location, and/or previously viewed content across all user profiles. In some embodiments, context information includes context information for a user profile, such as content previously viewed while the user profile was active, user calendar, and/or applications frequently used by the user.

In some embodiments, the computer system receives a second user input (e.g., 852). In some embodiments, in accordance with a determination that the second user input is a request to provide media item recommendations for a plurality of user profiles, the computer system identifies a first set of recommended media items for a third user profile (e.g., 850*a*, 850*b*) (e.g., first user in a plurality of users requesting recommended media items). In some embodiments, the computing system determines that a user input is a request to provide media item recommendations for a plurality of user profiles based on the user input (e.g., the user input specifies that the request is for a plurality of user profiles, e.g., "show recommendations for all of us", "find something for me and Joe to watch"). In some embodiments, the computing system determines that users corresponding to a plurality of user profiles, respectively, are proximate the computing system and in response determines that a request for media item recommendations is a request for all users proximate the computing system). In some embodiments, in accordance with a determination that the second user input is a request to provide media item recommendations for a plurality of user profiles, the computer system identifies a second set of recommended media items for a fourth user profile (e.g., 850*a*, 850*b*) (e.g., second user in a plurality of users requesting recommended media items). In some embodiments, in accordance with a determination that the second user input is a request to provide media item recommendations for a plurality of user profiles, the computer system provides a third set of recommended media items, the third set of recommended media items based on the first and second sets of recommended media items (e.g., 850*a*, 850*b*). In some embodiments, the computing system combines one or more media items of the first set of recommended media items and one or more media items of the second set of recommended media items to provide (e.g., obtain, generate) the third set of recommended media items. In some embodiments, media items of the first set and/or second set of recommended media items are ranked according to saliency and, optionally, a threshold number of media items from each set is used to provide the third set of recommended media items. In some embodiments, saliency for each set is determined for a plurality of user profiles. Providing a third set of recommended media items in which the third set of recommended media items is based on a first set of recommended items for a third user profile and a second set of recommended media items for a fourth user profile enables the computing system to efficiently and accurately identify recommended media items for multiple users, for instance, viewing media items together, which performs an operation when a set of conditions has been met without requiring further user input.

In some embodiments, the computer system is further in communication with one or more input devices (e.g., a touch-sensitive surface, a hardware button, for instance, of a remote control device). In some embodiments, while displaying the disambiguation user interface, the computer system receives, via the one or more input devices, a selection of a candidate user profile of the plurality of candidate user profiles. In some embodiments, if the computing system receives a request to switch user profiles but cannot identify a user profile based on the input, the computing system causes display (e.g., displays, causes another device to display) of a plurality of candidate user profiles that a user may desire to switch to). In some embodiments, the computer system switches from the first user profile to the selected candidate user profile. In some embodiments, the user may select a candidate profile and the computing system receives the selection and switches to the selected user profile. In some embodiments, the computing system authenticates the user prior to switching to the selected user profile, for instance, using a passcode (e.g., password) or biometric authentication. Switching from a first user profile to a second user profile in accordance with a determination that a voice input includes a request to switch user profiles and a determination that the voice input corresponds to a second user profile enables the user to quickly and efficiently transition between user profiles of a computing device, which reduces the number of inputs needed to perform an operation.

In some embodiments, the plurality of candidate user profiles includes the first user profile.

In some embodiments, causing display, at the display generation component, of a disambiguation user interface that includes the plurality of candidate user profiles includes highlighting the first user profile. In some embodiments, highlighting the first user profile includes modifying the visual appearance of the first user profile. In some embodiments, the computing system highlights the first user profile to indicate that the first user profile is currently active. In some embodiments, the computing system highlights the first user profile by placing a checkmark on or near the first user profile. In some embodiments, the computing system highlights the first user profile by modifying (e.g., brightening, darkening, greying) a color scheme of the first user profile.

In some embodiments, the plurality of candidate user profiles is assigned a respective plurality of confidence scores. In some embodiments, causing display, at the display generation component, of the disambiguation user interface that includes the plurality of candidate user profiles arranging the plurality of candidate user profiles based on the plurality of confidence scores. In some embodiments, upon receiving a voice input including a request to switch user profiles, the computer system determines, for each user profile, a likelihood, or confidence score, that the user profile corresponds to the voice input. In some embodiments, confidence scores are obtained by comparing, for each user profile, a user voice profile (e.g., voice model) of the user profile to the voice input. In some embodiments, the computing system ranks the candidate user profiles according to their respective confidence scores. In some embodiments, only a subset of candidate user profiles are included in the disambiguation user interface (e.g., only those candidate user profiles having a confidence score exceeding a predetermined threshold confidence score). In some embodiments, candidate user profiles are displayed in the center of the disambiguation user interface. In some embodiments, candidate user profiles are displayed in the lower third of the candidate disambiguation interface. In some embodiments, candidate user profiles are represented by an icon (e.g., avatar corresponding to a user) and/or alphanumeric string (e.g., name of user). Arranging a plurality of candidate user profiles based on a respective plurality of confidence scores enables the computing system to first provide (e.g., highlight) candidate user profiles determined to be most salient to a user, which reduces the number of inputs needed to perform an operation.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve manner in which user profiles are managed. As an example, one aspect improves the manner in which the playback of media items is initiated. As another example, one aspect improves the manner in which user profiles are switched. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to identify users, for instance, using voice profiles. Accordingly, use of such personal information data enables users to utilize user profiles in an improved manner. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user profiles, the present technology can be configured to allow users to select to "opt in" or "opt out" of participation in the collection of personal information data during registration for services or anytime thereafter. In another example, users can select not to provide data for voice profiles. In yet another example, users can select to restrict the manner in which recommended content is personalized based on historical viewing patterns. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available, or publicly available information.

What is claimed is:

1. A computer system that is in communication with a display generation component and one or more input devices, comprising:
    one or more processors; and
    memory storing one or more programs configured to be executed by the one or more processors, the one or more programs including instructions for:
        receiving, via the one or more input devices, a user input including a request to access a first restricted media item; and
        in response to receiving the user input:
            in accordance with a determination that the user input is a voice input and a determination that the voice input corresponds to a stored user profile that is authorized to access the first restricted media item using voice inputs:
                initiating playback of the first restricted media item via the display generation component; and
                in accordance with a determination that a set of notification criteria are met, providing, to an external device, different from the display generation component, a notification indicating that access to the first restricted media item has been granted in response to the request to access the first restricted media item; and
            in accordance with the determination that the user input is the voice input and a determination that the voice input does not correspond to a stored user profile that is authorized to access the first restricted media item using voice inputs:
                forgoing initiating playback of the first restricted media item; and
                causing display, at the display generation component, of a validation user interface.

2. The computer system of claim 1, wherein the determination that the voice input corresponds to a stored user profile that is authorized to access the first restricted media item includes a determination that a voice profile of a stored user profile matches the voice input.

3. The computer system of claim 1, wherein forgoing initiating playback of the first restricted media item includes:
    in accordance with a determination that the voice input corresponds to a stored user profile that is not authorized to access the first restricted media item, displaying a first visual indication; and
    in accordance with a determination that the voice input does not correspond to a stored user profile, displaying a second visual indication, different than the first visual indication.

4. The computer system of claim 1, wherein the one or more programs further include instructions for:
while displaying the validation user interface:
receiving a second user input, via the one or more input devices; and
in response to receiving the second user input:
in accordance with a determination that the second user input is a valid passcode for initiating playback of the first restricted media item, initiating playback of the first restricted media item; and
in accordance with a determination that the second user input is not a valid passcode for initiating playback of the first restricted media item, forgoing initiating playback of the first restricted media item.

5. The computer system of claim 1, wherein the one or more programs further include instructions for:
in response to the user input:
in accordance with a determination that the user input is not a voice input, causing display, at the display generation component, of a second validation user interface.

6. The computer system of claim 1, wherein the one or more programs further include instructions for:
prior to receiving the user input, receiving, via the one or more input devices, a first set of user inputs; and
in response to receiving the first set of user inputs and in accordance with a determination that a set of authorizing criteria are met, enabling a voice media playback feature for the stored user profile to authorize the stored user profile to access the first restricted media item using voice inputs.

7. The computer system of claim 6, wherein:
the computer system is in communication with an external electronic device, and
the set of authorizing criteria includes a criterion that is met when a determination is made that a required set of inputs was received at the external electronic device.

8. A non-transitory computer-readable storage medium storing one or more programs configured to be executed by one or more processors of a computer system that is in communication with a display generation component and one or more input devices, the one or more programs including instructions for:
receiving, via the one or more input devices, a user input including a request to access a first restricted media item; and
in response to receiving the user input:
in accordance with a determination that the user input is a voice input and a determination that the voice input corresponds to a stored user profile that is authorized to access the first restricted media item using voice inputs:
initiating playback of the first restricted media item via the display generation component; and
in accordance with a determination that a set of notification criteria are met, providing, to an external device, different from the display generation component, a notification indicating that access to the first restricted media item has been granted in response to the request to access the first restricted media item; and
in accordance with the determination that the user input is the voice input and a determination that the voice input does not correspond to a stored user profile that is authorized to access the first restricted media item using voice inputs:
forgoing initiating playback of the first restricted media item; and
causing display, at the display generation component, of a validation user interface.

9. A method, comprising:
at a computer system that is in communication with a display generation component and one or more input devices:
receiving, via the one or more input devices, a user input including a request to access a first restricted media item; and
in response to receiving the user input:
in accordance with a determination that the user input is a voice input and a determination that the voice input corresponds to a stored user profile that is authorized to access the first restricted media item using voice inputs:
initiating playback of the first restricted media item via the display generation component; and
in accordance with a determination that a set of notification criteria are met, providing, to an external device, different from the display generation component, a notification indicating that access to the restricted media item has been granted in response to the request to access the restricted media item; and
in accordance with the determination that the user input is the voice input and a determination that the voice input does not correspond to a stored user profile that is authorized to access the first restricted media item using voice inputs:
forgoing initiating playback of the first restricted media item; and
causing display, at the display generation component, of a validation user interface.

10. The non-transitory computer-readable storage medium of claim 8, wherein the determination that the voice input corresponds to a stored user profile that is authorized to access the first restricted media item includes a determination that a voice profile of a stored user profile matches the voice input.

11. The non-transitory computer-readable storage medium of claim 8, wherein forgoing initiating playback of the first restricted media item includes:
in accordance with a determination that the voice input corresponds to a stored user profile that is not authorized to access the first restricted media item, displaying a first visual indication; and
in accordance with a determination that the voice input does not correspond to a stored user profile, displaying a second visual indication, different than the first visual indication.

12. The non-transitory computer-readable storage medium of claim 8, wherein the one or more programs further include instructions for:
while displaying the validation user interface:
receiving a second user input, via the one or more input devices; and
in response to receiving the second user input:
in accordance with a determination that the second user input is a valid passcode for initiating playback of the first restricted media item, initiating playback of the first restricted media item; and
in accordance with a determination that the second user input is not a valid passcode for initiating playback of the first restricted media item, forgoing initiating playback of the first restricted media item.

13. The non-transitory computer-readable storage medium of claim 8, wherein the one or more programs further include instructions for:
in response to the user input:
in accordance with a determination that the user input is not a voice input, causing display, at the display generation component, of a second validation user interface.

14. The non-transitory computer-readable storage medium of claim 8, wherein the one or more programs further include instructions for:
prior to receiving the user input, receiving, via the one or more input devices, a first set of user inputs; and
in response to receiving the first set of user inputs and in accordance with a determination that a set of authorizing criteria are met, enabling a voice media playback feature for the stored user profile to authorize the stored user profile to access the first restricted media item using voice inputs.

15. The non-transitory computer-readable storage medium of claim 14, wherein:
the computer system is in communication with an external electronic device, and
the set of authorizing criteria includes a criterion that is met when a determination is made that a required set of inputs was received at the external electronic device.

16. The method of claim 9, wherein the determination that the voice input corresponds to a stored user profile that is authorized to access the first restricted media item includes a determination that a voice profile of a stored user profile matches the voice input.

17. The method of claim 9, wherein forgoing initiating playback of the first restricted media item includes:
in accordance with a determination that the voice input corresponds to a stored user profile that is not authorized to access the first restricted media item, displaying a first visual indication; and
in accordance with a determination that the voice input does not correspond to a stored user profile, displaying a second visual indication, different than the first visual indication.

18. The method of claim 9, further comprising:
while displaying the validation user interface:
receiving a second user input, via the one or more input devices; and
in response to receiving the second user input:
in accordance with a determination that the second user input is a valid passcode for initiating playback of the first restricted media item, initiating playback of the first restricted media item; and
in accordance with a determination that the second user input is not a valid passcode for initiating playback of the first restricted media item, forgoing initiating playback of the first restricted media item.

19. The method of claim 9, further comprising:
in response to the user input:
in accordance with a determination that the user input is not a voice input, causing display, at the display generation component, of a second validation user interface.

20. The method of claim 9, further comprising:
prior to receiving the user input, receiving, via the one or more input devices, a first set of user inputs; and
in response to receiving the first set of user inputs and in accordance with a determination that a set of authorizing criteria are met, enabling a voice media playback feature for the stored user profile to authorize the stored user profile to access the first restricted media item using voice inputs.

21. The method of claim 20, wherein:
the computer system is in communication with an external electronic device, and
the set of authorizing criteria includes a criterion that is met when a determination is made that a required set of inputs was received at the external electronic device.

* * * * *